*INVENTORS*
MORTON M. ASTRAHAN, WILLIAM L. BATCHELOR, BENNETT HOUSMAN, HRAND L. KURKJIAN, BERNARD L. SARAHAN
BY Theodore B. Wood
AGENT
Ralph L. Thomas
ATTORNEY Dec. 5, 1961 M. M. ASTRAHAN ET AL 3,012,227

SIGNAL STORAGE SYSTEM

Filed Sept. 26, 1956 29 Sheets-Sheet 2

Dec. 5, 1961 M. M. ASTRAHAN ET AL 3,012,227

SIGNAL STORAGE SYSTEM

Filed Sept. 26, 1956 29 Sheets-Sheet 3

MEMORY & MACHINE CYCLES

Dec. 5, 1961 M. M. ASTRAHAN ET AL 3,012,227

SIGNAL STORAGE SYSTEM

Filed Sept. 26, 1956 29 Sheets-Sheet 6

Dec. 5, 1961 M. M. ASTRAHAN ET AL 3,012,227

SIGNAL STORAGE SYSTEM

Filed Sept. 26, 1956 29 Sheets-Sheet 10

Dec. 5, 1961 M. M. ASTRAHAN ET AL 3,012,227

SIGNAL STORAGE SYSTEM

Filed Sept. 26, 1956 29 Sheets-Sheet 12

Dec. 5, 1961

M. M. ASTRAHAN ET AL 3,012,227

SIGNAL STORAGE SYSTEM

Filed Sept. 26, 1956

29 Sheets-Sheet 14

Dec. 5, 1961 M. M. ASTRAHAN ET AL 3,012,227

SIGNAL STORAGE SYSTEM

Filed Sept. 26, 1956 29 Sheets-Sheet 15

Dec. 5, 1961 M. M. ASTRAHAN ET AL 3,012,227

SIGNAL STORAGE SYSTEM

Filed Sept. 26, 1956 29 Sheets-Sheet 20

BREAK IN DISTRIBUTOR

BREAK OUT DISTRIBUTOR

DRUM CONTROL REGISTER 365

Dec. 5, 1961 M. M. ASTRAHAN ET AL 3,012,227

SIGNAL STORAGE SYSTEM

Filed Sept. 26, 1956 29 Sheets-Sheet 25

Dec. 5, 1961 M. M. ASTRAHAN ET AL 3,012,227

SIGNAL STORAGE SYSTEM

Filed Sept. 26, 1956 29 Sheets-Sheet 26

United States Patent Office 3,012,227

Patented Dec. 5, 1961

3,012,227
SIGNAL STORAGE SYSTEM

Morton M. Astrahan, San Jose, Calif., and William L. Batchelor, Saugerties, Bennett Housman, Poughkeepsie, Hrand L. Kurkjian, Hyde Park, and Bernard L. Sarahan, Poughkeepsie, N.Y., assignors to International Business Machines Corporation, New York, N.Y., a corporation of New York Filed Sept. 26, 1956, Ser. No. 612,269
1 Claim. (Cl. 340—172.5)

This invention relates to signal storage systems and more particularly to signal storage systems employed in data processing machines.

Various copending patent applications will be referred to in the following specification. Those applications are incorporated herein by reference and are referred to as copending application "A," "B," etc. as follows:

| Reference | Copending Application | | | | |
|---|---|---|---|---|---|
| | Application Serial No. | Now Patent No. | Title | Inventor/s | Filing Date |
| A | 612,265 | ---------- | Data Processing Machine. | M. Astrahan et al. | Filed Concurrently. |
| B | 570,199 | 2,914,248 | Electronic Data Processing Machine. | H. Ross et al. | 3/7/56. |
| C | 477,553 | 2,975,239 | Electromagnetic Eraser. | C. Jackson et al. | 12/24/54. |
| D | 497,848 | 2,975,017 | Optical Frequency Generator. | H. Conkey et al. | 3/30/55. |
| E | 494,982 | ---------- | Magnetic Data Storage. | R. Everett et al. | 3/17/55. |
| F | 414,459 | ---------- | Electronic Digital Computer. | B. Sarahan et al. | 3/5/54. |
| G | 474,346 | 2,954,528 | Monostable Multivibrator. | W. Jackman | 12/10/54. |

In data processing machines it is important that transfers of signals to and from the main memory device of the machine be made with a minimum interruption to other operations of the machine. In large scale data processing machines it has been common practice to employ auxiliary memory devices of slower speed than the main memory device. Since the auxiliary memory devices are of relatively slower speed they may be less expensive and more easily manufactured. In computers heretofore employing auxiliary memory devices, signal transfers between the auxiliary memory and the main memory were accomplished by means of an instruction for each signal transfer which was to take place. In many operations, however, complete blocks of information are transferred between main memory and the auxiliary memory. Therefore it would be desirable that a single instruction effect a transfer in block form, and furthermore it would be desirable that the size of the block, that is the number of signal transfers to be made, be variable and a given instruction merely specify the size of the block. In data processing machines employing auxiliary memory devices it is conventional to employ an addressable type of auxiliary memory with a given record placed in the addressable storage at successive addresses, the number of addresses employed being dependent upon the size of the record.

A data processing machine capable of making block type of signal transfers between main memory and other storage devices is shown and described in copending patent application "A." The storage devices disclosed in that application are not, however, of the addressable type such as that commonly employed as auxiliary memory of data processing machines. It is a purpose of this invention to provide a storage system of the addressable type which may be used in a data processing machine, and information transfers to and from the addressable storage may take place in a block type of transfer. That is, the instruction establishes the number of words to be involved in the transfer and further establishes the address of the first word to be transferred from one memory device and the address in another memory device to which the first word is to be sent.

It is an object of this invention to provide an improved signal storage system for data processing machines.

It is another object of this invention to provide an improved signal storage system for data processing machines wherein signals may be transferred in either direction between the main memory of the data processing machine and an addressable auxiliary storage, and these transfers may be automatically effected on a block basis.

It is still another object of this invention to provide an improved data processing machine of the stored program type wherein signal transfers between the main memory of the data processing machine and an auxiliary addressable signal storage device are effected by a control device which receives identifying information from the instruction signals of the stored program.

It is a further object of this invention to provide an improved data processing machine of the stored program type wherein signal transfers between the main memory of the data processing machine and an auxiliary addressable signal storage device may be automatically effected on a block basis.

It is a still further object of this invention to provide an improved data processing machine wherein the number of signal transfers which are made between the main memory of the data processing machine and an addressable auxiliary storage are counted and when a predetermined count has been reached, further transfers are prevented.

Another object of this invention is to provide an improved data processing machine wherein an input-output control is provided which is responsive to instruction signals and in response to those instruction signals effects a selectable number of signal transfers between a main memory and an auxiliary addressable memory and means are provided to sense whether or not said selectable number of transfers have been effected since last instructed.

A further object of this invention is to provide an apparatus wherein a variable number of words may be transferred between predetermined data storage locations to other predetermined data storage locations with unlimited flexibility.

A still further object of the invention is to provide an improved signal transfer control for a data processing machine wherein a selectable number of signal transfers may be effected between a series of signal storage locations in one memory and a series of signal storage locations in another memory.

Other objects of the invention will be pointed out in the following description and claims and illustrated in the accompanying drawings, which disclose, by way of example, the principle of the invention and the best mode, which has been contemplated, of applying that principle.

In the drawings:

FIGS. 1*a* through 1*c*, when ararnged side by side from left to right in that order, are a schematic diagram in block form of a signal storage system illustrating the principes of this invention.

FIG. 1*d* is a simplified block diagram of a computing device constructed in accordance with the principles of this invention.

Figure 5A:
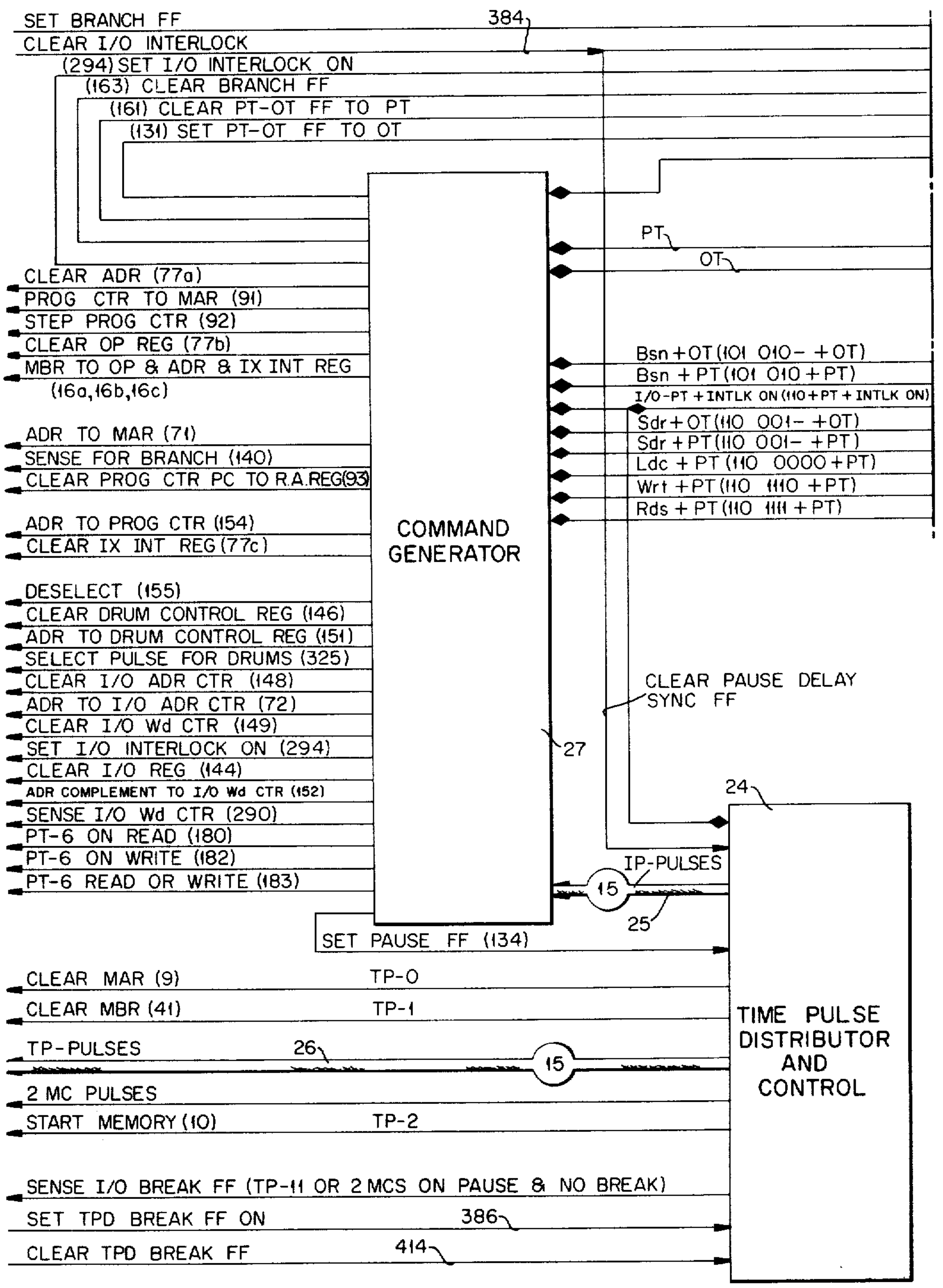
Figure 5B:
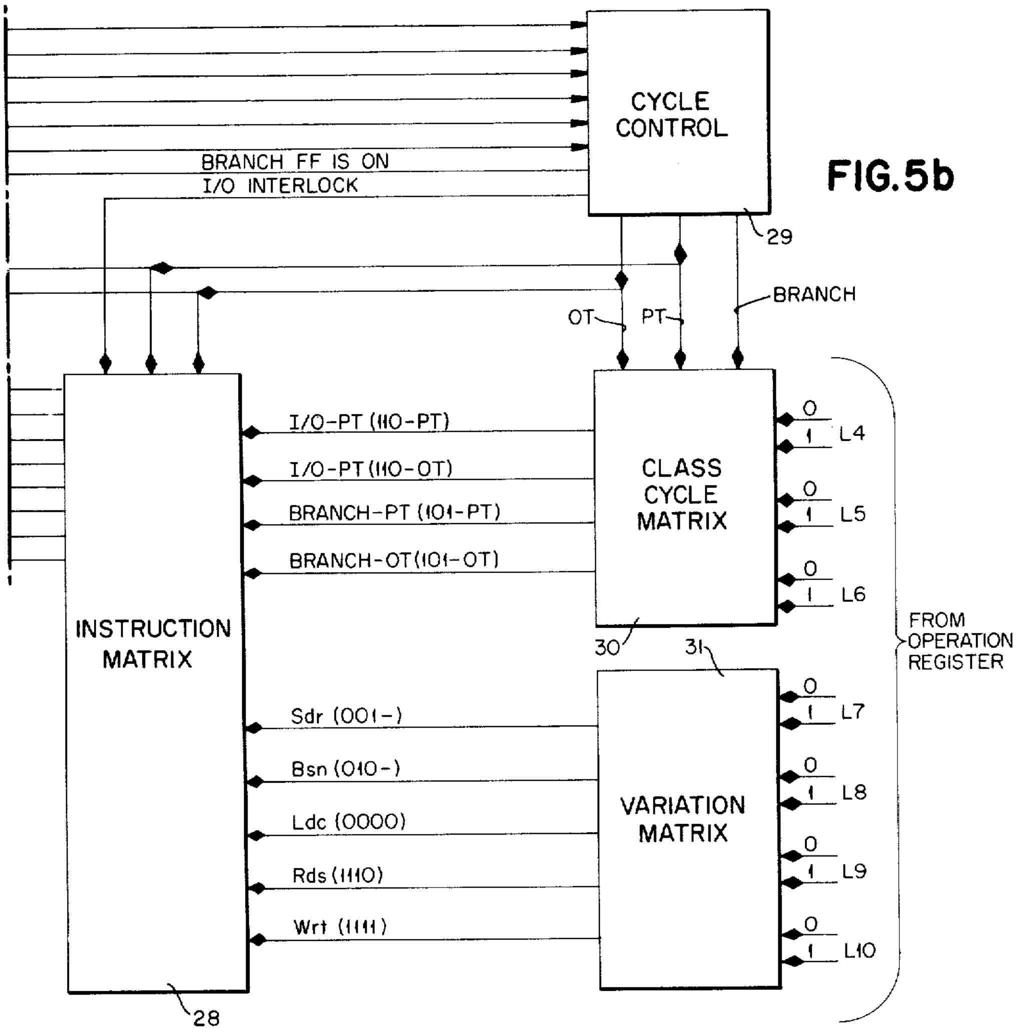

FIGS. 5*a* and 5*b*, when arranged side by side from left to right in that order, illustrate in block schematic instruction control and command generation equipment.

Figure 6A:
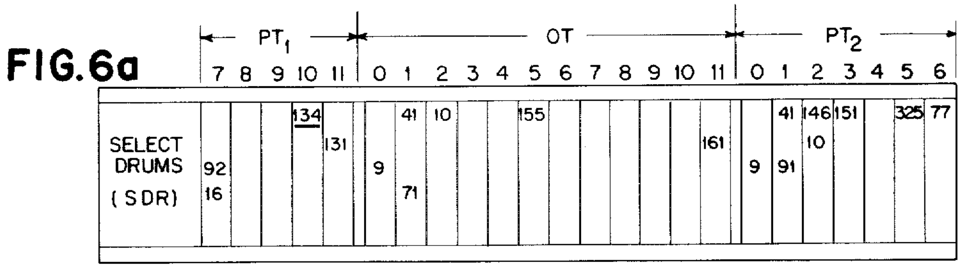
Figure 6B:
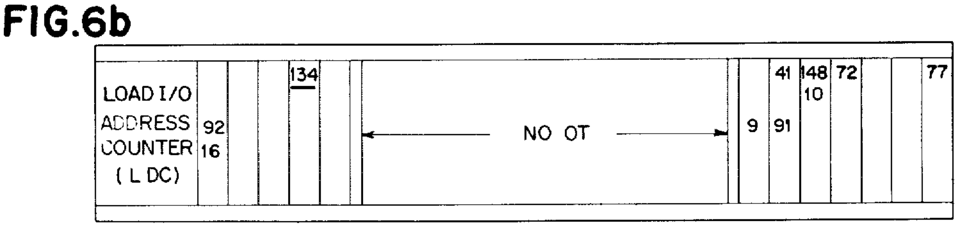

FIGS. 6*a* through 6*b* are timing charts that indicate the order in which commands are generated during the various instructions shown.

Figure 7:
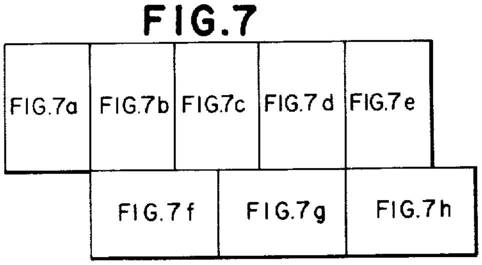

FIG. 7 indicates the arrangement of drawings for FIGS. 7*a* through 7*h*.

Figure 1A:
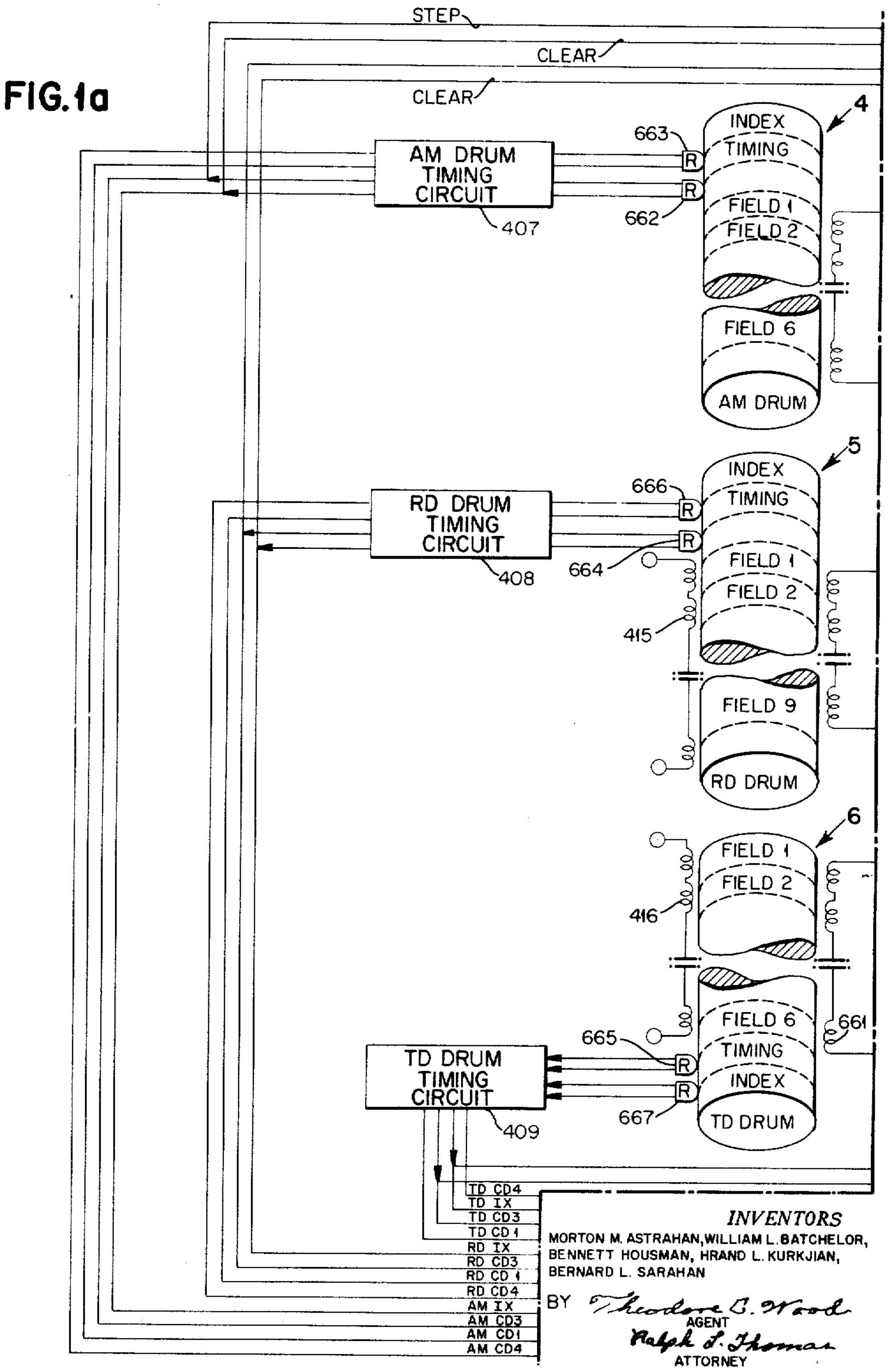
Figure 1B:
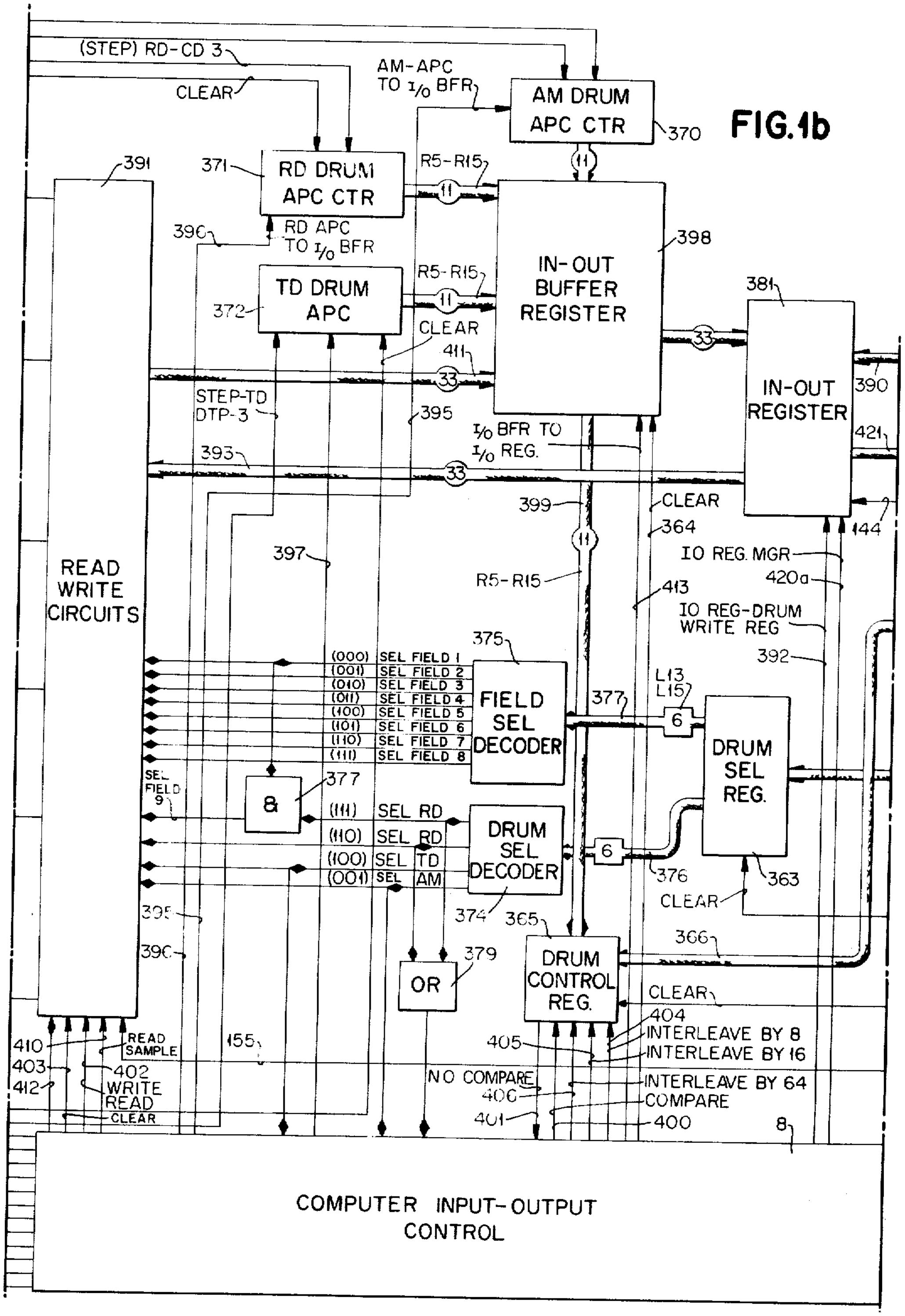
Figure 1C:
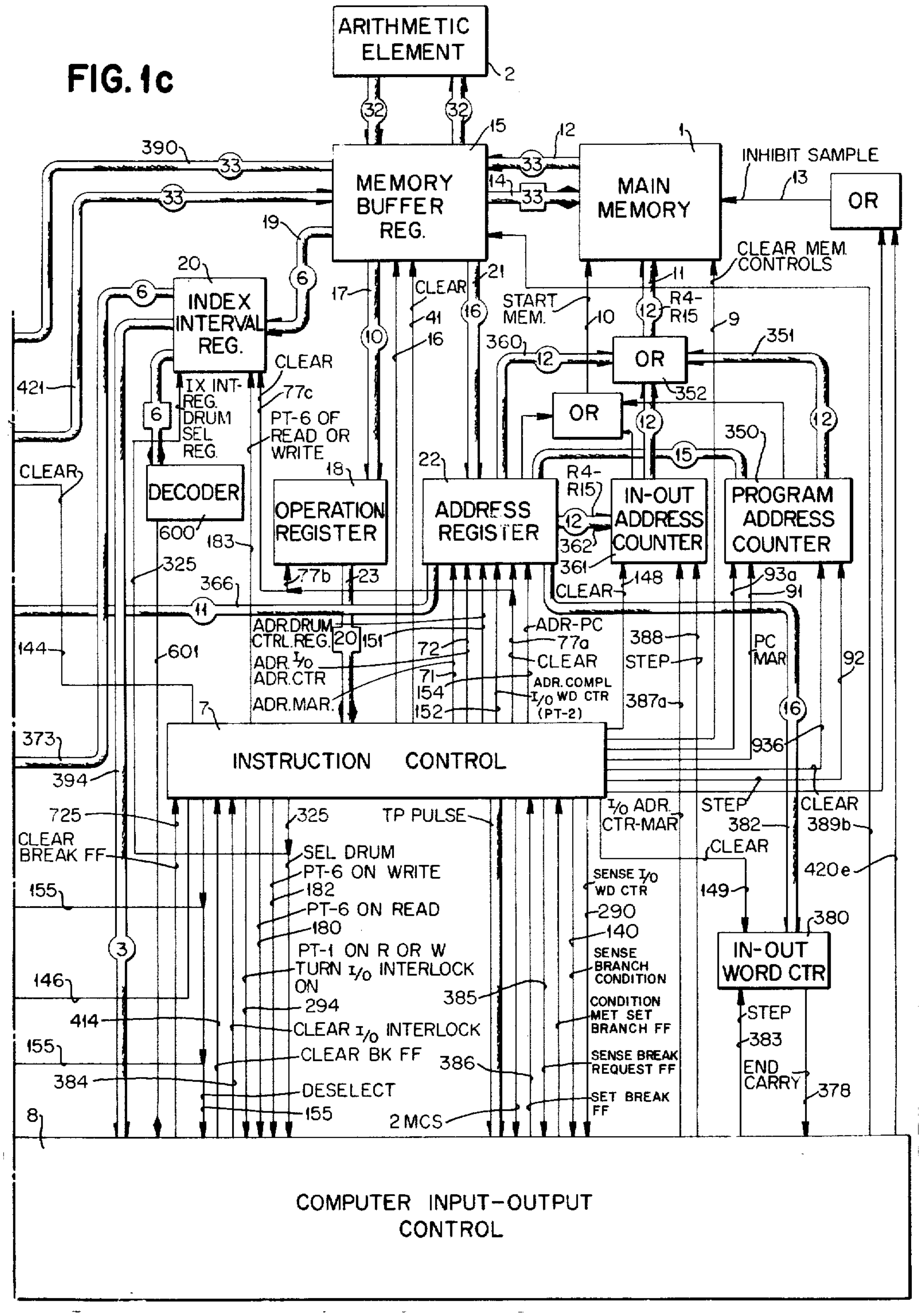

FIGS. 7*a* through 7*h* illustrate in logical block schematic form the details of the computer input-output control shown as a block in FIGS. 1*b* and 1*c*.

FIG. 8 is a schematic diagram partly in logical block form of the read-write circuits shown as block 391 in FIG. 1*b*.

Figure 9:
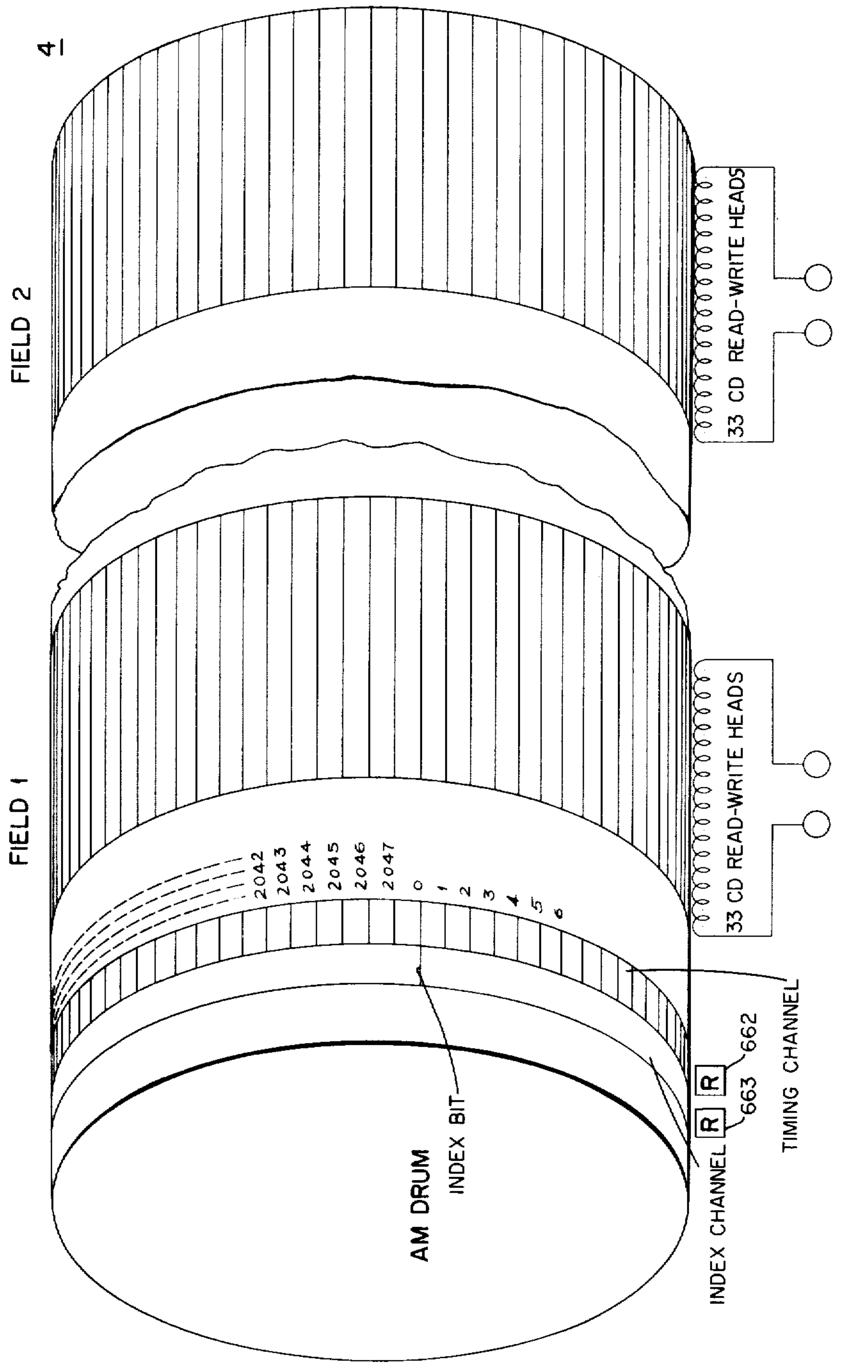

FIG. 9 is a schematic diagram which illustrates in relative positions of the timing, index and data channels of the AM drum.

Figure 10:
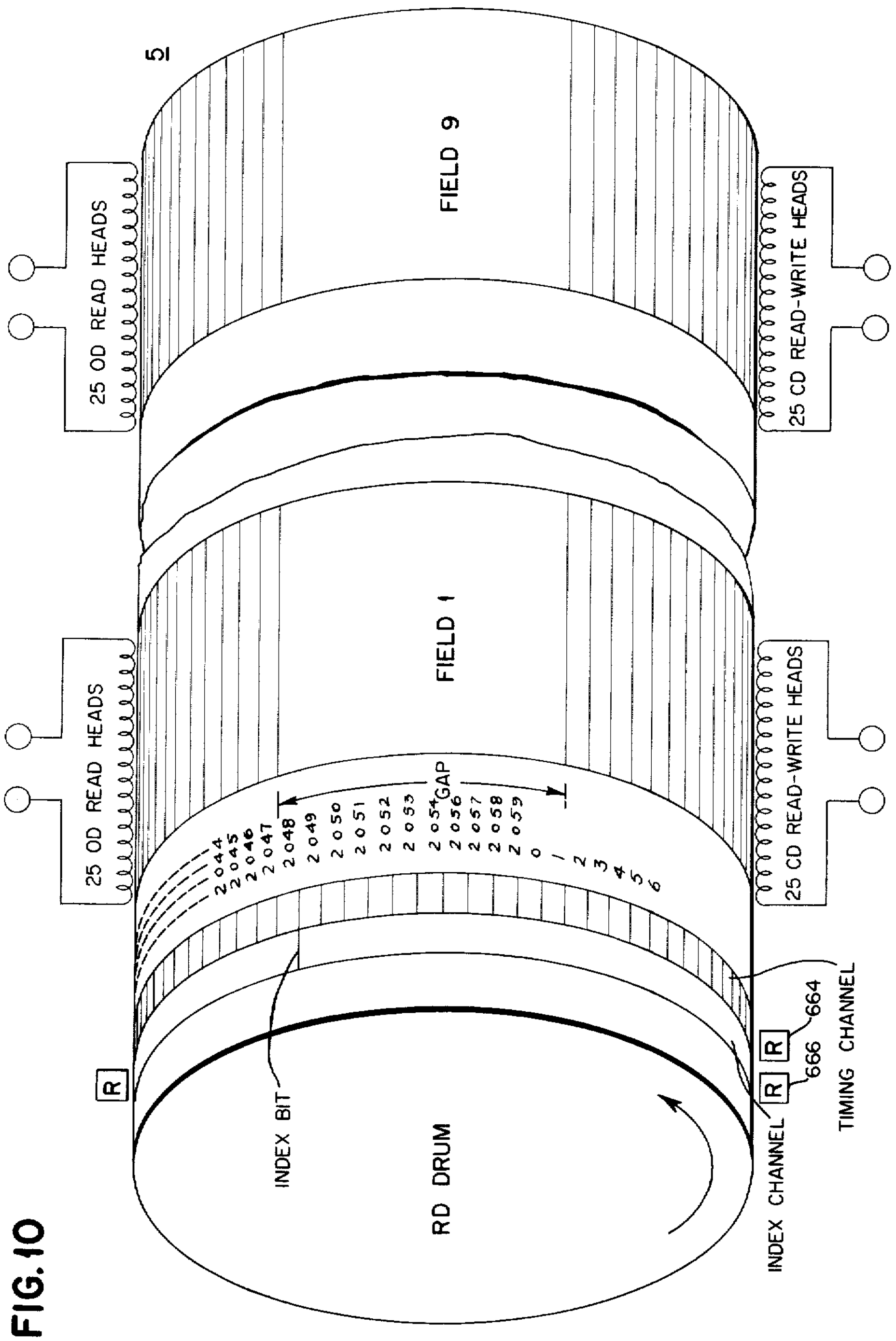

FIG. 10 is a schematic diagram which illustrates in relative positions of the timing, index and data channels of the RD drum.

Figure 11:
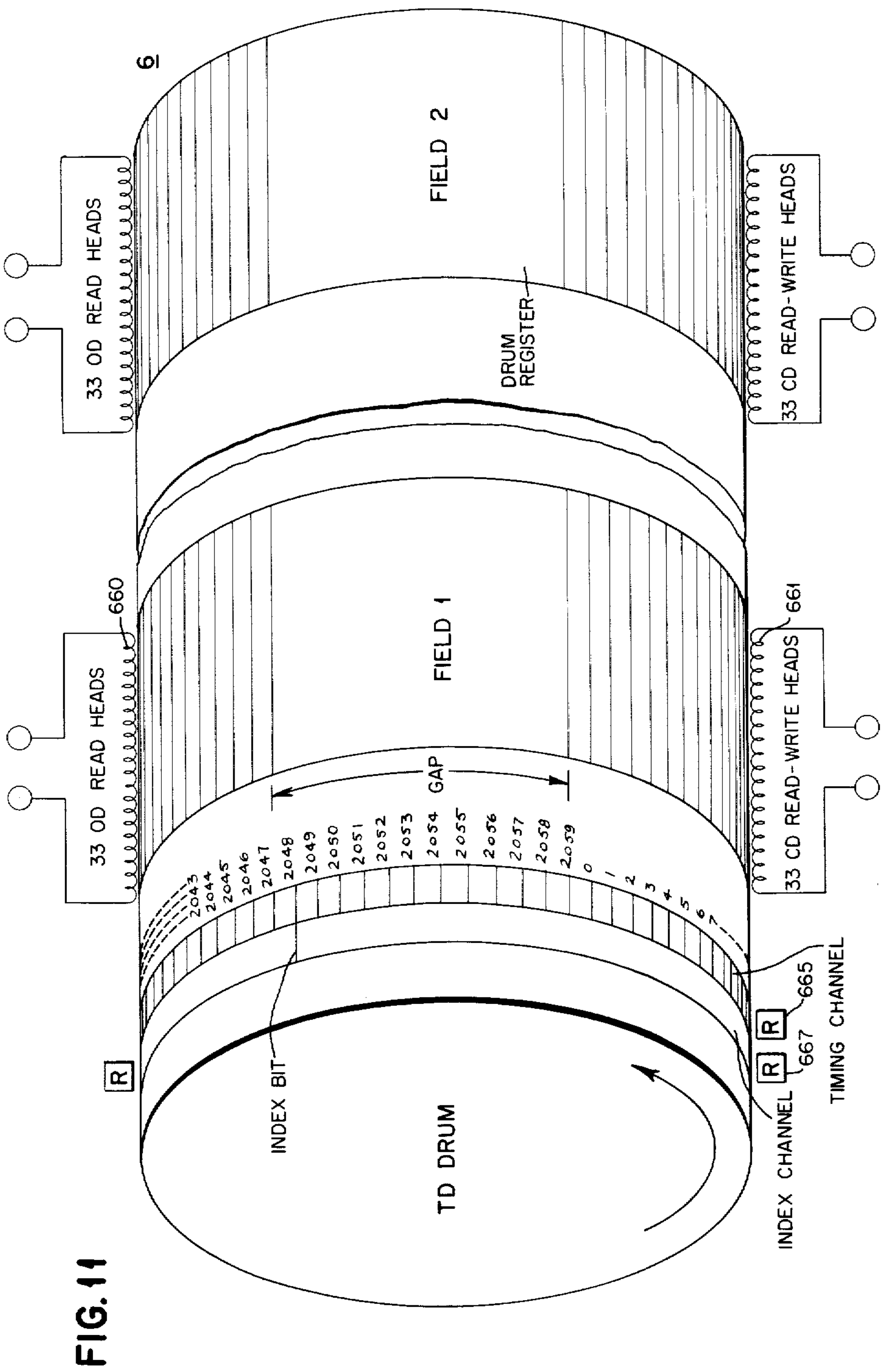

FIG. 11 is a schematic diagram which illustrates in relative positions of the timing, index and data channels of the TD drum.

Figure 12:
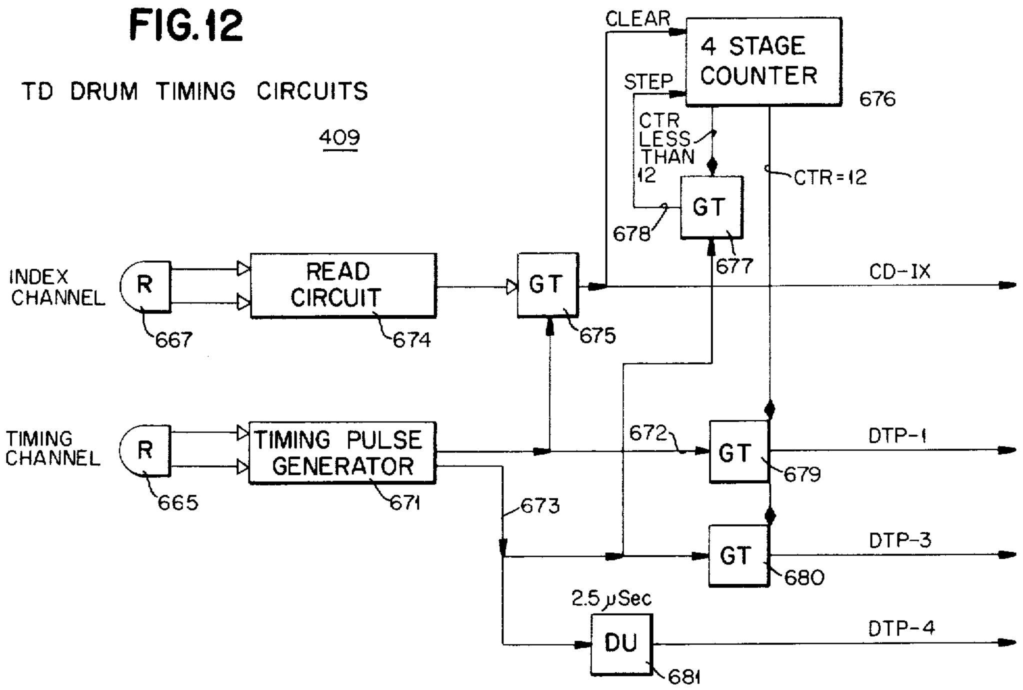

FIG. 12 is a block diagram partly in logical block form of the RD drum timing circuit shown as block 408 in FIG. 1*a*.

Figure 13A:
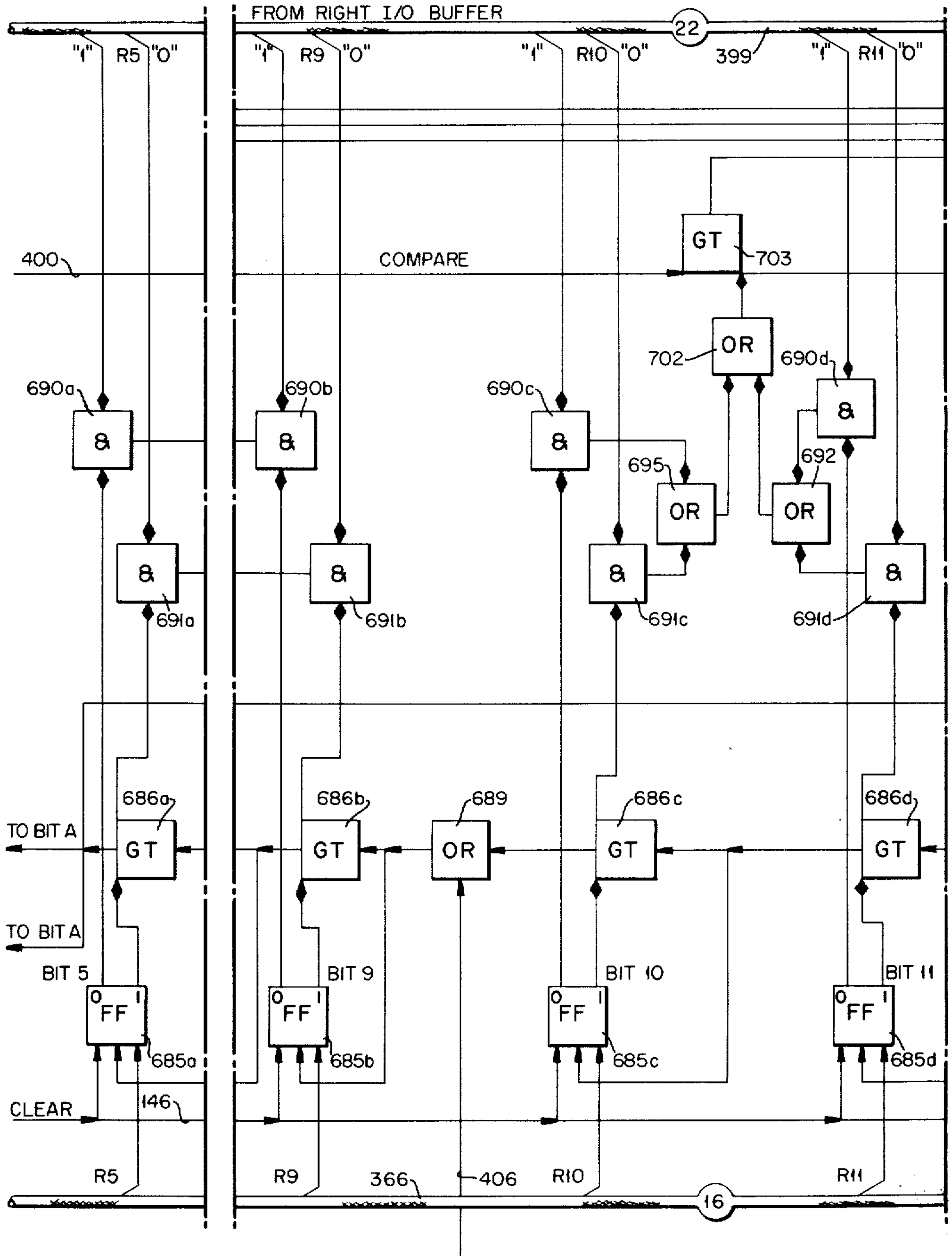
Figure 13B:
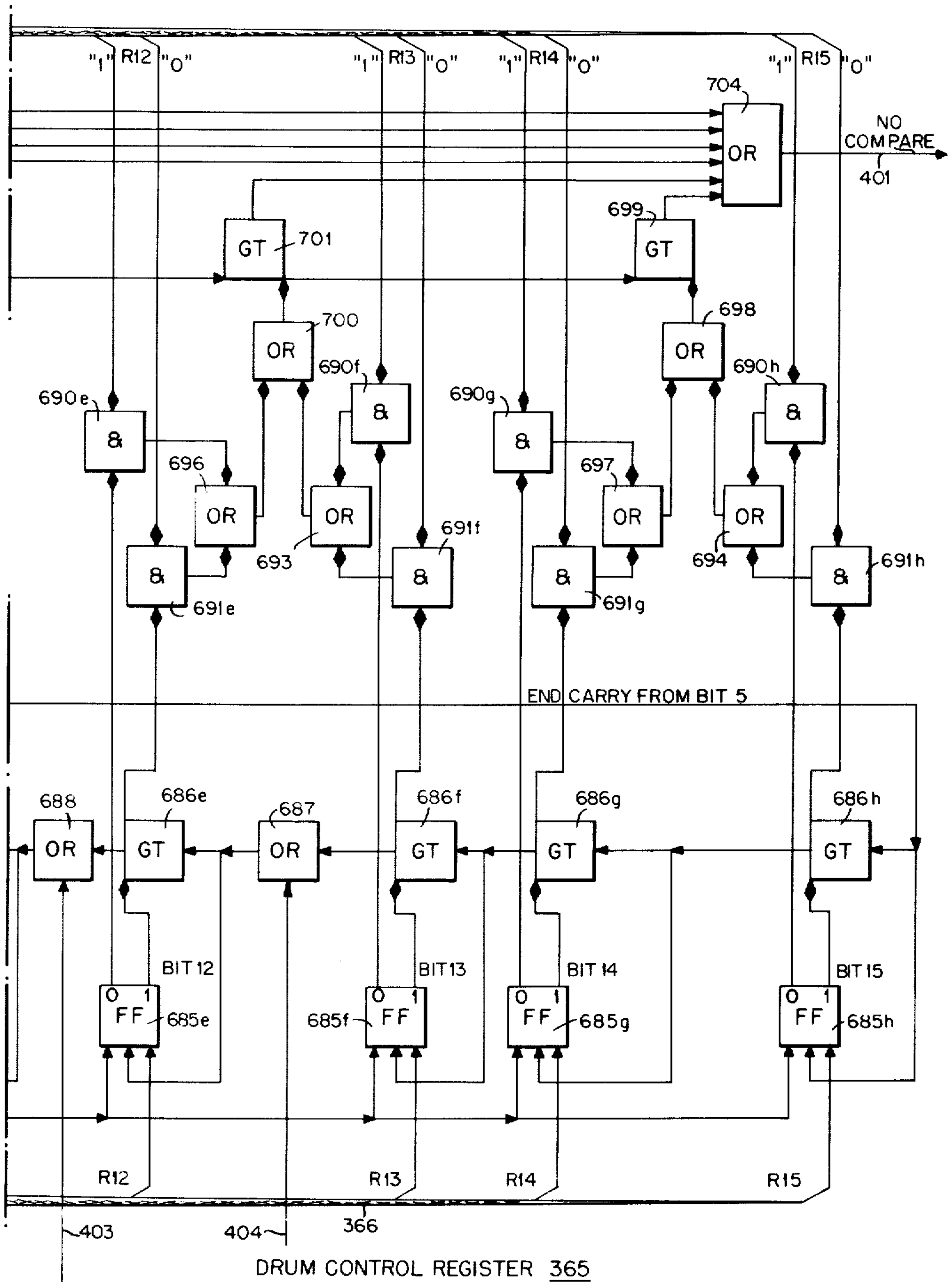

FIGS. 13*a* and 13*b* when arranged one above the other, illustrate in logical block form the drum control register shown as block 365 in FIG. 1*b*.

Figure 14:
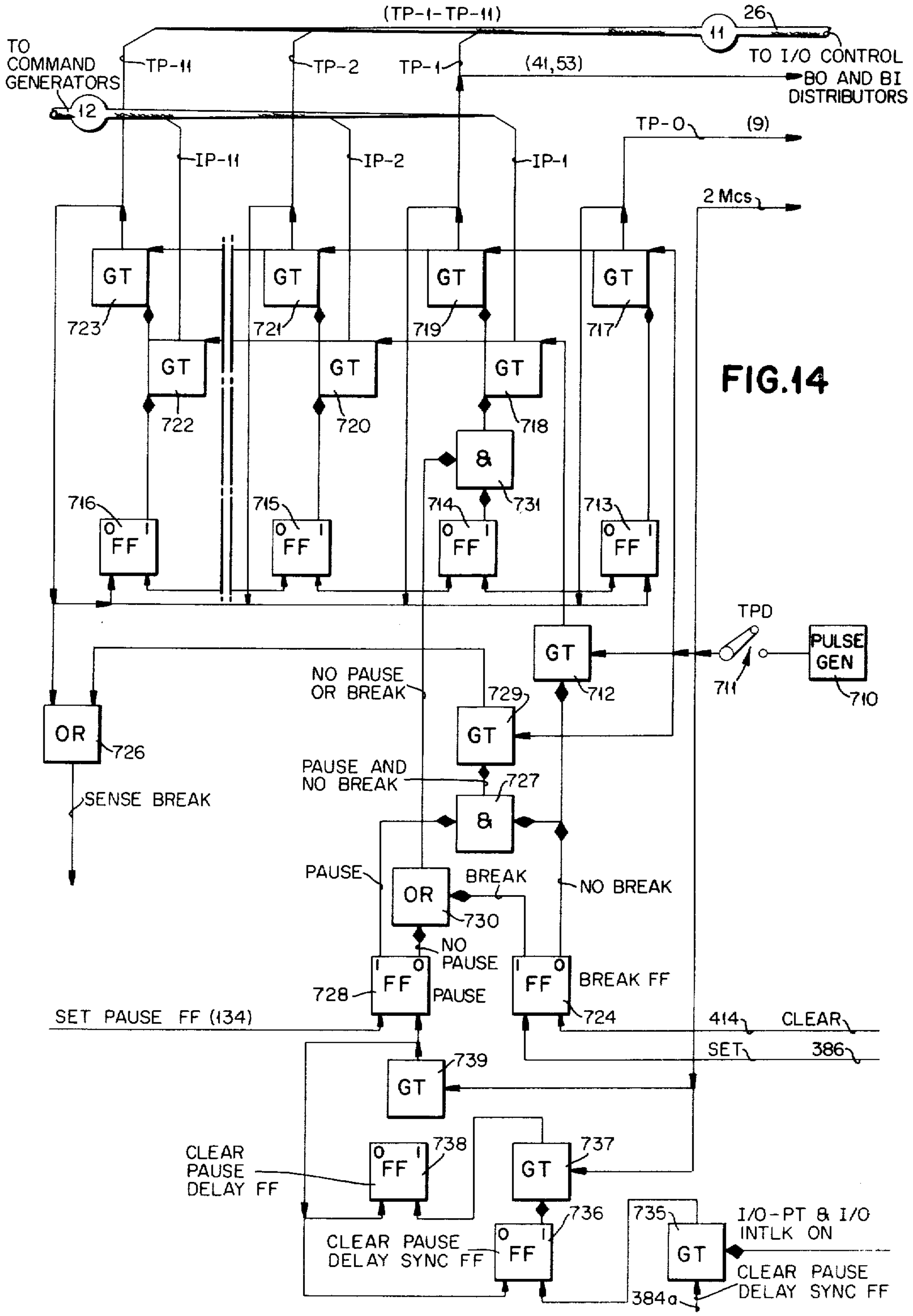

FIG. 14 is a logical block diagram of the time pulse distributor control shown as block 24 in FIG. 5*a*.

Figure 15:
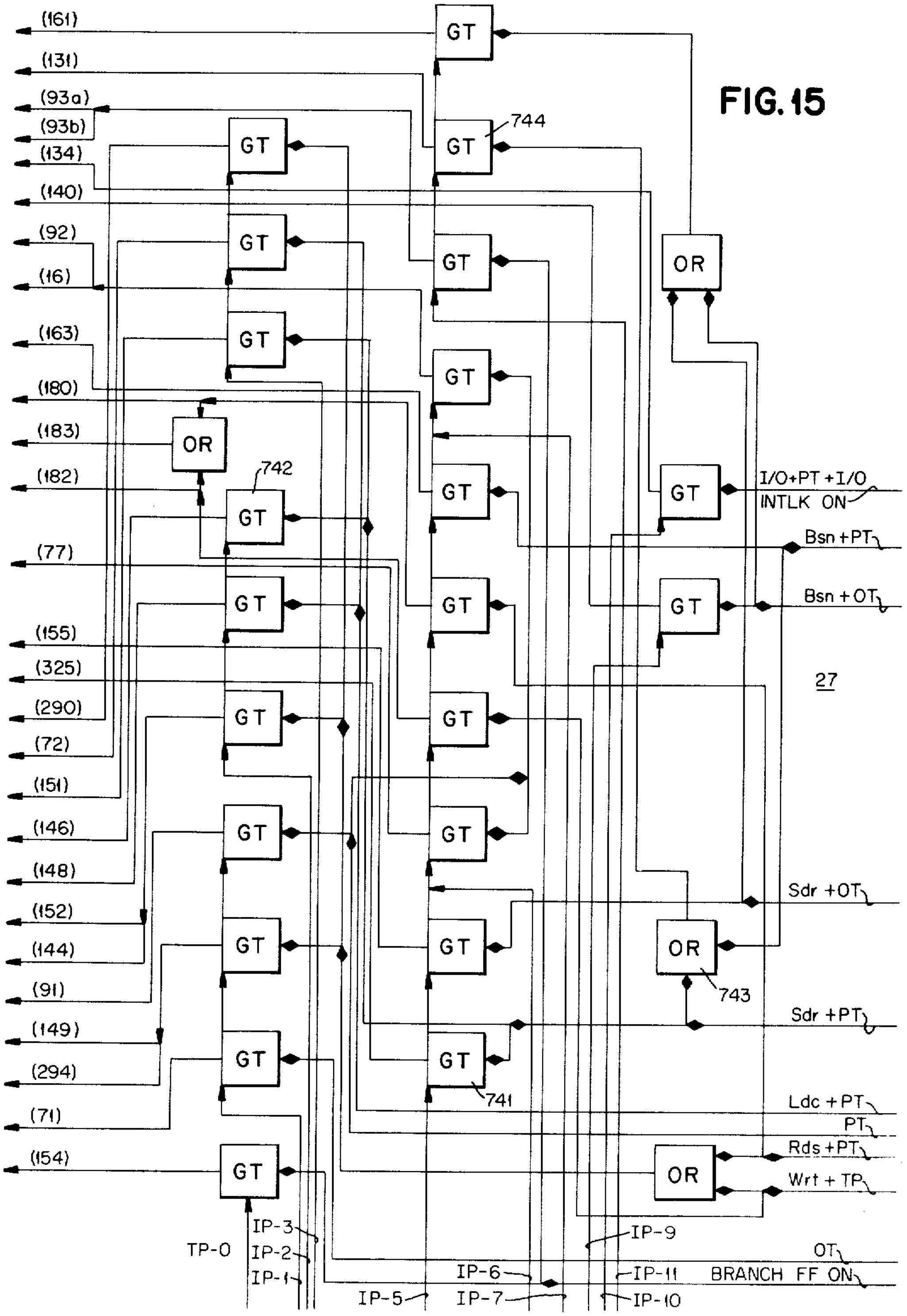

FIG. 15 is a schematic diagram in logical block form of the command generator shown as block 27 in FIG. 5*a*.

Figure 16:
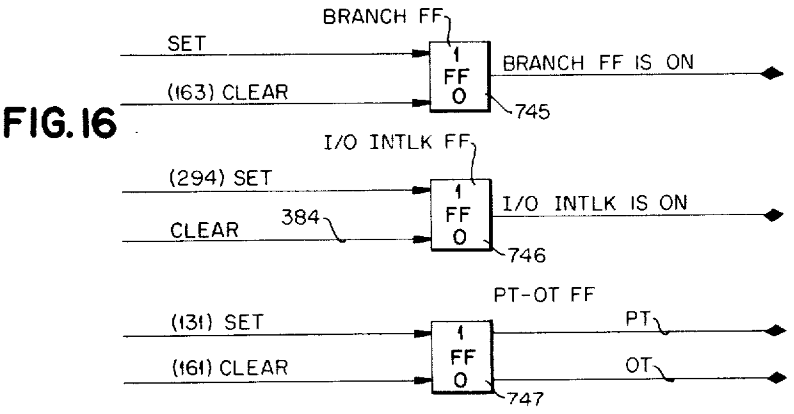

FIG. 16 is a schematic diagram in logical block form of the cycle control shown as block 29 in FIG. 5*b*.

Figure 8A:
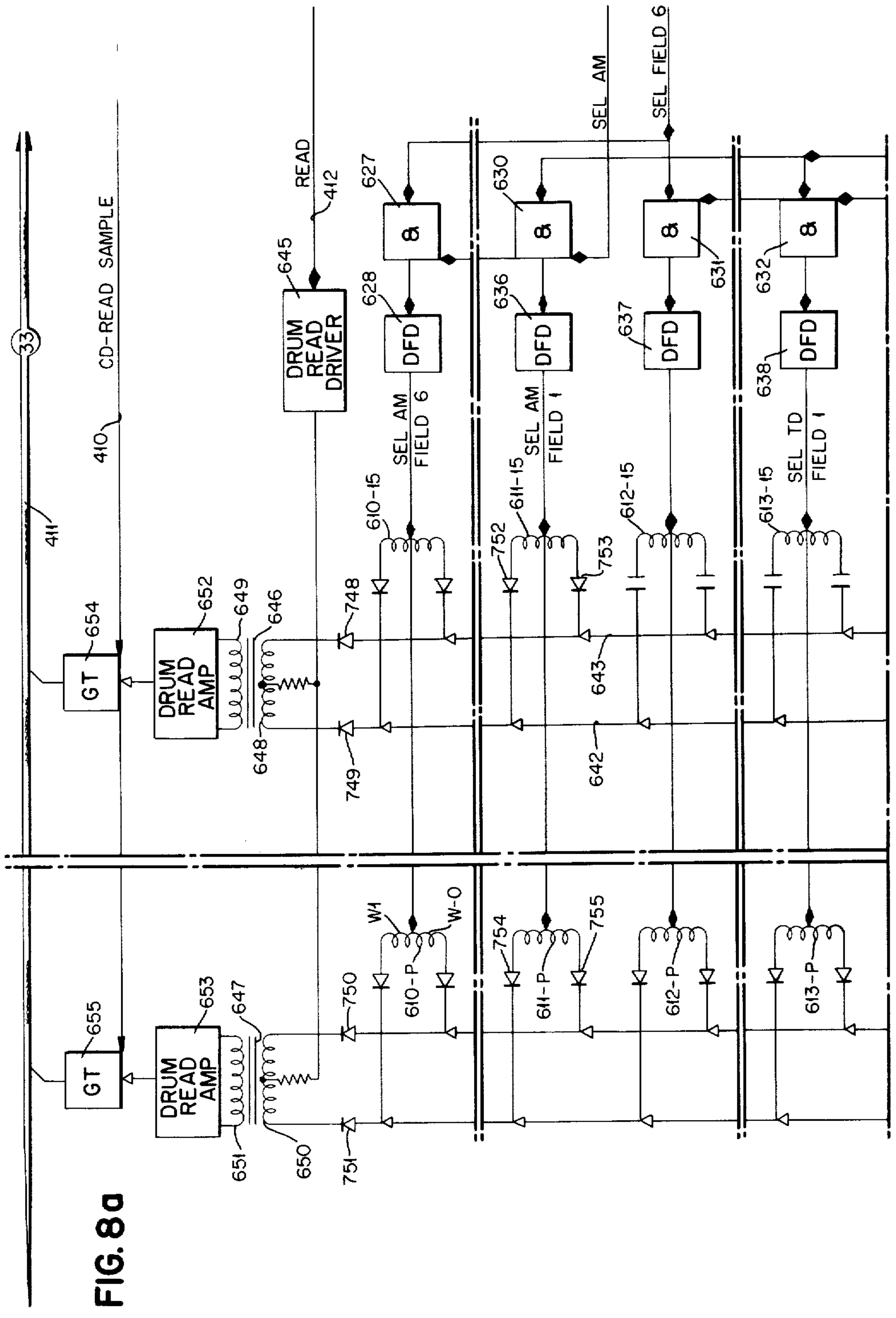
Figure 17:
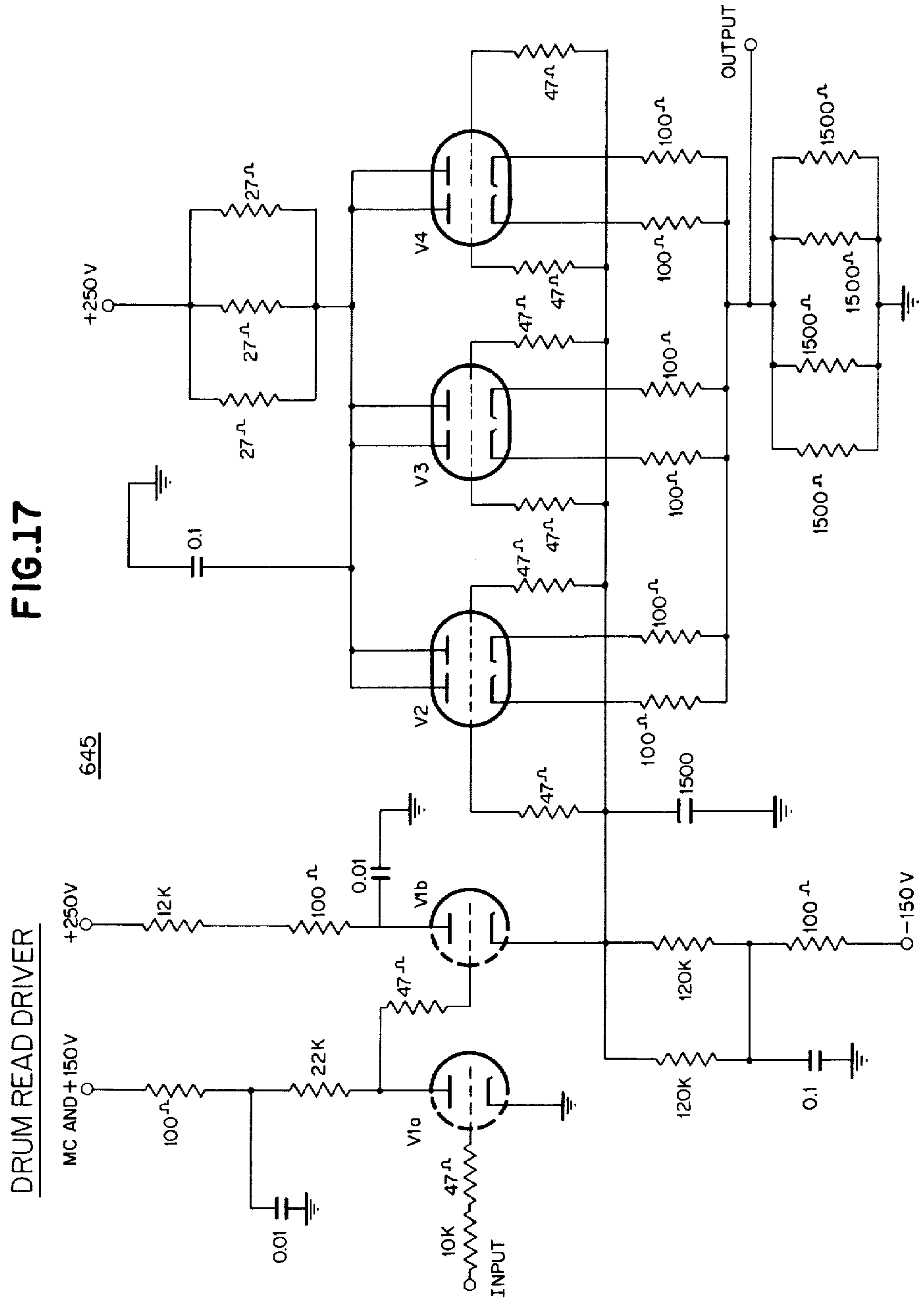

FIG. 17 is a circuit schematic diagram of the drum read driver shown as block 645 in FIG. 8*a*.

Figure 18:
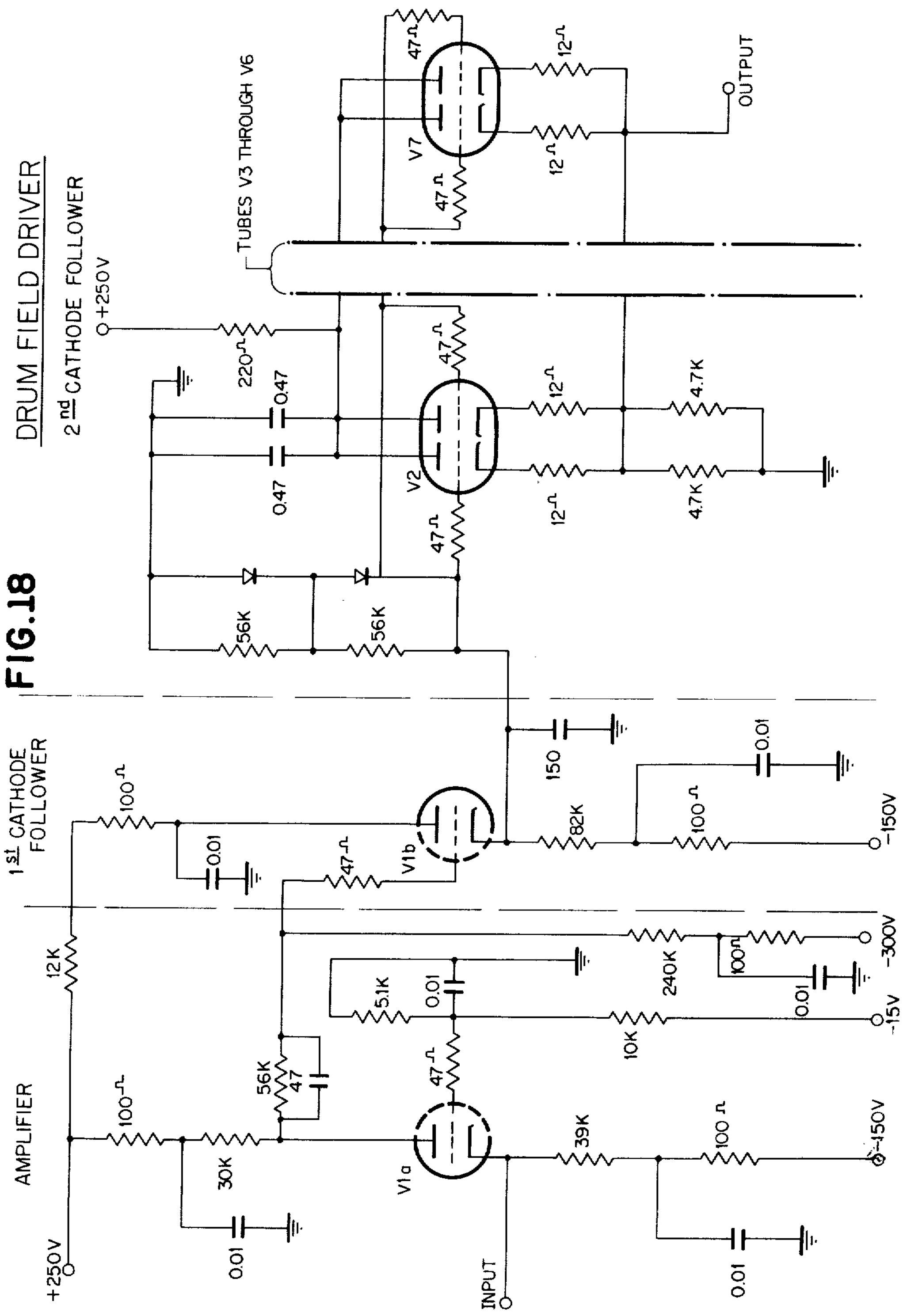

FIG. 18 is a circuit schematic diagram of the drum field driver shown as block 636 in FIG. 8*a*.

Figure 7A:
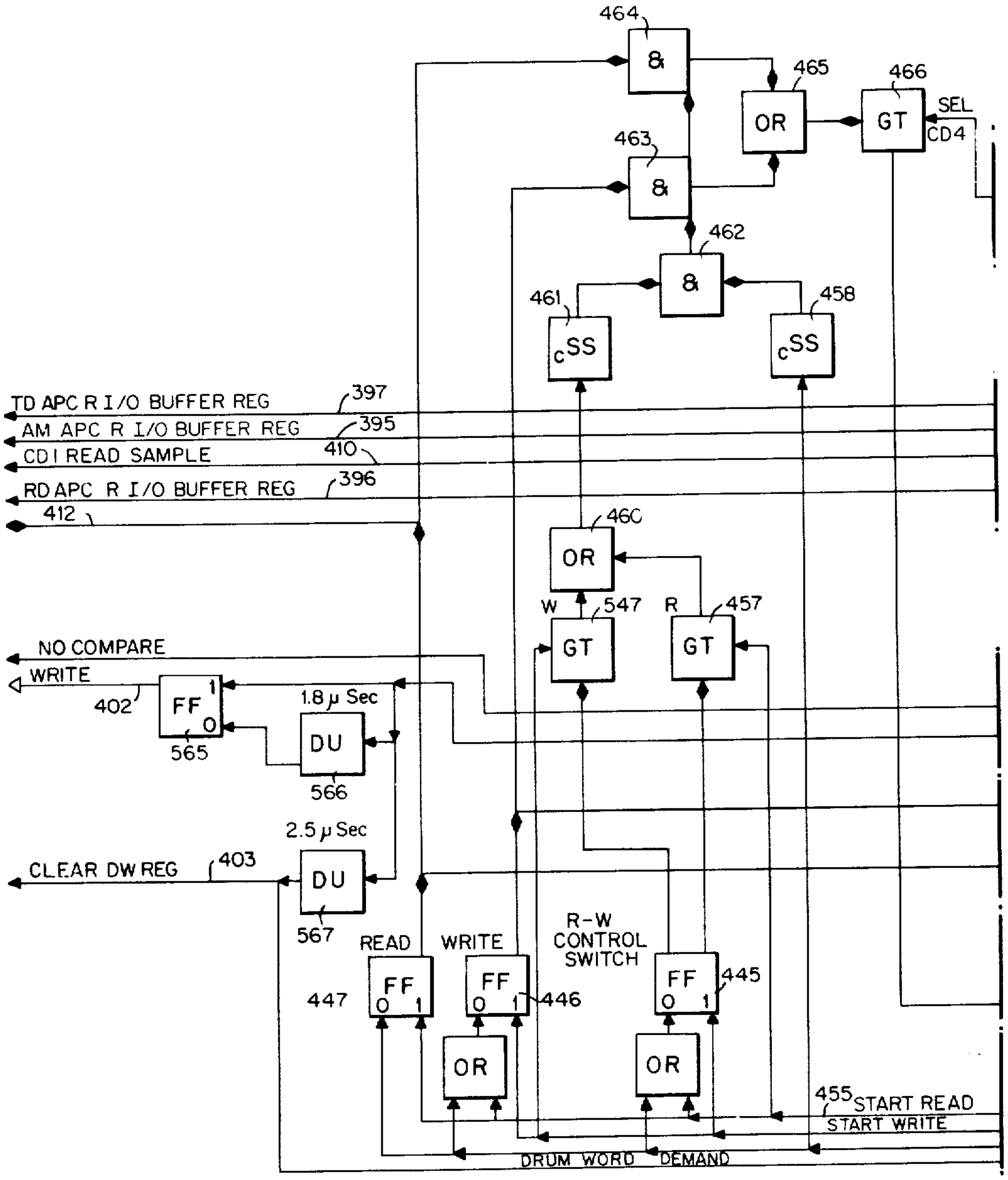
Figure 7B:
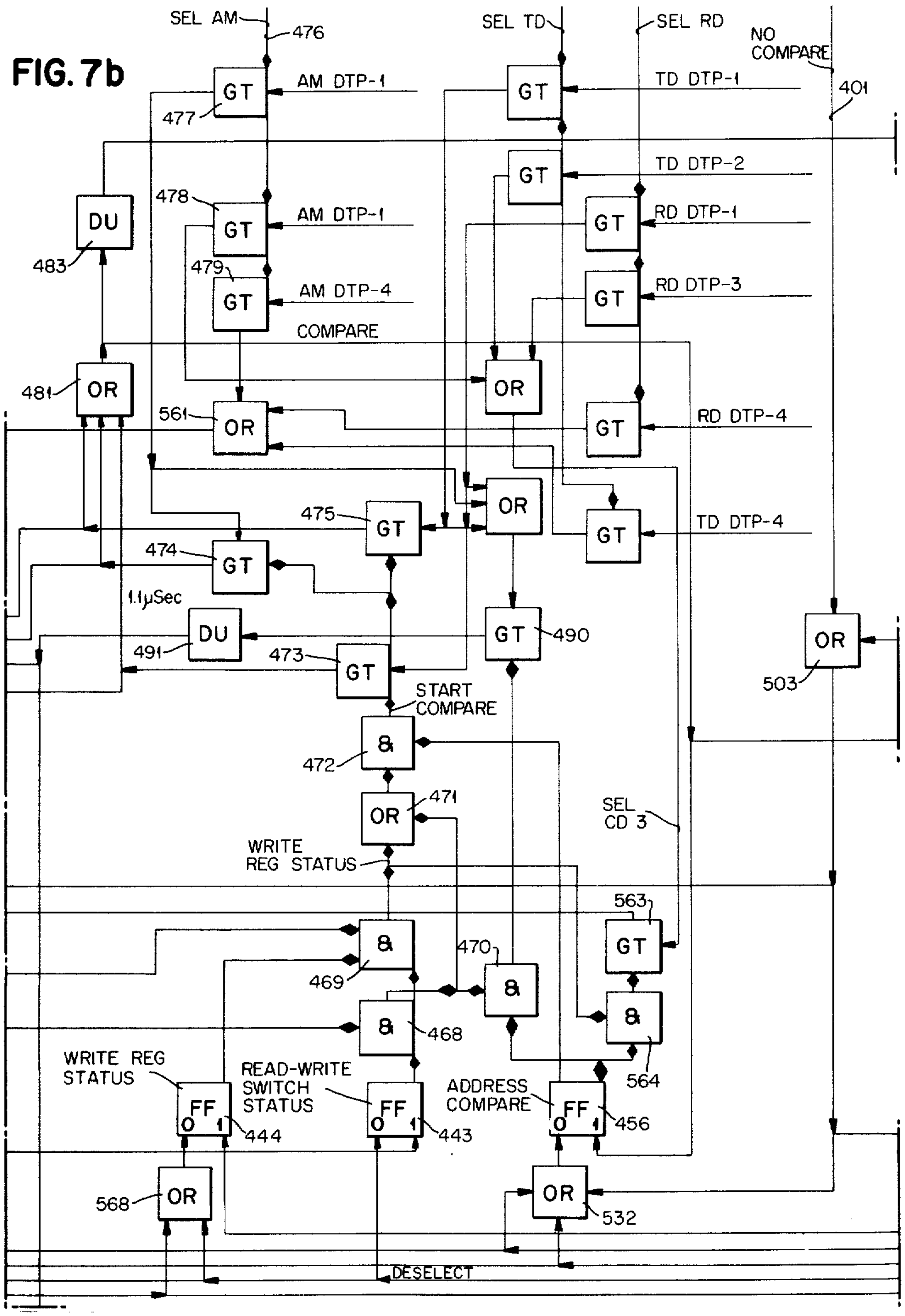
Figure 7C:
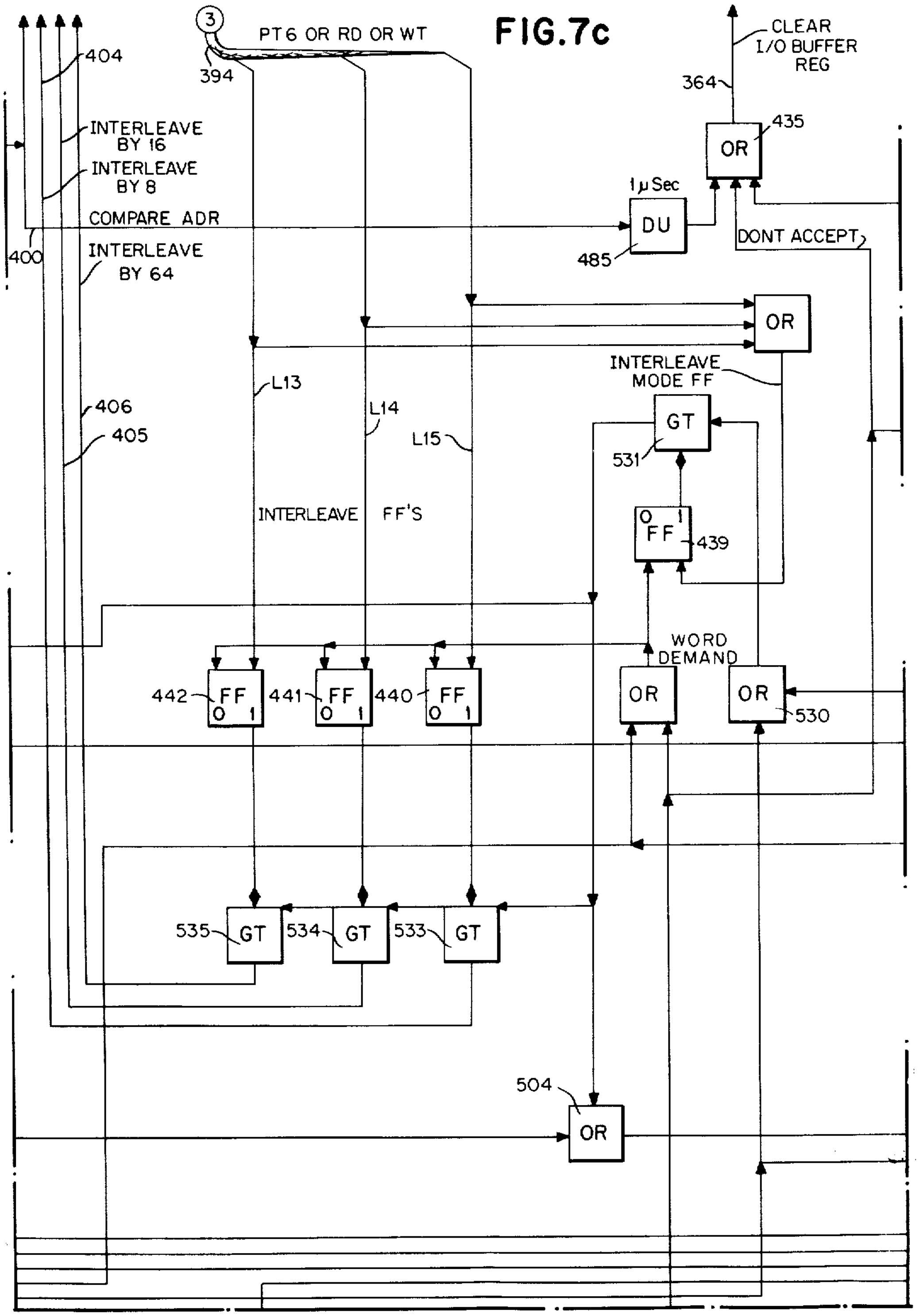
Figure 7D:
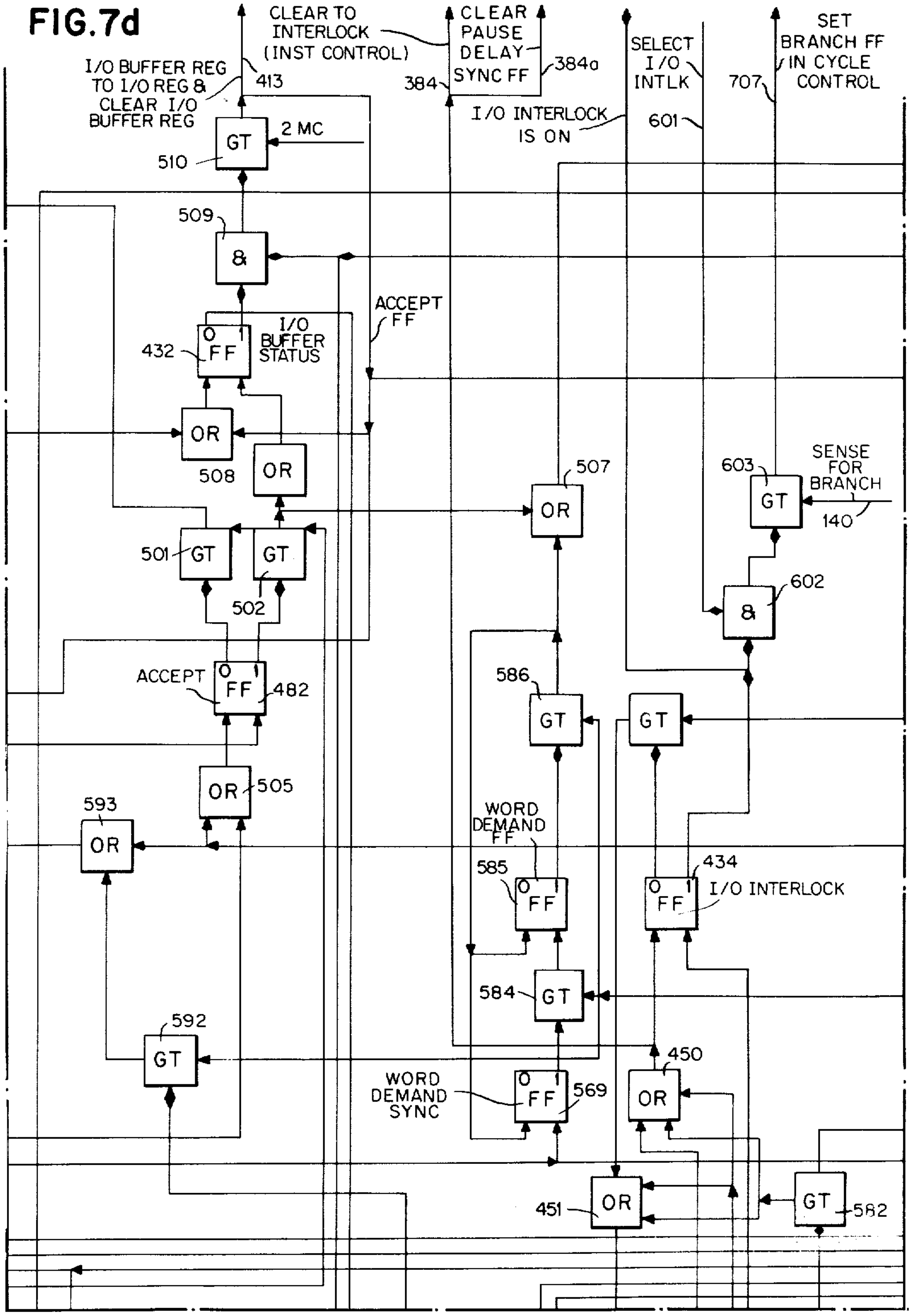
Figure 7E:
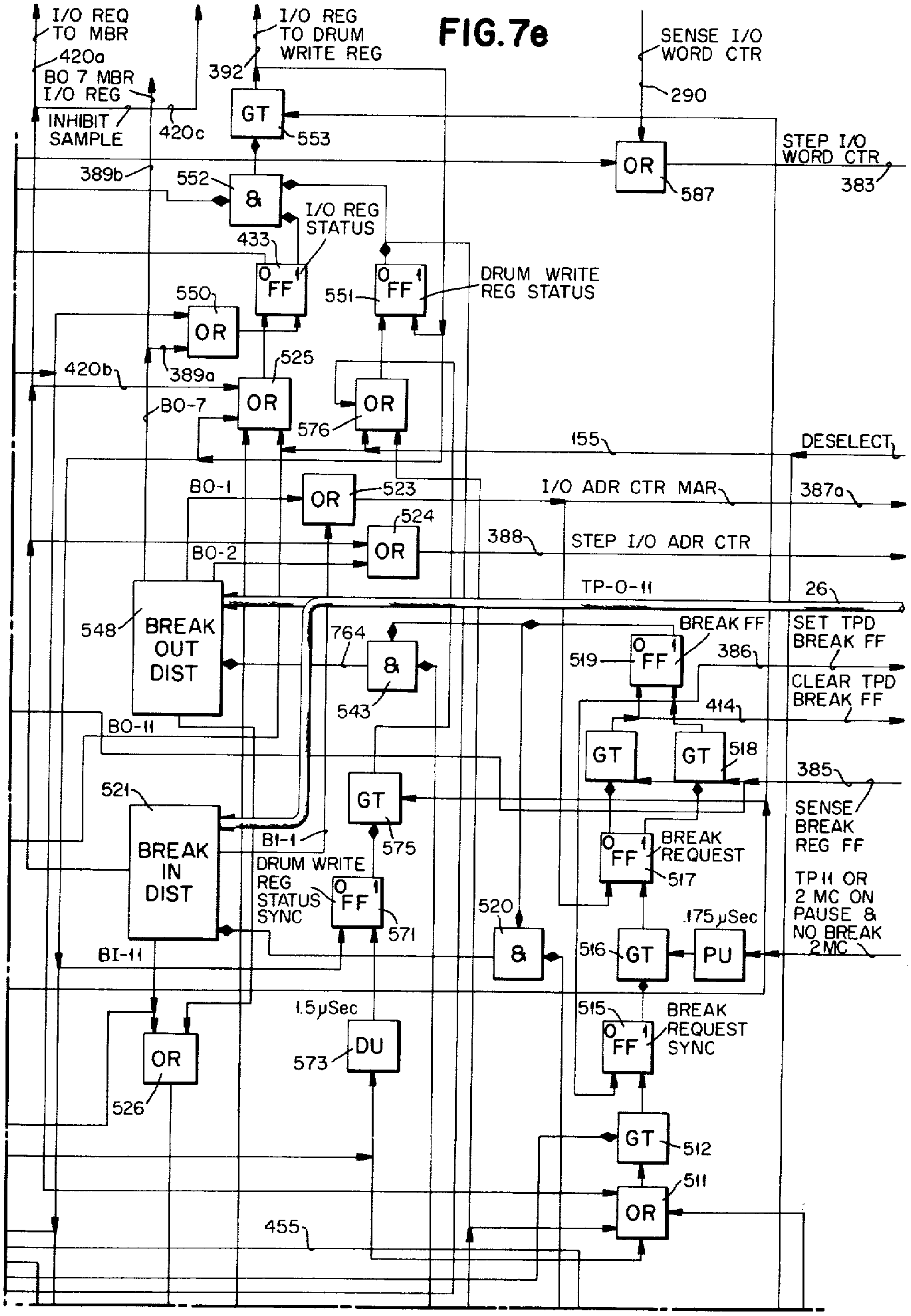
Figure 7F:
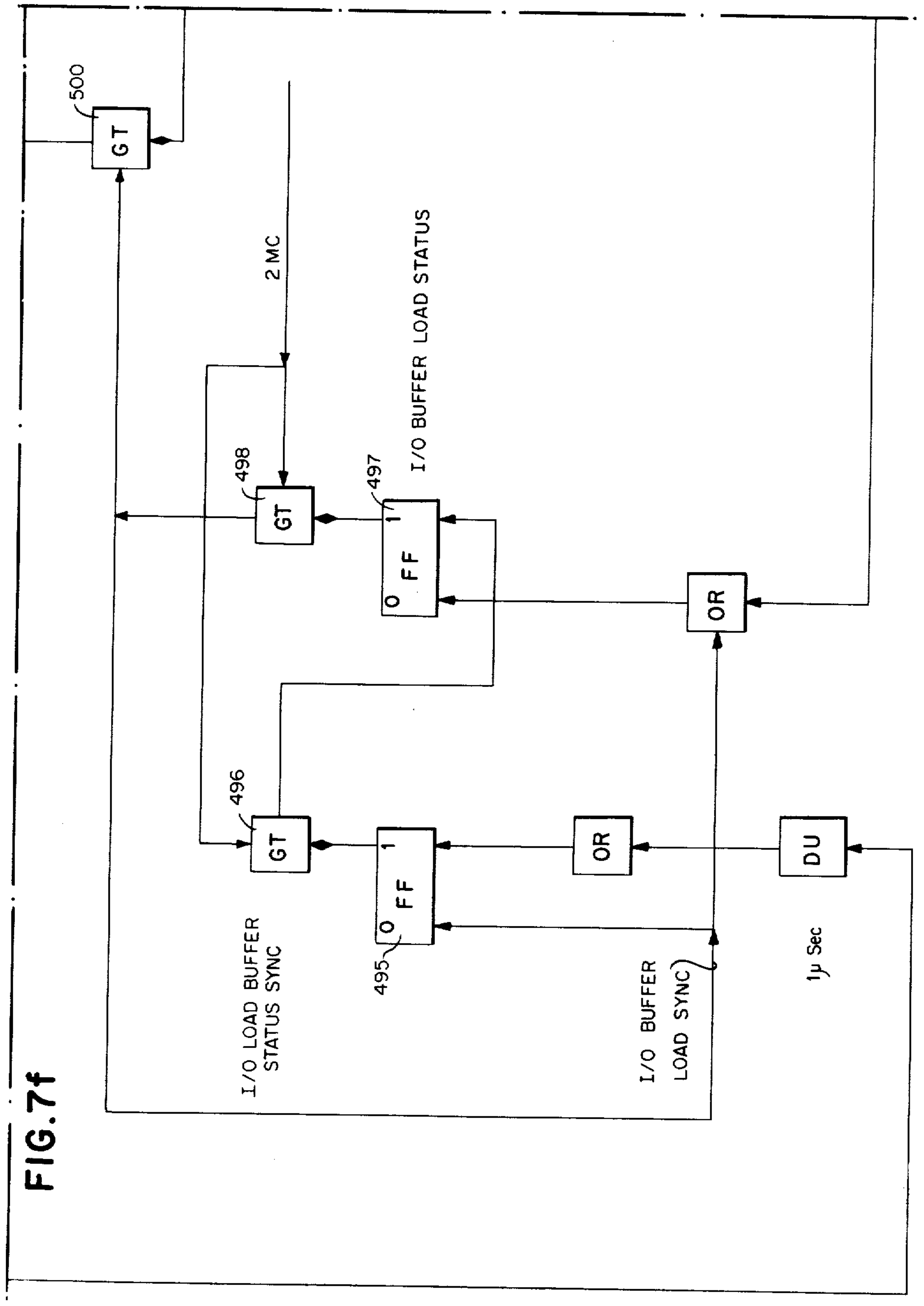
Figure 19:
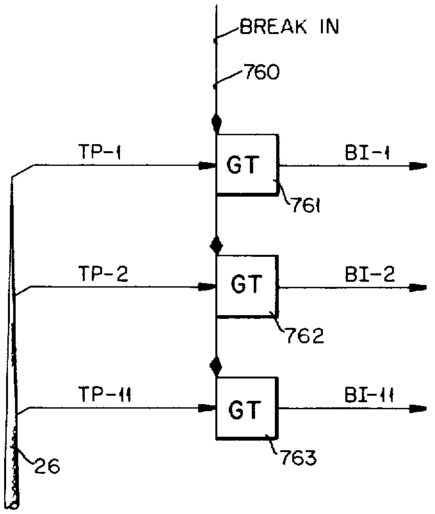

FIG. 19 is a logical block diagram of the break-in distributor shown as block 520 in FIG. 7*e*.

Figure 20:
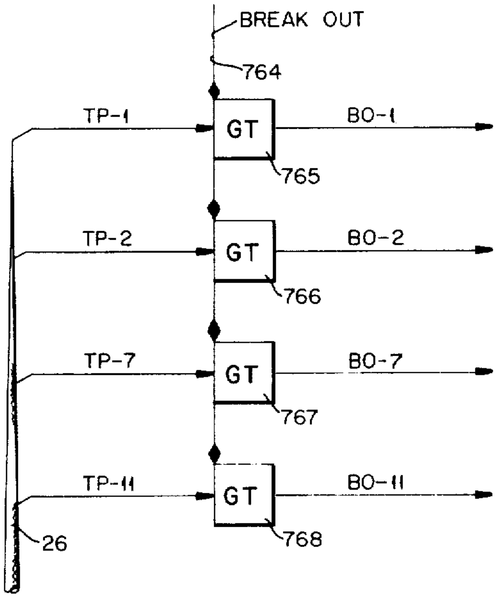

FIG. 20 is a logical block diagram of the break-out distributor shown as block 548 in FIG. 7*e*.

Figure 21:
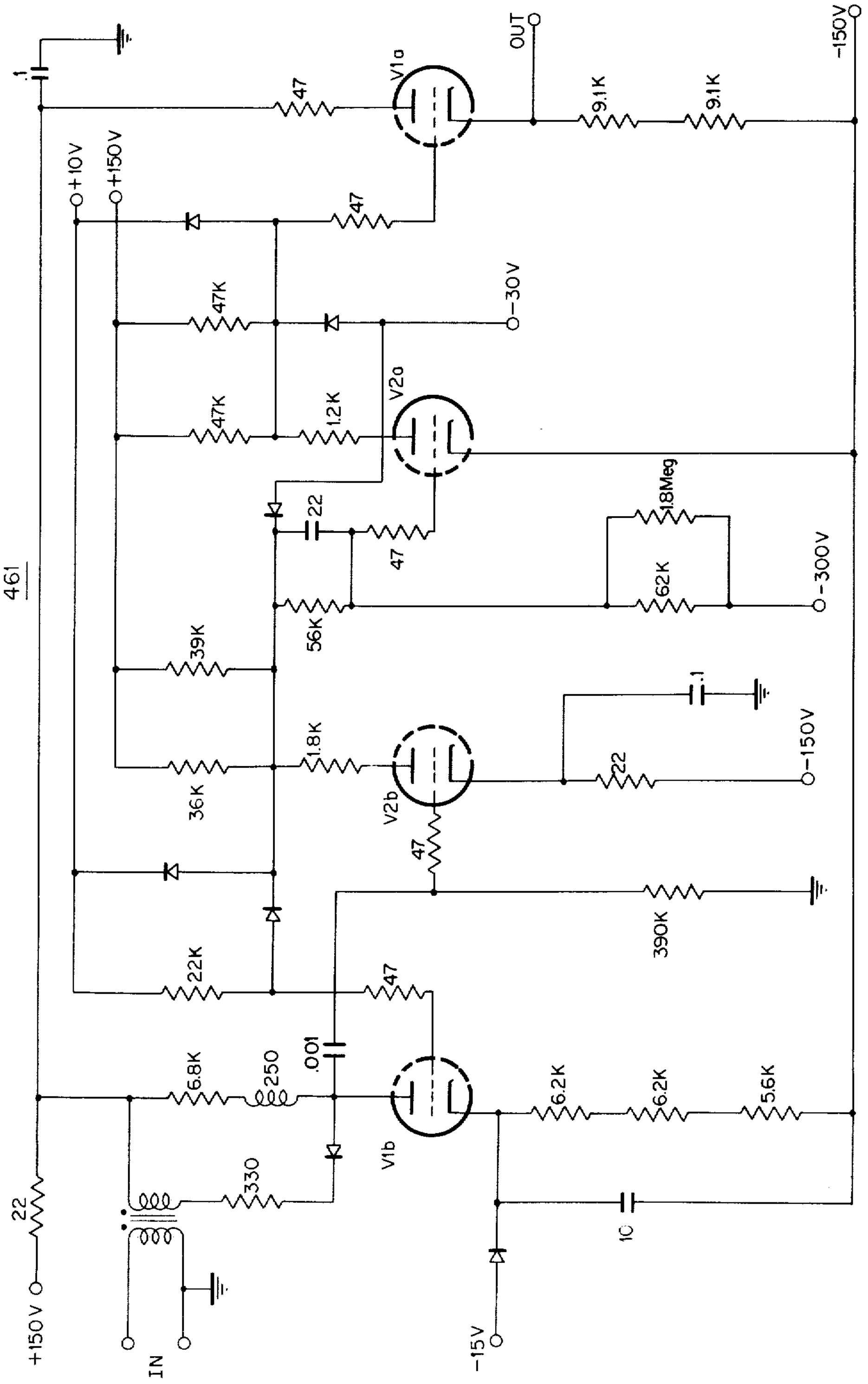

FIG. 21 is a schematic diagram of the "C" model single-shot shown as blocks 458 and 461 in FIG. 7*a*.

CONVENTIONS EMPLOYED

Since the invention will be described and illustrated in a system employing direct binary signals for the representation of digital information as distinguished from other types of binary signals, such as for example, binary coded decimal, a signal representing a digit will be referred to as a "bit," a group of bits will be referred to as a word or unit of intelligence, and a group of words will be referred to as a message, record or block of information.

Throughout the following description and in the accompanying drawings there as certain conventions employed which are familiar to certain of those skilled in the art. Additional information concerning those conventions is as follows:

A conventional filled-in arrowhead is employed on lines throughout the drawing to indicate (1) a circuit connection, (2) energization with standard positive pulses and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a non-standard pulse generally having a duration considerably longer than the pulse represented by a filled-in arrowhead. A diamond-shaped head indicates (1) a circuit connection and (2) energization with a D.C. level. Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the lines of that cable convey information at different times or (2) that those lines are D.C. level conductors. The numbers appearing within the circle or the rectangular box of the cable indicate the numbers of conductors within the cable. The D.C. levels are on the order of 10 volts when positive and 30 volts when negative, whereas pulses indicated by conventional filled-in arrowheads are positive-going $\frac{1}{10}$ microsecond, half sine 20 to 40 volts in amplitude. Pulses indicated by conventional un-filled-in arrowheads are not necessarily sinusoidal, are usually pulses considerably longer than $\frac{1}{10}$ microsecond in duration and those referred to hereinafter are in general on the order of 1 to 10 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

In the description the general arrangement of the apparatus of a preferred embodiment of this invention will first be described with respect both to the manner in which the various circuit components and apparatus are interconnected and in respect to the general over-all operation which is performed by these components and apparatus. The description of the general arrangement will be followed by separate and detailed descriptions of the various components and apparatus, which so require it, and each section of the description will have a heading which indicates the apparatus about to be described.

BLOCK DIAGRAM OF THE COMPUTER

Figure 1D:
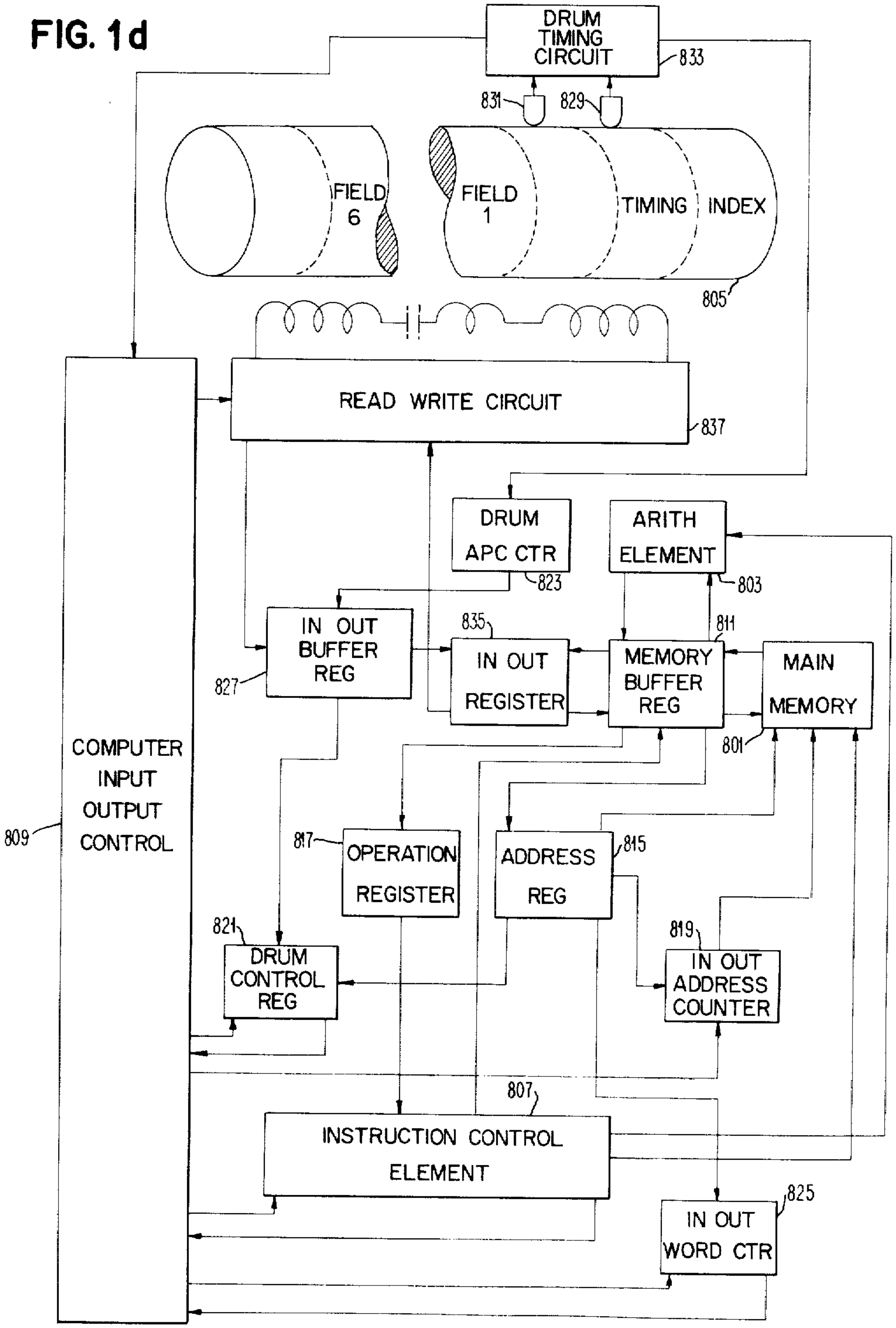

Reference is now made to FIG. 1*d* which shows a simplified block diagram directed to the invention. The data processing machine includes a main memory 801, an arithmetic element 803, and a storage device 805 which is a magnetic drum. Singal transfers between those above-mentioned devices are affected under the control of an instruction control element 807 and a computer IO control element 809. Information stored in the main memory 801 is transferred to the memory buffer register 811 when a signal is received from the instruction control element 807 and the signals transferred are those defined by signals received from the address register 815. Conversely, signals may be transferred from the memory buffer register 811 to the main memory 801. The signals referred to are normally called words. A portion of the word stored in the memory buffer register may be transferred to the operation register 817 and a portion transferred to the address register 815. The signals stored in the address register define the address of other words which are to be transferred from the main memory 801. The signals in the operation register 817 are transferred to the instruction control element 807 where they control the operation of the computer.

Information may be transferred between the magnetic drum 805, the arithmetic element 803, and the main memory 801. Drum writing operations, as well as drum reading operations, are normally performed on a block basis. In a transfer between a drum 805 and the main memory 801 signals stored in the address register 815 are delivered to the IO address counter 819 and to the drum control register 821. The angular position counter 823 produces signals which indicate the address of the register of the drum with respect to a reference point on the drum. The signals which have been transferred to the drum control register are signals indicating the address of the register of the drum to or from which signals are to be transferred. The signals produced by the drum angular position counter are transferred to the IO buffer register 827 where they are delivered to the drum control register 821. The signals there are compared with the signals previously stored therein which were received from the address counter indicating the first drum register address into or out of which a transfer will take place. If comparison is successful transfer will begin. When the required number of words as specified by the IO word counter 825 have actually been transferred the IO counter delivers a pulse to the computer IO control element which ends the transfer.

Each drum contains a timing channel and an index channel. These channels are read by heads 829 and 831, the signals read are delivered to a drum timing circuit 833. Signals from the drum timing circuit 833 are delivered to the angular position counter to control that counter and to the computer IO control element.

The computer IO control element 809 contains devices for indicating whether the IO register and IO buffer registers are full or empty. This assures that transfer is made to and from the IO buffer register and IO register only when they are conditioned for such transfer. A word written in the main memory is the first word accepted from the drum, the memory location into which this word is written is a location specified by the contents of the IO address counter 819. After a successful comparison has been made successive drum registers will be read until the IO word counter indicates that the designated number of words have been transferred. The information is transferred to and from the drum through the read-write circuits 837.

As the transfer continues the signals produced by the drum control register, the IO word counter, and the IO address counter are altered each time a transfer is effected to reflect the proper transfer to next take place.

FIG. 1*d* is a simplified block diagram of equipment constructed in accordance with the principles of the invention. More detailed information will be found in the following description and accompanying drawings.

Reference is now made to FIGS. 1*a* through 1*c* which when arranged from left to right side by side in that order illustrate a data processing machine which employs a signal storage system in accordance with the invention. The data processing machine includes a main memory 1, an arithmetic element 2 and a plurality of storage devices including a magnetic drum 4 (AM drum), a magnetic drum 5 (RD drum), and a magnetic drum 6 (TD drum). Signal transfers between those abovementioned devices are effected under the control of an instruction control element 7 and a computer In-Out control element 8 by means of stored program.

MEMORY ELEMENT

The main memory element 1 functions as follows:

(1) In response to a pulse on a conductor 9 followed by a pulse on a conductor 10, the signals stored in the particular memory register defined by the signals on the conductors of cable 11 are delivered to the conductors of a cable 12 and these signals represent the word stored in the particular memory register. This operation will hereinafter be referred to as reading a word from memory. This operation does not take place if a pulse is received on a conductor 13 (Inhibit Sample).

(2) In response to a pulse on conductor 9 followed by a pulse on each of the conductors 10 and 13, the signals received from the conductors of a cable 14 are stored in the memory register defined by the signals on the conductors of cable 11. This operation will hereinafter be referred to as storing a word in memory. More detailed information concerning the memory element 1 and a preferred embodiment will be found in the above noted copending application "B." As a result of the operation of reading a word from memory, a word is delivered by way of the conductors of cable 12 to a memory buffer register 15.

Signal transfers to be herein described are indicated to be 33 bits per word. The 33rd bit in the preferred embodiment is known as a parity bit and is transmitted with the word to which it relates so that at various points throughout the system the word may be checked against its parity bit to detect errors that may have occurred in transmission. Since this parity checking and parity generating operation is not essential to an understanding of this invention, the particular circuits relating thereto will not be described. However for a more thorough explanation of the parity generating and parity checking circuits which may be employed, reference is made to the above mentioned copending application "A." The 33 bit word may therefore be considered as a word having a left half of 16 bits and a right half of 16 bits and a parity bit.

In response to a pulse on a conductor 16, bits 1 through 10 of the left half-word stored in the memory buffer register 15 are delivered by way of the conductors of a cable 17 to an operation register 18 and bits 10 through 15 of the left half-word are delivered by way of the conductors of a cable 19 to an Index Interval Register 20. A pulse on conductor 16 also causes bits sign and 1 through 15 of the right half-word stored in the memory buffer register 15 to be transferred by way of the conductors of a cable 21 to an address register 22.

COMPUTER SYSTEM TIMING

Figure 2:
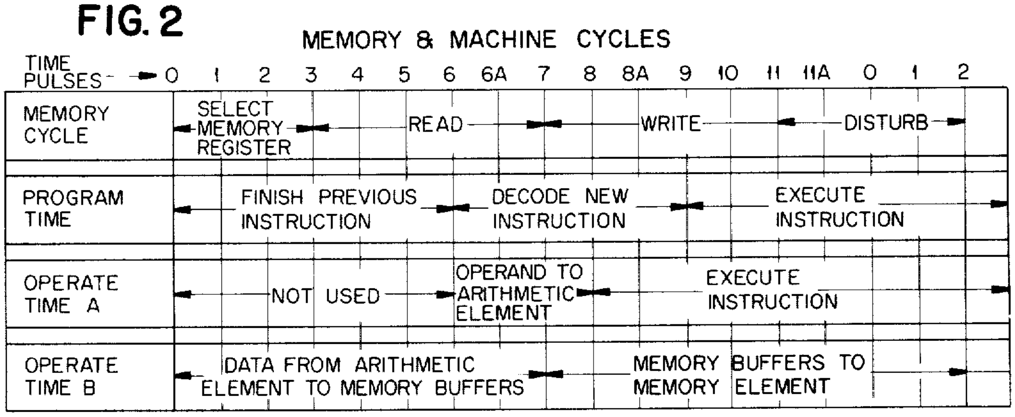
FIG. 2 is a timing chart which illustrates timing relationships between various cycles of operation in the computer portion of the data processing system.

Signals stored in the operation register 18 are delivered by way of the conductors of a cable 23 to the Instruction Control Element 7. The Instruction Control Element generates various pulses dependent upon the signals received from the operation register 18. These pulses are delivered to the units of the data processing machine to cause various operations in a manner to be described in detail hereinafter. The relative occurrence times of these pulses with respect to other computer system events are shown in FIG. 2. In FIG. 2 it will be seen that there are 15 time pulses in a machine cycle. Instruction pulses are numbered in the following manner: IP–0, IP–1, IP–2, IP–3, IP–4, IP–5, IP–6, IP–6A, IP–7, IP–8, IP–8A, IP–9, IP–10, IP–11, IP–11A. A similar method of numbering is utilized for the time pulses, TP's. A machine cycle begins with IP–0 and ends with IP–11A at which time the cycle is resequenced from 0 through 11A of the next machine cycle. A given TP pulse and its corresponding IP pulse are sometimes generated simultaneously. At other times TP pulses may be generated IP pulses not generated. At still other times neither TP nor IP pulses are generated.

The minimum time between successive words read from or written into the memory element 1 is called a memory cycle. As illustrated and described herein the time interval of a memory cycle is 7½ microseconds. The time pulses (shown as occurring at ½ microsecond intervals along the horizontal axis of FIG. 2) establish approximate relationships between events in the memory cycle and in the machine cycles. Except for those pulses which coordinate and synchronize the main memory with respect to the computer system, the internal memory timing is independent of the time pulses. The machine cycle comprises an interval of time equal to the memory cycle and its events are controlled by the TP or IP pulses described above. Although the machine cycle is of the same duration as the memory cycle, the two should be distinguished since in certain program instructions, information from main memory is not used.

Operation of the computer system may also be discussed in terms of an instruction cycle. An instruction cycle is defined as that time required for the computer to execute one complete instruction and is usually composed of from one to three machine cycles. Of the many instructions which may be performed by the computer system some involve simple operations such as setting up control circuits or transferring words between registers. Because of this simplicity of operation, these instructions are completed in one memory cycle, or less, and are called "one-memory-cycle instructions."

Some of the many instructions require two memory cycles for completion and these instructions are called "two-memory-cycle instructions." Before such instructions can be completed, an operand must be obtained from the memory element 1 and therefore a second memory cycle is provided and during this second memory cycle the operand is obtained and the instruction completed. Still other instructions require three memory cycles for completion; the instruction word is obtained and the required operation is performed during the second memory cycle; and the result of the operation is stored in the memory element during the third memory cycle. The memory or machine cycles which compose the instruction cycle, have been assigned distinctive names for easy reference. The names and characteristics of these are illustrated in Table 1 below:

*Table 1*

NAMES AND CHARACTERISTICS OF MACHINE OR MEMORY CYCLES

| Memory or Machine Cycle | Name | Characteristic |
|---|---|---|
| First | Program Time (PT) | Decodes instruction and initiates execution. |
| Second | Operate Time A (OTA) | Obtains operand and performs operation. If no operate time B follows, this cycle is called simply operate time. |
| Third | Operate Time B (OTB) | Stores result of operation in core memory. |

Figure 3:
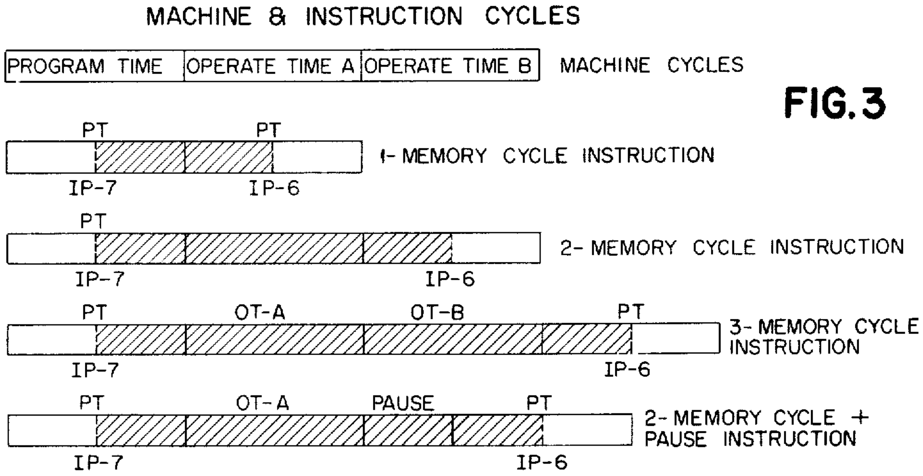
FIG. 3 is a timing chart which illustrates the timing relationship between computer system machine cycles and the different length instruction cycles.

Although a machine cycle begins with TP–0, an instruction cycle starts with IP–7 of a program time cycle which is denoted PT–7. FIG. 3 shows the basic machine and instruction cycle timing relationships. In FIG. 3 the instruction cycles are shown as cross-hatched areas on the sequence of the machine cycles. Thus in a one-memory cycle instruction, the decoding process starts at PT–7 and the instruction is completed by PT–6 of the subsequent machine cycle and the decoding of the next instruction is initiated at this time. Similarly, a two-memory-cycle instruction starts at PT–7, continues through the subsequent OTA cycle and is completed by PT–6 of the next PT cycle, when the execution of the next instruction begins. As has been noted, the time from IP–1 to IP–6 of a program time cycle is used to complete the instruction and this time interval is also utilized to bring the next instruction out of the memory element 1.

An exception to the usual sequence of machine cycles as described above occurs in certain instructions performed by the preferred embodiment of the data processing machine. In those instructions which are arithmetic instructions, time is required for the performance of a series of repetitious operations. Such operations are multiplication, which requires repeated addition; and division, which requires repeated subtraction. This additional time is supplied by stopping the generation of IP pulses thus stopping the operation of instruction and machine cycle sequences. This stoppage is known as "Arithmetic Pause" since the data processing machine pauses in its usual sequential operation long enough to complete the repetitious operations. An example of an instruction cycle utilizing an "Arithmetic Pause" is depicted in the last diagram of FIG. 3. In the illustration, the decoding of the instruction begins at PT–7; the operand (in this case either the multiplicand or the divisor) is obtained during the subsequent OTA cycle. At the end of the OTA cycle, the generation of instruction pulses is stopped and the data processing machine goes into a pause, the duration of which is determined by the number of operations required. The repetitious additions or subtractions composing the multiplication or division, for example, are executed during this period. The "Arithmetic Pause" condition then ends and the program time cycle begins, completing the instruction by PT–6. A detailed description of the equipment operation to perform an "Arithmetic Pause" is described in the above mentioned copending application B.

An instruction word is read from the main memory 1 during each program time cycle. This word contains coded information which specifies the particular operations that the data processing system is to perform during the ensuing cycle. As stated in the previous paragraph, this cycle normally begins at PT–7, when decoding of the instruction word is just beginning. The decoding of the instruction word takes place in the instruction control element 7. The 32 bits of the instruction word are given names to facilitate reference or discussion; these names are shown in FIG. 4.

Figure 4:
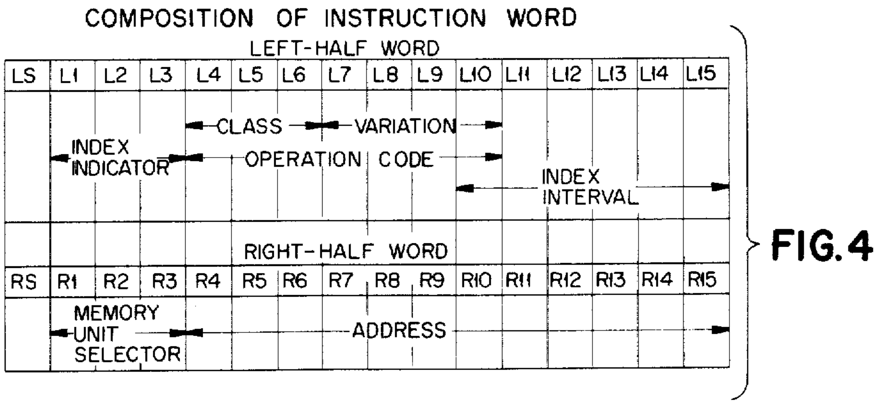
FIG. 4 is a diagram which illustrates word lay out and bit assignments of computer system instruction words.

Referring now to FIG. 4, the 32 bit instruction word is divided into two 16 bit half-words termed respectively the left and right half-words. Each half-word consists of the sign bit and 15 numerical bits which are designated LS, L1, L2, . . . L15 for the left half-word and RS, R1, R2 . . . R15 for the right half-word. The left half-word is sometimes called the operation part of the word and the right half-word the address part. Bits L1 through L3 are termed the "Index Indicator" since they are used to specify which one of several index registers is to be used during indexing. Indexing provides a means of altering or cycling the program for repetitive operations and is described more fully in the above referred to copending application "B."

Bits L4 through L10 are termed the "operation code." These bits determine which one of the many instructions is to be performed. Bits L4 through L6 specify one of 8 classes of instructions whereas L7 through L10 specify one of the variations of the basic instruction class. Bits L10 through L15 are termed the index interval and are used to provide additional information required by particular instructions as described in greater detail in the previously referred to copending application "B." Bits L10 through L15 are also used for selection of one of the several input or output devices as will be subsequently described. Bit 10 is utilized in both the operation code and the index interval. However this causes no ambiguity for whenever the index interval is used by an instruction, bit 10 is not used to identify the instruction involved. Thus when the whole index interval is utilized, the appropriate instruction is completely specified by only those bits of the operation code instead of the usual seven.

The right half-word of the instruction word usually denotes the location in the main memory 1 where data may be stored or from which additional pertinent data may be obtained. This additional data usually takes the form of an operand required in the execution of mathematical operation. In certain instructions the right half-word is used to load various registers to accomplish input-output operations in a manner to be described hereinafter.

For the purpose of illustrating and describing this invention the following table lists by name and code number those instructions which will be specifically described subsequently. It is to be understood that in many practical embodiments of this invention, many other instruction operations may be performed.

*Table 2*

| Class | Binary Code | Variation | Binary Code | Abbrev. |
|---|---|---|---|---|
| Branch | 101 | Sense | 010- | bsn. |
| Input/Output | 110 | Load IO Address Ctr. | 0000 | ldc. |
| Do | 110 | Select Drums | 001- | sdr. |
| Do | 110 | Read | 1110 | rds. |
| Do | 110 | Write | 1111 | wrt. |

INSTRUCTION CONTROL ELEMENT

As previously noted with respect to FIG. 1*c*, the signals stored in the operation register 18 are delivered to the instruction control 7. Although the One and Zero signals of each of the 10 bits stored in the operation register are delivered by way of 20 conductors of cable 23 to the Instruction Control 7 bits 1 through 3 will receive no further consideration herein since their purpose is fully described in the previously mentioned copending application "B."

Reference is now made to FIGS. 5*a* and 5*b* which when arranged side by side from left to right in that order are a functional block diagram of the instruction control shown as block 7 in FIG. 1*c*. A time pulse distributor and control 24 during normal operation causes the conductors of a cable 25 to be sequentially pulsed and these conductors are referred to as "IP" pulse conductors. Also during normal operation the conductors of a cable 26 are sequentially pulsed and these conductors are referred to as "TP" pulse conductors. The pulses on the conductors of cable 25 are delivered to a command generator 27 which in turn causes various ones of its output conductors to be pulsed at predetermined times dependent upon which of its D.C. level input conductors is positive. The D.C. levels applied as inputs to the command generator are received from an Instruction Matrix 28, and a Cycle Control Circuit 29. The particular conductors from the Instruction Matrix 28 which are positive at a given time is dependent upon the D.C. levels that it receives from the Cycle Control 29, the Class Cycle Matrix 30 and the Variation Matrix 31. The Class Cycle Matrix 30 which is essentially a decoder and preferably of the conventional diode type receives bits 4 through 6 of the left half-word of an instruction. As previously noted these bits specify one of several classes of instruction. The Class Cycle Matrix also receives signals from the Cycle Control 29. The output conductors of the Class Cycle Matrix are preferably labeled in accordance with the conditions under which those conductors will be positive. The following table shows which combination of positive potentials on input conductors will produce a positive potential on a given output conductor of the Class Cycle Matrix 30:

*Table 3*

POSITIVE POTENTIALS ON INPUT CONDUCTORS

| Output Conductor | Code from Operation Register L4-L6 | From Cycle Control Circuit |
|---|---|---|
| I/O-PT | 110 | PT. |
| I/O-OT | 110 | OT. |
| Branch-PT | 101 | PT. |
| Branch-OT | 101 | OT. |

The Variation Matrix 31 which is also a decoder of the diode type receives bits 7 through 10 of the left half-word of the instruction. As previously noted, these bits specify a variation within a given class of instructions. The output conductors of Variation Matrix 31 are preferably labeled in accordance with the binary code which causes the conductors to be positive. Certain of the output conductors from the Class Cycle Matrix 30 and the output conductors of the Variation Matrix 31 are applied to the Instruction Matrix 28. The output conductors of the Instruction Matrix 28 are properly labeled in accordance with the conditions under which those conductors will be positive. The following table shows which combination of positive potentials on input conductors will produce a positive potential on a given output conductor of the Instruction Matrix 28.

*Table 4*

POSITIVE POTENTIALS ON OUTPUT CONDUCTORS

| Output Conductor | From Class Cycle Matrix | From Variation Matrix L7-L10 | From Cycle Control |
|---|---|---|---|
| bsn-OT | Branch-OT | 010- | |
| bsn-PT | Branch-PT | 010 | |
| I/O-PT and I/O Interlock On | I/O-PT | | IO Interlock is On. |
| sdr-OT | I/O-OT | 001- | |
| sdr-PT | I/O-PT | 001- | |
| ldc-PT | I/O-PT | 0000 | |
| wrt-PT | I/O-PT | 1111 | |
| rds-PT | I/O-PT | 1110 | |

The Class Cycle Matrix 30, the Variation Matrix 31 and the Instruction Matrix 28 may be of well known construction and require no further description as to their structure.

Since the Command Generator 27 produces many pulses which are generated in particular order for various instructions and since an understanding of those command pulses will assist in an understanding of this invention, the commands will be discussed as to the conditions under which a given command is generated and these commands are also tabulated in FIGS. 6*a* through 6*e*. FIGS. 6*a* through 6*e* show for a given instruction the commands which are generated during that instruction time and also show the time of the PT and OT cycles at which a given command occurs. While reading the following discussion as to under what circumstances a given command is generated it should be noted that the information is tabulated in FIGS. 6*a* through 6*e*.

In FIG. 5*a* the commands produced by the Command Generator 27 and the Time Pulse Distributor 24 are identified by a particular reference number on each conductor. The reference numbers will serve not only to identify the conductors but also to identify the command number associated with a given conductor. The following commands are generated at the indicated times directly from the output of the Time Pulse Distributor and Control 24:

*Table 5*

| Command Name | Conductor Number | Time |
|---|---|---|
| Clear Memory Controls | 9 | TP-0. |
| Clear Memory Buffer | 41 | TP-1. |
| Start Memory | 10 | TP-2. |

Each of the following commands is generated by the Command Generator 27 as a result of a positive potential received from the conductor labeled PT:

*Table 6*

| Conductor Number | Command Name | Time |
|---|---|---|
| 91 | Program Counter to Memory Address Reg | IP-1 |
| 77 | Clear Address Reg | IP-6 |
| 77A | do | IP-6 |
| 77B | Clear Operation | IP-6 |
| 77C | Clear Index Interval Reg | IP-6 |
| 92 | Add 1 to Program Counter | IP-7 |
| 16A | Left Memory Buffer to Operation Reg | IP-7 |
| 16B | Right Memory Buffer to Address Reg | IP-7 |
| 16C | Left Memory Buffer to Index Interval Reg | IP-7 |

In response to a positive D.C. level on the conductor labeled OT, the Command Generator 27 produces a pulse on a conductor 71 and this command which occurs at IP–1 time is called Address Register to the Memory Address Register.

In response to a positive potential on the conductor labeled *wrt*–PT or the conuctor labeled *rds*–PT, the following commands are generated at the times indicated:

*Table 7*

| Command Name | Conductor Number | Time |
|---|---|---|
| Address Reg. Complement to I/O Word Counter | 152 | IP–2. |
| Clear I/O Word Counter | 149 | IP–1. |
| Set I/O Interlock On | 294 | IP–1. |
| Clear I/O Reg | 144 | IP–2. |
| Sense I/O Word Counter | 290 | IP 3. |

In response to a positive potential on the conductor labled *ldc*–PT a pulse is produced on a conductor 72 at IP–3 time, a pulse is produced on the conductor 148 at IP–2 time and these commands are called Address Register to IO Address Counter and Clear IO Address Counter respectively.

In response to a positive potential on the conductor labeled *rds*–PT, a pulse is produced on a conductor 180 and this commond which appears at IP–6 time is called PT–6 on Read.

In response to a positive potential on the conductor labeled *wrt*–PT, a pulse is produced on a conductor 182 and this pulse which occurs at IT–6 times is called PT–6 on Write.

In response to a positive potential on the conductor labeled *wrt*–PT or on the conductor labled *rds*–PT, a pulse is produced on a conductor 183 and this pulse which occurs at IP–6 time is called PT–6 on Read or Write.

In response to a positive potential on the conductor labeled *sdr*–PT, a pulse is produced on a conductor 325 and this pulse, which occurs at IP–5 time, is called Select Pulse for Drums.

In response to a positive potential on the conductor labeled *sdr*–PT the following commands are generated at the times indicated:

*Table 8*

| Command Name | Conductor Number | Time |
|---|---|---|
| Address Reg. to Drum Control Reg | 151 | IP–3. |
| Clear Drum Control Reg | 146 | IP–2. |

In response to a positive potential on the conductor labeled *sdr*–OT, a pulse is produced on a conductor 155 at IP–5 time and this command is called Deselect Pulse.

In response to a positive potential on either the conductor labled *sdr*–PT or *bsn*–PT, a pulse is produced on a conductor 131 which occurs at IP–11 time and this command is called Set PT–OT flip-flop to OT.

In response to a positive potential on the conductor labeled IO–PT and IO Interlock ON, a pulse is produced on a conductor 134 and this command which occurs at IP–10 time is called Pause.

In response to a positive D.C. level on the conductor labeled Branch Flip-Flop ON a pulse is delivered to a conductor 154 labeled Address Register to the Program Counter and this pulse occurs at TP–0 time, and a pulse is delivered to the conductor 93*a* labeled Program Counter to the Right A Register, and to the conductor 93*b* labeled Clear the Program Counter, and these commands occur at IP–11 time.

In response to a positive D.C. level on the conductor labeled *bsn*–PT, a pulse is delivered to a conductor 163 labeled Clear the Branch flip-flop and this pulse occurs at IP–6 time.

In response to a positive D.C. level on the conductor labeled *bsn*–OT, a pulse is delivered to the conductor 140 labeled Sense for Branch and this pulse occurs at IP–9 time.

In response to a positive D.C. level on the conductor labeled *bsn*–OT or a positive D.C. level on the conductor labeled *sdr*–OT, a pulse is delivered to the conductor 161 labeled Clear PT–OT flip-flop to PT and this pulse occurs at IP–11 time.

In order to clarify the commands which are tabulated by command number in FIGS. 6*a* through 6*e*, those command numbers and the command names which have been mentioned above are tabulated as follows:

*Table 9*

| Command Number | Command Name |
|---|---|
| 9 | Clear Memory Controls. |
| 10 | Start Memory. |
| 16 | Memory Buffer to Operations Reg., Address Reg. and Index Interval Reg. |
| 41 | Clear Memory Buffer Reg. |
| 71 | Address Reg. to Memory Address Reg. |
| 72 | Address Reg. to I/O Address Counter. |
| 77*a*, *b*, *c* | Clear Address Reg., Operation Reg. and Index Interval Reg. |
| 91 | Program Counter to Memory Address Reg. |
| 92 | Add 1 to Program Counter |
| 93*a* | Program Counter to Right A Reg. |
| 93*b* | Clear Program Counter. |
| 131 | Set PT–OT flip-flop to OT. |
| 134 | Pause. |
| 140 | Sense for Branch. |
| 144 | Clear I/O Reg. |
| 146 | Clear Drum Control Reg. |
| 148 | Clear I/O Address Counter. |
| 149 | Clear I/O Word Counter. |
| 151 | Address Reg. to Drum Control Reg. |
| 152 | Address Reg. Complement to I/O Word Counter. |
| 154 | Address Reg. to Program Counter. |
| 155 | Deselect Pulse. |
| 161 | Clear PT–OT flip-flop to PT. |
| 163 | Clear Branch. |
| 180 | PT–6 on Read. |
| 182 | PT–6 on Write. |
| 183 | PT–6 on Read or Write. |
| 290 | Sense I/O Word Counter. |
| 294 | Set I/O Interlock On. |
| 325 | Select Pulse for Drums. |

COMMON COMMANDS

Certain commands called Common commands are generated during every instruction cycle. From FIGS 6*a* through 6*e* it will be noted that the following common commands are generated during the PT cycle of each instruction:

*Table 10*

| Command Number | Name | Time |
|---|---|---|
| 9 | Clear Memory Controls | PT–0 |
| 41 | Clear Memory Buffer Reg | PT–1 |
| 91 | Program Counter to Memory Address Reg | PT–1 |
| 10 | Start Memory | PT–2 |
| 77A | Clear Address Reg | PT–6 |
| 77B | Clear Operation Reg | PT–6 |
| 77C | Clear the Index Interval Reg | PT–6 |
| 92 | Add 1 to Program Counter | PT–7 |
| 16 | Memory Buffer to Operation Reg., Address Reg. and Index Interval Reg. | PT–7 |

Referring now to FIGS. 1*a* through 1*c* and Table 10 above, the command 41 as its name implies is delivered to the Memory Buffer Register 15 where it causes that register to have all of its stages cleared to the binary Zero state. The commands 91 and 92 are delivered to a Program Counter 350. This counter is essentially a binary counter which may be initially set to any desired number; in response to the command 92 a binary One is added to that number and in response to the command 91, the Program Counter delivers the signals stored therein to the conductors of a cable 351. These signals are delivered through an OR circuit 352 to the previously mentioned conductors of cable 11.

Pulses on the conductors 9 and 10 cause the main memory 1 to perform the previously described read operation and the particular register which is read during the PT cycle is indicated by the signals delivered from the Program Counter 350. The memory registers whose locations are specified by the Program Counter are those registers containing the instruction words.

The read memory operation performed during program time causes the binary signals representative of the left and right half-words of the instruction to be delivered to the conductors of cable 12. Since the Memory Buffer Register 15 is cleared by the command 41 at PT–1 time and since the signals on the conductors of cable 12 occur at substantially PT–6 time, those signals are stored in the Memory Buffer Register at the end of the read memory operation. The command 77A is delivered to the Address Register 22, the command 77B is delivered to the Operation Register 18 and the command 77C is delivered to the Index Interval Register 20 where those commands cause a conventional clearing operation of those registers. The command 16 when delivered to the Memory Buffer Register causes the signals stored therein to be delivered to the Operation Register 18 and the Address Register 22.

Summarizing the operation described which occurs during each program time cycle, left and right half-words of the instruction whose location is specified by the contents of the Program Counter are stored in the Operation Register and Address Register respectively, at the end of the PT cycle and the contents of the Program Counter is increased by One. From FIGS. 6*a* through 6*e* it will be noted that at PT–11 time of each instruction which requires an operate time, the command 131 (Set PT–OT flip-flop to OT) is generated in a manner to be described in detail hereinafter. This command essentially prevents the commands occurring from PT–0 through PT–7 of the instruction cycle from being generated until the operate time commands for that instruction have been generated. It will be noted that during the OT cycle of those instructions the following common commands are generated:

*Table 11*

| Command Number | Name | Time |
|---|---|---|
| 9 | Clear Memory Controls | OT–0 |
| 41 | Clear Memory Buffer Register | OT–1 |
| 71 | Address Register to Memory Address Register | OT–1 |
| 10 | Start Memory | OT–2 |
| 161 | Clear PT–OT Flip-Flop to PT | OT-11 |

The command 71 is delivered to the Address Register 22 where in response to this command the signals stored therein are delivered through an OR circuit 352 to the conductors of a cable 11. The commands 9 and 10 cause the previously noted read memory operation; however during the OT cycle the particular memory register being read is specified by the contents of the Address Register since the command 71 is generated. The command 161 (Clear PT–OT Flip-Flop to PT) essentially results in the program time being resumed, that is, the commands during PT–0 through PT–6 of the instruction cycle are generated subsequent to the OT cycle of the instruction.

DRUM WRITING OPERATIONS

In order to effect a drum writing operation on any one of the drums 4, 5 or 6, the program must include a sequence of three instructions. These instructions which are Load Address Counter (*ldc*), Select Drums (*sdr*) and Write (*wrt*), are preferably performed in the order as stated. Drum writing operations as well as drum reading operations are normally performed on a block basis, that is, the sequence of three instructions merely establishes that a specified memory register whose address is indicated by a load address counter instruction, is the first main memory register to be involved in the transfer, that the words are to be transferred between auxiliary memory devices and main memory (Select Drums instruction), that a specified drum register is the first register to be involved in the transfer (the address of that register being specified by the Select Drums instruction) and that a specified number of words are to be read from or written on to the drum (the specified number being identified by a part of the read or write instruction).

As indicated in FIG. 6*b*, the Load Address Counter instruction causes the following commands, besides the common commands described with reference to Table 10 above, to be generated:

*Table 12*

| Command Number | Name | Time |
|---|---|---|
| 134 | Pause | PT-10 |
| 148 | Clear IO Address Counter | PT-2 |
| 72 | Address Register to IO Address Counter | PT-3 |

The command 134 is a conditional command indicated by being underlines in FIG. 6*b*, that is, it is generated only if a certain condition is met. For the immediate description it will be assumed that this condition is not met and therefore the command is not generated.

Referring back to FIGS. 1*a* through 1*c* and more particularly to FIG. 1*c*, the command 148 is delivered to an IO Address Counter 361 where it causes a conventional clearing operation. The command 72 is delivered to the Address Register 22 where in response to this command the signals stored therein are delivered by way of the conductors of cable 362 to the IO Address Counter 361 for storage therein. As indicated in FIG. 6*a* the Select Drums instruction besides causing the common commands described with respect to Tables 10 and 11 above to be generated cause the generation of the following commands:

*Table 13*

| Command Number | Name | Time |
|---|---|---|
| 134 | Pause | PT-10 |
| 131 | Set PT–OT Flip-Flop to OT | PT-11 |
| 155 | Deselect Pulse | OT-5 |
| 161 | Clear the PT–OT Flip-Flop to PT | OT-11 |
| 146 | Clear Drum Control Register | PT-2 |
| 151 | Address Register to Drum Control Register | PT-3 |
| 325 | Select Pulse for Drums | PT–5 |

At PT–10 time of the Select Drums instruction as during the Load Address Counter instruction, the command 134 (Pause) may be generated. Since this command is conditional and since an understanding of this operation is not essential to the immediate description, it is assumed that the command is not generated. At PT–11 time of the Select Drums instruction the command 131 is generated to provide an OT cycle. At OT–5 time the comand 155 (Deselect Pulse) is generated and this command (as shown in FIG. 1*c*) is delivered to the computer In-Out control 8, a Drum Selection Register 363, and is also delivered to the read-write circuits 391. The Deselect pulse received by the computer input-output control causes various control flip-flops therein to be set to their Zero state and further causes a pulse to be delivered to a conductor 364 (Clear the IO Buffer). The Deselect pulse received by the Drum Selection Register 363 causes each stage of that register to be cleared to the Zero state. The Deselect command 155 when received by the read-write circuits 391 causes a clearing operation of all of the stages of the write register therein.

Although the common commands described with respect to Table 11 are generated during this OT cycle of the Select Drums instruction, they will have no effect on the over-all result of the instruction as will be apparent hereinafter. At PT–2 time of the Select Drums instruction, the command 146 (Clear Drum Control Register) is delivered to a Drum Control Register 365 (FIG. 1*b*)

to effect a conventional clearing operation. At PT–3 time the command 151 causes the signals stored in the Address Register 22 to be delivered by way of the conductors of a cable 366 to the Drum Control Register 365 for storage therein. From the preceding description it will be seen that the signals delivered to the Drum Control Register are those signals of the right half-word of the instruction.

Associated with the drum systems 3, 5 and 6 are angular position counters 370, 371 and 372, respectively. These angular position counters effectively produce signals which indicate the address of the register of the drum with which they are associated with respect to a reference point on the drum. The signals transferred to the Drum Control Register 365 during Select Drums instruction are signals indicating the address of the register of the drum from which or to which signals are to be transferred. As will become apparent subsequently the signals produced by the selected drum angular position counter are compared with the signals stored in the Drum Control Register 365, which are placed there during the Select Drums instruction.

At PT–5 time of the Select Drums instruction the command 325 (Select Pulse for Drums) is generated. This command is delivered to the computer input-output control 8 where it effects a set operation of various control flip-flops and also causes the Index Interval bits L10 through L15 stored in the Index Interval Register 20 to be delivered by way of the conductors of a cable 373 to the Drum Selection Register 363 whose output is decoded by suitable decoders 374 and 375. The decoder 374 may be any suitable decoding circuit which upon receipt of a particular combination of positive and negative D.C. levels on its input conductors of cable 376 causes a corresponding one of its output conductors to be made positive. The decoder 374 in causing a selected one of its output conductors to be made positive effectively selects which one of several drums is to be involved in either a reading or a writing operation. The output conductors of the Drum Selection Decoder 374 are appropriately labeled, not only in accordance with the code which when received causes the conductor to be made positive, but also are labeled with the name of the drum which is selected by that code. Similarly, Field Selection Decoder 375 in response to a given combination of positive and negative D.C. levels on its input conductors of cable 377 causes a corresponding one of its output conductors to be made positive. Field Selection Decoder 375 in causing one of its output conductors to be made positive effectively selects which one of several fields of the selected drum is to be involved in an information transfer. One of the drums, namely the RD drum, is so logically divided as to provide 9 fields since the words placed on that drum may have a less number of bits than those placed on the other drums. The Field Selection Decoder 375 being a 3 bit decoder could therefore select one out of a total of 8 fields. Since the RD drum is provided with 9 fields, the 9th field is selected by the combination of the Drum Selection Decoder and the Field Selection Decoder whenever the Drum Selection Decoder receives the binary code 111 and the Field Selection Decoder receives the binary code 000. These outputs of the decoders are applied to an AND circuit 377 whose output is appropriately labeled Select Field 9. Therefore at the completion of the Select Drums instruction certain of the control flip-flops within the computer Input-Output control 8 have been set; signals representative of the right half-word of the instruction are stored in the Drum Control Register 365 and selection of the particular field of the particular drum identified by the Index Interval part of the Select Drums instruction is initiated.

Figure 6C:
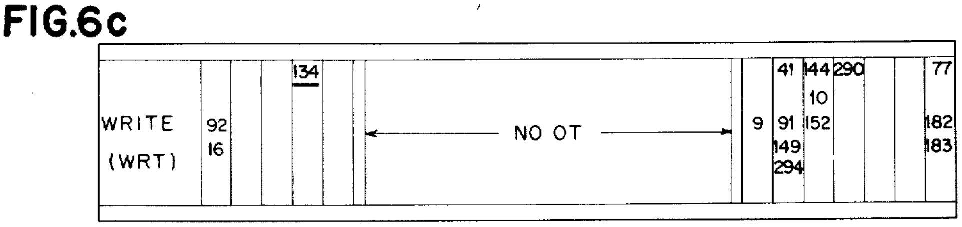

As indicated in FIG. 6*c*, the Write instruction causes the following commands besides the common commands described with reference to Table 10 above to be generated:

*Table 14*

| Command Number | Name | Time |
|---|---|---|
| 134 | Pause | PT–10 |
| 149 | Clear the IO Word Counter | PT–1 |
| 294 | Set IO Interlock On | PT–1 |
| 144 | Clear IO Register | PT–2 |
| 152 | Address Register Complement to IO Word Counter. | PT–2 |
| 290 | Sense IO Word Counter | PT–3 |
| 182 | PT–6 on Write | PT–6 |
| 183 | PT–6 on Read or Write | PT–6 |

At PT–10 time the command 134 is generated provided that a certain condition is met and it will again be assumed that this condition is not met and the command not generated.

At PT–1 time the command 149 (Clear the IO Word Counter) is delivered to an IO Word Counter 380 where it effects a conventional clearing operation. The command 294 is generated and this command is delivered to the Cycle Control Circuit 29 (FIG. 5*b*) where it causes the output conductor labeled IO Interlock ON to be made positive. The primary purpose of this command is to prevent any further instruction of the Input-Output class from being executed until the present input or output operation has been completed. As will be more apparent subsequently, an input or output operation is not complete until the number of words involved in the transfer have actually been transferred. This command 294 is also delivered to the computer Input-Output Control 8 where it causes a setting operation of a duplicate IO Interlock flip-flop which is used for control information within the computer Input-Output Control.

At PT–2 time the command 144 causes a conventional clearing operation of an IO Register 381. At this same time the command 152 causes signals representative of the complement of the number stored in the Address Register 22 to be transferred by way of the conductors of a cable 382 to the IO Word Counter 380 for storage therein. The right half-word of the Write instruction is a binary number indicating the number of words to be transferred. The command 290 (Sense IO Word Counter) is delivered to the computer Input-Output Control 8. When this command is received by the computer Input-Output control it delivers a pulse by way of conductor 383 to the IO Word Counter 380 to cause a binary One to be added to the contents of that word counter. The command 182 (PT–6 on Write) is also delivered to the computer Input-Output Control where if a pulse is received on a conductor 378 (IO Word Counter End Carry) between the time of the command 290 and the command 182, a pulse is delivered to the conductor 384.

An IO Word Counter is a binary counter which in response to a pulse on the conductor 383 causes a binary One to be added to the number stored therein. The IO Word Counter should have a sufficient number of stages that the total capacity of the counter would be equal to the highest number of transfers which it would be possible to make in a given instruction. Since a field of a given magnetic drum has 2,048 drum registers, the IO Word Counter 380 preferably includes 11 stages. It is pointed out that the capacity of the counter is sufficiently great to count to a capacity of 2,048 words during a given IO instruction. It is not necessary nor desirable to transfer 2,048 words in every IO instruction, but the capacity to do so is inherent in a 11 stage counter. For the reason that the preferred embodiment of this invention permits transfer of words to devices other than drums which may permit transfer of even more than 2,048 words, the IO Word Counter referred to herein is indicated as having 16 stages. The IO Word Counter produces a pulse on the conductor 378 (IO Word Counter End Carry) if when a pulse is received on conductor 383 the counter has the binary number of all ones stored therein. As noted above the complement of the number specified by the right half-word of the Write instruction is transferred to the IO Word Counter 380. If the Write instruction specified zero number of words, then all stages of the IO Word Counter would be set to their One state and a pulse on conductor 383 would cause an end carry pulse to be delivered to the computer Input-Output control. In response to this pulse the IO Interlock flip-flop within the Input-Output control is cleared and a pulse is delivered by way of conductor 384 to the instruction control 7 where it effects a clearing operation of its IO Interlock. The use and importance of an instruction to write zero number of words is not essential to an understanding of this invention although it is well to point out that such an instruction to write zero number of words may be very effectively employed to cause record skipping operations on tape and card machines normally employed with data processing machines.

Assuming for the purpose of the description that the write instruction specifies a number of words greater than zero, then no pulse will be delivered to the conductor 384 labeled Clear IO Interlock during the write instruction. The subsequent instructions of the program will be executed provided that IP pulses are delivered to the Command Generator 27 (FIG. 5*a*).

In the event that the write instruction specifies a number of words to be written on the drum which is greater than zero, the command PT–6 on Write (182) being delivered to the computer Input-Output Control causes a 1st Break Request flip-flop to be set in the Input-Output control and also a 2nd Break Request flip-flop to be set. With this control information stored in the computer Input-Output control and in response to a pulse on a conductor 385 (Sense Break Request) the computer Input-Output control generates the command 386 (Set Break flip-flop) with substantially no delay. During normal operation the instruction control produces a pulse on conductor 385 (Sense Break flip-flop) at TP–11 time. Pulses are also delivered to this conductor during a Pause operation at a 2 mc. rate. The computer Input-Output control after producing a pulse on conductor 386 (Set Break flip-flop) generates the following commands at the times indicated.

*Table 15*

| Command Number | Name | Time |
|---|---|---|
| 387A | IO Address Counter to Memory Address Register. | BO-1 |
| 387B | Clear Break Request Flip-Flop | BO-1 |
| 388 | Add 1 to IO Address Counter | BO-2 |
| 389A | Set IO Register Status Flip-Flop to Full | BO-7 |
| 389B | Memory Buffer Register to IO Register | BO-7 |
| BO-11 | Sample For Clearing IO Interlock Flip-Flop | BO-11 |

Since the memory controls are cleared with TP–0 pulses and since Start Memory is generated by TP–2 pulses and since no Inhibit Sample pulse is generated, the memory element undergoes the above noted read operation and the word stored in the memory location specified by the IO Address Counter is delivered to the Memory Buffer Register 15 since the contents of the IO Address Counter is transferred to memory at BO–1 time. The command 387B (Clear Break Request flip-flop) being generated at BO–1 time causes the previously mentioned 1st Break Request flip-flop to be cleared. At BO–7 time the signals stored in the Memory Buffer Register 15 are delivered by way of the conductors of cable 390 to the IO Register 381 and the IO Register Status flip-flop is set to indicate full. The computer Input-Output control further includes a status flip-flop for storing information as to the status of a write register which forms a part of the read-write circuits 391 (FIG. 1*b*). That flip-flop for remembering the status of the write register is always set to indicate an empty status during the Select Drums instruction in response to the Deselect command 155. Since the computer Input-Output Control now has stored therein information that the write register is empty, the IO Register is full and the drums have been selected, the computer Input-Output Control now generates a command 392 (IO Register to Write Register) and this command also clears the IO Registers.

When the command 392 is delivered to the IO Register, that register delivers the signals stored therein to the Write Register of the read-write circuits 391 by way of the conductors of cable 393. Following the time of BO–7 another Break Request is made since the 2nd Break Request flip-flop was set during the write instruction. The computer Input-Output Control receives TP–11 pulses on the conductor 385 (Sense Break Request) and if the above noted Request flip-flop is set, a pulse is produced by the computer Input-Output control on the conductor 386 labeled Set Break Flip-Flop and in this manner the second memory cycle is devoted to a break-out operation. The commands of Table 15 are again generated resulting in the word stored in the next higher address in memory being delivered to the IO Registers and of course the information is now stored in the computer Input-Output control that the IO Register and the Write Register are now both full. At TP–11 time of the 2nd Break-Out cycle, the command Sense Break Request flip-flop (385) is again received and since the Break Request flip-flop will be in its Zero state at this time the break cycle is terminated and a pulse is delivered by the computer Input-Output Control to the conductor 414 labeled Clear the Break flip-flop which when received by the Instruction Control 7 permits the next instruction of the program to be initiated.

Briefly reviewing the above operation, the first memory cycle following the write instruction is devoted to a break-out operation and the second memory cycle is also devoted to a break-out operation. The first word delivered from the main memory 1 is delivered to the write register within the read-write circuits 391 and the second word delivered from the main memory is stored in the In-Out register 381. The instruction control element 7 then proceeds to execute the subsequent instructions of the program until such time that the instruction control element receives a pulse on the conductor 386 labeled Set Break Flip-Flop.

During the write instruction a pulse is delivered to the conductor 183 labeled PT–6 on Read or Write which pulse is delivered to the Index Interval Register 20 which at that time contains the Index Interval part of the write instruction. The index interval part of the write instruction is used to establish a code which defines the manner in which write operations on the drum shall take place, that is, the index interval code may specify that writing operations are to take place in successive drum registers or in interleave fashion wherein writing operations take place in every 8th, 16th or 64th drum register.

As will be recalled from the previous description the first drum register which is to be written into has its address specified by the Drum Control Register 365. If the index interval code is 000 000, then the pulse received on the conductor 183 by the Index Interval Register 20 causes that Index Interval Register 20 to not deliver any pulse to the computer Input-Output Control and this absence of a pulse effectively instructs the computer Input-Output control to write in successive drum registers, the number of registers to be written into of course being defined by the signals stored in the IO Word Counter 380.

If the index interval code is 000 001, then the pulse received on conductor 183 is passed by the Index Interval Register 20 to one of the conductors of a cable 394 and a pulse on this conductor effectively instructs the computer Input-Output control to interleave its writing operations on the drum by a factor of 8, that is, the first register to be written into is that register identified by the address part of the Select Drum instruction which is now stored in the Drum Control Register 365 and after the first word is written into that register then the contents of that register should be increased by a factor of 8 thereby insuring that an interleave of 8 is effected.

In the event that the index interval code is 000 010, then a pulse received on conductor 183 is delivered by the Index Interval Register 20 to one of the other conductors of cable 394 thereby instructing the computer Input-Output Control to interleave by a factor of 16.

In the event that the index interval code is 000 100, a pulse received on conductor 183 is delivered by the Index Interval Register 20 to the other conductor of cable 394 to thereby instruct the computer Input-Output control to interleave by a factor of 64.

The signals stored in the Drum Selection Register 363 are suitably decoded by the Drum Selection Decoder 374 and those signals are delivered to the computer Input-Output control 8 where in response to a positive potential on a selected one of these conductors and after a suitable delay period sufficient to permit diode switching within the read-write circuits to take place, the computer Input-Output control causes a pulse to be delivered to the selected one of conductors 395, 396 or 397. If the drum selection decoder 374 produces a positive D.C. level on either of the conductors labeled Select RD, then the positive D.C. level is delivered through an OR circuit 379 to the computer Input-Output Control where after the above mentioned suitable delay pulse is delivered to the conductor 396. Similarly, a positive D.C. level on the conductor labeled Select AM causes pulses to be delivered to the conductor 395.

Pulses on conductors 395, 396 and 397 are delivered to the angular position counters 370, 371 and 372, respectively. Each of these counters is cleared to its Zero state by a pulse received on its input conductor labeled CD–IX Clear and a binary One is added to the contents of those counters in response to a pulse received on its input conductors labeled CD–3 (Step). A pulse received on the conductors 395, 396 or 397 causes the associated APC counter to transfer the signals stored at that particular instant to an In-Out Buffer Register 398 for storage therein. The signals stored in the In-Out Buffer Register 398 are delivered by way of the conductors of a cable 399 to the Drum Control Register 365 where those signals are compared with the signals previously stored therein which were received from the Address Register during the Select Drums instruction, indicating the first drum register address into which a writing operation can take place.

The computer Input-Output control after having caused the signals produced by the APC counter to the IO Buffer Register for comparison by the Drum Control Register delivers a pulse to a conductor 400 labeled Compare. A pulse on conductor 400 is delivered to the Drum Control Register 365 and will not be passed by that register to the conductor 401 if a successful comparison is made. If a comparison is not successful the pulse on conductor 400 will be passed to the conductor 401 and in response to a pulse on conductor 401 the computer Input-Output Control has various of its control flip-flops cleared. The ultimate effect of the receipt of a No Compare pulse by the computer IO control is that it does not cause the word currently stored in the Write register of the read-write circuits to be written on the drum since under this condition the proper address has not yet been reached into which a writing operation should take place, the angular position counters are transferred periodically to the IO Buffer Register and that register is subsequently cleared by the computer IO control by delivering a pulse to conductor 364 labeled Clear IO Buffer Register. If a successful comparison is made between the IO Buffer Register and the signals stored in the Drum Control Register, the pulse on conductor 400 is not passed by the Drum Control Register to the conductor 401. The absence of this pulse causes the computer IO Control to:

(1) Deliver a pulse to the conductor 402 labeled Write and this pulse is approximately 1.8 microseconds in duration which is sufficient when received by the read-write circuits 391 to cause a word stored in the write register to be written into the register of the drum now under those write heads in the field previously selected;

(2) Deliver a pulse to a conductor 403 to the Drum Write Register which is then cleared;

(3) Deliver a pulse to the conductor 383 (Step the IO Word Counter) and (4) The information is now stored in the computer IO Control element that the Write register is now empty and the Break Request flip-flop is again set;

(5) A pulse is delivered to one of the conductors 404, 405 or 406 provided that the Input-Output Control at PT–6 of Write time had been requested to interleave by 8, 16 or 64.

Since the Break Request flip-flop is now set, a third break-out operation is initiated upon receipt of the next pulse on the conductor 385 labeled Sense Break Request. Since the information is also stored that the Write Register is empty and the IO Register is full, the signals stored in the IO Register 131 are delivered by way of conductor 393 for storage in the Write Register of the read-write circuits 391. This transfer of signals is initiated by the computer IO Control delivering a pulse to the conductor 392 labeled IO Register to Drum Write Register. In the event that no signals were received on the conductors of cable 394 in response to the PT–6 of Write pulse on conductor 183 the computer IO Control effects breakout operations as above described whenever a word has actually been written on the drum, until such time as the IO Word Counter 380 delivers an End Carry pulse by way of conductor 378 to the computer IO Control and after the first word is written on the drums the subsequent words are placed in the registers sequentially in adjacent registers. In the event however that a pulse is received on one of the conductors of cable 394 in response to the PT–6 of Write command 183, the computer IO control causes the word in the Write register to be placed on the drum only when a successful comparison has been indicated by the Drum Control Register 165 and after a given word is placed on the drum the contents of the Drum Control Register are altered so that the next word will not be placed on the drum until another successful comparison has been made. A pulse on conductor 404 causes the number stored in the Drum Control Register to be increased by a factor of 8; therefore if a successful comparison was made in the Drum Control Register that word is written on the drum immediately and the number stored in the Drum Control Register is increased by 8 so that the next successful comparison will only occur when the angular position counter has counted 8 registers. Pulses on conductors 405 and 406 cause similar operations; however the interleaving in response to pulses on those conductors is done by a factor of 16 and 64, respectively. When the required number of words as specified by the IO Word Counter 380 have actually been transferred from the main memory, the IO Word Counter delivers a pulse to conductor 378 End Carry. In response to this pulse the computer IO Control ultimately delivers a pulse to conductor 384 labeled Clear and IO Interlock which when received by the Cycle Control of the Instruction Control Element delivers a negative D.C. level at its output labeled IO Interlock On.

In the preferred embodiment the drum 4 is that type of drum known as an auxiliary memory and therefore the computer has access to that drum for both reading and writing operations. In normal use the auxiliary drum is used for storing such type of information as mathematical tables, instruction word storage and constants. In the preferred embodiment drum systems 5 and 6 are employed for storing information to be delivered to a suitable load device not shown. Although the computer has access to those drums for both reading and writing operations, the information normally stored on those drums is not necessarily the type of information stored in the auxiliary memory drum. Instead the information may such information as final results of computations and information received by the computer from some suitable input or output device, not shown. For this reason each of the drum systems 5 and 6 in addition to the write heads to which the computer has access, also have a set of read heads 415 and 416, respectively, from which the signals stored on the drum may be delivered to suitable output equipment. Since the signals stored in the drums 5 and 6 are to be used for energizing output equipment which is slow in comparison to computer equipment, successive words read from those drums must then be displaced in time by an amount equal to or greater than the data acceptance rate of the output device. Many output equipments have a data acceptance rate which is much greater than the time spacing between adjacent drum registers and therefore the information should be stored in those drums such that successive words would be read from registers which are greatly displaced from one another; for example, those successive words should be placed in registers which are spaced apart by 7 registers (interleave of 8), spaced apart by 15 registers (interleave of 16) or spaced apart by 63 registers (interleave of 64).

READING FROM THE DRUMS

Figure 6D:
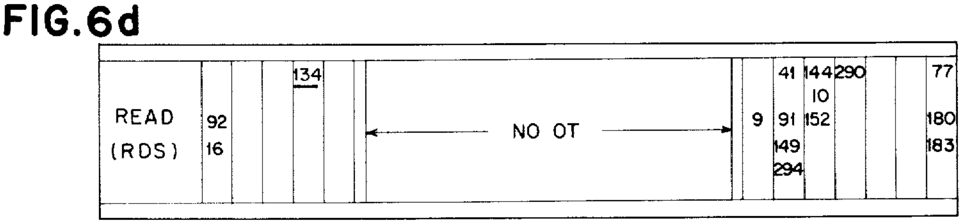

In order to effect a reading operation from any one of the drums the program must include a sequence of three instructions. These three instructions which are the Load Address Counter instruction, Select Drums instruction and Read, are preferably performed in the order as stated. Drum reading operations like drum writing operations as above described are normally performed on a block basis, that is, the sequence of three instructions merely establishes that the first word read from the drum is to be stored in a specified memory address register (whose address is indicated by the Load Address Counter instruction), subsequent words are to be stored in successively higher order addresses in memory, that words are to be transferred from a drum to main memory (the Select Drums instruction), the first word read from the drum is to be taken from a particular drum address (the drum address being specified by the Select Drums instruction) and that a specified maximum number of words is to be read from the drum (the maximum number of words being specified by the read instruction). The Load Address Counter instruction and the Select Drums instruction during a drum reading operation perform exactly the same results as previously described with respect to drum writing operations. As indicated in FIG. 6*d*, the read instruction causes the following commands besides the common commands described with respect to Table 10 above, to be generated:

*Table 16*

| Command Number | Name | Time |
|---|---|---|
| 134 | Pause | PT-10 |
| 149 | Clear the IO Word Counter | PT-1 |
| 294 | Set IO Interlock On | PT-1 |
| 141 | Clear the IO Register | PT-2 |
| 152 | Address Register Complement to IO Word Counter. | PT-2 |
| 290 | Sense IO Word Counter | PT-3 |
| 180 | PT-6 on Read | PT-6 |
| 183 | PT-6 on Read or Write | PT-6 |

The operation performed by these commands is substantially identical with that described with respect to Table 14 above except that at PT–6 time the command 180, PT–6 on Read is generated instead of command 182, PT–6 on Write. In the event that the read instruction specifies a zero number of words to be transferred, then essentially the same results are obtained as those produced during the write zero instruction. In the event that the read instruction specifies a number of words to be written on the drum which is greater than zero, the command PT–6 on Read 180 being delivered to the computer Input-Output control will not result in a pulse being delivered to the conductor 384 (Clear the IO Interlock) during the read instruction. The instructions of the program subsequent to the read instruction will be executed provided that IP pulses are delivered to the command generator 27 of the Instruction Control Element 7. When the transfer of a word from the drum to memory is actually ready to take place, controls are effected to interrupt the generation of IP pulses. It is to be understood that if one of the instructions of the Input-Output class appears in the program before a pulse is received on the conductor 384 (Clear the IO Interlock) then at PT–10 time of that instruction the aforementioned conditional command 134 (Pause) will be generated which as will be apparent from the subsequent description effectively prevents further computer commands of that instruction from being generated until the Clear IO Interlock pulse has been received. If as previously assumed the read instruction specifies a number of words greater than zero, the PT–6 on Read pulse on conductor 180 causes the computer IO Control to deliver a positive D.C. level to a conductor 412, and also to deliver a pulse to one of the conductors 395, 396 or 397 after a suitable delay period sufficient to permit drum switching as previously described. The particular one of those conductors 395, 396 or 397 which receives a pulse will be dependent upon which of the output conductors of the Drum Selection Decoder 374 is positive.

In the preferred embodiment the time spacing between like points of two adjacent drum registers is approximately 10 microseconds. In order to establish the time points during drum registers, each drum includes an index channel and a timing channel. A timing channel is effectively a sequence of recorded binary One signals around the periphery of the drum. The index channel is effectively a series of binary Zero signals recorded around the periphery of the drum with one binary One signal recorded at some arbitrary point. In the preferred embodiment drum 4 has 2,048 binary One signals recorded in its timing channel whereas the drums of drum systems 5 and 6 have 2,060 binary Ones recorded in their timing track; however, those two drum systems have an effective gap therein of 12 registers thereby providing 2,048 registers. The signals recorded in the timing channel and index channel of drum 4 are delivered to a drum timing circuit 407 and the timing and index channel signals of drum systems 5 and 6 are delivered to drum timing circuits 408 and 409, respectively. The drum timing circuits essentially function as follows:

(1) In response to a binary One signal received from the timing track the drum timing circuit produces 4 time spaced pulses designated as DTP–1, DPT–2, DTP–3 and DTP–4 which occur at 2½ microseconds intervals. DTP–1 pulses appear on a given conductor and therefore are spaced in time by 10 microseconds. DTP–2 pulses appear on another conductor and although these pulses are also 10 microseconds apart, they lag the DTP–1 pulses by 2½ microseconds. DTP–3 and DTP–4 pulses are similarly 10 microseconds apart and lag their preceding time pulses by 2½ microseconds.

(2) The drum timing circuits 408 and 409 inhibit their drum timing pulse outputs during 12 register times beginning with the register following a binary One signal received from the Index channel.

(3) In response to an index pulse (binary One) received from their respective index channels the drum timing circuits deliver a CD index pulse; this index pulse is coincident in time with a DTP–1 pulse and this index pulse is considered to be coincident with the DTP–1 time of the 2,048th register.

A pulse delivered to any one of the conductors 395, 396 or 397 occurs in response to DTP–1 pulses from the selected Drum Timing circuit. It should be noted that DTP–1 pulses are not received from the drum timing circuits 408 and 409 during the 12 register gap. In response to a pulse on any one of those conductors its associated APC counter contents is delivered to the Input-Output Buffer Register and in turn is delivered in the form of D.C. levels to the Drum Control Register 365. One microsecond following the pulse on conductor 395, 396 or 397 the computer Input-Output Control 8 delivers a pulse to conductor 400 (Compare). If a successful comparison is made by the Drum Control Register no pulse will be received on conductor 401 (No Compare). Two microseconds after delivering a pulse to any one of the conductors 395, 396 or 397, the computer Input-Output Control 8 delivers a pulse to conductor 364 (Clear) which causes clearing of the Input-Output Butter Register 398. If no pulse is received on the conductor 401 (No Compare), the signals read from the drum register are delivered in response to a pulse on conductor 410 (Read Sample) by the read-write circuits 391 to the IO Buffer Register by way of the conductors of cable 411. When the computer Input-Output Control 8 delivers a pulse to conductor 410 (Read Sample), the information stored in the computer Input-Output Control that the IO Buffer Register is now full. The computer Input-Output Control further includes a storage device for indicating whether the IO Register is full or empty. With the information stored that the IO Register is empty and the IO Buffer Register is full, the computer Input-Output Control delivers a pulse to a conductor 413 which when received by the Input-Output Buffer Register causes the signal stored therein to be delivered to the Input-Output Register 381. When a transfer is made from the Input-Output Buffer Register to the IO Register a Break Request flip-flop is set in the computer Input-Output Control. In response to a pulse on conductor 385 (Sense Break Request) a pulse is delivered to the conductor 386 (Set Break flip-flop) and a break-in operation is performed by the computer Input-Output control. When the Break Request flip-flop is set in the computer Input-Output control, it delivers a pulse to conductor 383 (Step IO Word Counter).

This drum break-in operation essentially starts a memory cycle and during that memory cycle the word now stored in the IO Register 381 is delivered to the main memory 1 where it is stored at the location specified by the contents of the IO Address Counter 361. This memory cycle, like any other, begins at TP–0 and ends at TP–11. In order to distinguish this type of memory cycle from the other memory cycles, the time periods from 0 through 11 are referred to as Break-In (BI) pulses, BI–0 through BI–11. Since these BI time periods are controlled by the TP pulses generated by the Time Pulse Distributor, they are substantially coincident in time therewith. As noted previously the command 9 (Clear Memory Controls), 41 (Clear Memory Buffer Register) and 10 (Start Memory) are generated directly from the output of the Time Pulse Distributor. During the break-in operation of the computer Input-Output control the following commands are generated by the computer Input-Output Control at the times indicated:

*Table 17*

| Command Number | Name | Time |
|---|---|---|
| 387A | IO Address Counter to Memory Address Register. | BI-1 |
| 387B | Clear Break Request Flip-Flop | BI-1 |
| 388 | Add One to the IO Address Counter | BI-2 |
| 420B | Clear IO Register Status Flip-Flop | BI-2 |
| 420A | IO Register to Memory Buffer Register | BI-2 |
| 420C | Inhibit Sample | BI-2 |
| BI-11 | Sample for Clearing IO Interlock Flip-Flop | BI-11 |

In response to the command 9, Clear Memory Controls, the command 10 (Start Memory) and the command 420C (Inhibit Sample), the main memory performs the previously noted write memory operation. A word written in memory is the first word accepted from the drum since the command 420A is generated at BI–2 time and this command also causes the signal stored in the IO Register to be transferred to the Memory Buffer Register by way of the conductors of a cable 421. The memory location into which this word is written is the location specified by the contents of the IO Address Counter since the command 387A (IO Address Counter to Memory Address Register) is generated at BI–1 time.

The command 388 (Add 1 to the IO Address Counter) is delivered to the IO Address Counter 361 which in response to this pulse causes the number stored therein to be increased by one so that the second word read from the drum will be stored in the next higher address in memory. During the time period BI–1 through BI–5 the information is stored in the computer IO Control that the IO Register status has been made empty (command 420B). If no pulse had been received on the conductors of cable 394 in response to the PT–6 of Read instruction, successive drum registers will be read after having first made a successful comparison in the Drum Control Register 365. In this case the IO Buffer Register would now contain the second word read from the drum. In the event that a pulse was received on one of the conductors of cable 394 indicating that an interleaving read operation was to take place, then the second word would not yet have been accepted for delivery to the IO Buffer Register. In any event since the IO Buffer Register is full, its contents are delivered to the IO Register and the Break Request flip-flop is set in the computer Input-Output control and a pulse is delivered to conductor 383 (Step the IO Word Counter). At any time during a read operation that the Break Request flip-flop is set, another break-in operation as above described will take place in response to a pulse on conductor 385 (Sense Break Request flip-flop). If when a pulse is delivered to the conductor 383 (Step the IO Word Counter) and in response to that pulse the IO Word Counter delivers and End Carry pulse to conductor 378, this pulse when received by the computer Input-Output Control clears various of the control flip-flops therein and is also delivered to the conductor 384 (Clear IO Interlock). A pulse on conductor 384 is delivered to the Cycle Control of the Instruction Control to produce a negative D.C. level on the output conductor labeled IO Interlock On.

COMPUTER INPUT-OUTPUT CONTROL

The computer Input-Output Control as its name implies is a group of logical circuits whose primary function is to control the transfer of information between the selected drum and the main memory of the Computer System. Since those logical circuits are for the most part independent in operation they will be described separately according to the operations performed.

Reference is now made to FIGS. 7*a* through 7*h* which when arranged according to FIG. 7, illustrate in logical block form those circuits known as the computer Input-Output Control.

During the Select Drums instruction the computer Input-Output Control receives first the command Deselect (155) followed by the command Select Pulse for Drums (325). The Deselect command 155 causes various flip-flops in the computer Input-Output Control to be cleared to their Zero state. The particular ones which are cleared by this command will be apparent from an inspection of the drawing. The command Select Pulse for Drums (325) causes a Drum Operate flip-flop 430 to be set in its One state. In a preferred embodiment of this invention the computer Input-Output Control includes many logical circuits not illustrated in the drawings for the purpose of controlling information transferred between main memory and various input-output devices such as card machines, tape machines, light registers, storage arrays and so forth, also not shown. In the interest of clarifying the description of this invention the computer Input-Output Control is shown in its elemental form sufficient to illustrate the principles of this invention incorporating addressable drums and signal transfer between those drums and the main memory in either direction. In the preferred embodiment as illustrated, the computer Input-Output Control is required to operate only in the drum operate mode and therefore the Drum Operate flip-flop 430 is provided to store this fact. In a preferred embodiment the computer Input-Output Control is required to operate in various other modes including tape mode, card machine mode, and so forth. It will therefore be apparent that suitable storage devices such as flip-flops are provided to store what particular fact of operating mode should be performed and each of the additional modes may include a flip-flop similar to the Drum Operate flip-flop of the illustrated embodiment.

During the Read instruction the computer Input-Output Control receives the following commands in the order stated:

*Table 18*

| Command | Conductor |
|---|---|
| Set IO Interlock On | 294 |
| Sense the IO Word Counter | 290 |
| PT-6 on Read | 180 |

The command, Set the IO Interlock On (294) causes:

(1) an IO Buffer Status flip-flop 432 (FIG. 7*d*) to be set in its Zero state.

(2) an IO Register Status flip-flop 433 to be set in its Zero state, (3) an IO Interlock flip-flop 434 to be set in its One state, (4) is delivered through an OR circuit 435 to the conductor Clear the IO Buffer Register 364.

(5) causes a write flip-flop 436 and a read flip-flop 437 to be cleared, (6) causes a Word Counter Status flip-flop 438 to be set in its One state, (7) clears an Interleave mode flip-flop 439, and (8) causes Interleave by 8, Interleave by 16, and Interleave by 64 flip-flops 440, 441 and 442 to be cleared.

The command Sense the IO Word Counter 290 causes a Sense Word Counter flip-flop 448 to be set in its One state. The command PT–6 on Read 180 causes flip-flop 448 to be cleared. Flip-flop 448 is therefore in its One state for the period of time between the command Sence the IO Word Counter and the command PT–6 on Read. If during that time period a pulse is received on the conductor 378 (IO Word Counter End Carry) then a gate 449 (conditioned by the One output of flip-flop 448) will pass the pulse through OR circuits 450 and 451. The output of OR circuit 450 is delivered to the conductor 384, Clear Cycle Control IO Interlock, and is also delivered to the Clear input of the IO Interlock flip-flop 434. A pulse on conductor 384 also causes the Pause Delay Sync flip-flop of the instruction control to be cleared. The command PT–6 on Read samples a gate 452 which is conditioned by the One output of an IO Word Counter Status flip-flop 438. Flip-flop 438 is set in the One state by the command Set the IO Interlock On and is cleared by a pulse on conductor 378 (IO Word Counter End Carry). A pulse passed by gate 452 causes a read flip-flop 436 to be set in the One state and this flip-flop is cleared by the command Set the IO Interlock On. If the IO Word Counter Status flip-flop 438 is not set to its Zero state in the time period between the commands Set the IO Interlock On and PT–6 on Read, then the read flip-flop will be set in its One state at the completion of the Read instruction. The command PT–6 on Read also samples another gate 453 which is conditioned by the output of an AND circuit 454. AND circuit 454 receives the One output of the IO Word Counter Status flip-flop 438 and the One output of the Drum Operate flip-flop 430. The PT–6 on Read command will therefore be delivered to a conductor 455 if the IO Word Counter status is not equal to Zero and the Drum Operate flip-flop is on. A pulse on conductor 455 causes an address mode flip-flop 456 to be cleared, the Read-Write Control Switch flip-flop 445 to be cleared, the write flip-flop 446 to be cleared and the read flip-flop 447 to be set in its One state. This Start Read pulse on conductor 455 also samples a gate 457 which is conditioned by the One output of the read-write control switch 445. Since flip-flop 445, called the Read-Write Control Switch, is only set in its One state during a drum writing operation, this Start Read pulse on conductor 455 will be passed by gate 457 only in the event that the previous writing operation has been completed and the present read instruction was not preceded by a Select instruction. Such a condition might occur when a given field on a drum was previously selected for a writing operation and that operation has been completed and it is now desired to perform a reading operation with that same field. However, before such a reading operation could take place it is necessary to allow enough time for the read-write diode switching operation to have been completed before the actual reading from the drum begins. A pulse passed by gate 457 is delivered through an OR circuit 460 to the input of a single-shot 461. Single-shot 461 delivers a positive D.C. level to its output conductor except for a brief interval of time following the receipt of a pulse at its input. This brief interval of time is made sufficient to have permitted the read-write switching operation of the drum to have been completed.

In a preferred embodiment the time period of the negative D.C. level at the output of single-shot 461 is approximately 120 microseconds. The output of single-shot 461 and the output of a single-shot 458 are delivered through an AND circuit 462 as a D.C. level input to another AND circuit 463 and another AND circuit 464. The output of AND circuit 462 is therefore negative for approximately 120 microseconds following the Start Read command in the event that the present Read instruction was not preceded by a Select instruction and the previous drum operation was a write operation. The other leg of AND circuit 464 is from the One output of read flip-flop 447 which was set in its One state by the Start Read command 455. The output of AND circuit 464 is delivered through an Or circuit 465 to the conditioning input of a gate 466. Gate 466 is sampled by drum timing pulses CD–4 from the selected drum. A pulse pasesd by gate 466 causes the read-write switch status flip-flop 443 to be set in its One state. The One output of flip-flop 443 conditions one leg of each of two AND circuits 468 and 469. AND circuit 468 receives at its other input the One output of the read flip-flop 447. The output of AND circuit 468 is delivered to an AND circuit 470, the other input of which is conditioned by the One output of the address mode flip-flop 456. The output of AND circuit 468 is also delivered through an OR circuit 471 to one of the inputs of an AND circuit 472. The other input of AND circuit 472 is conditioned by the Zero output of the address mode flip-flop 456. AND circuit 472 conditions each of three gate circuits 473, 474 and 475 which gates are sampled by their respective CD–1 pulses of their associated drum. For example, if the AM drum had been selected by the Select Drums instruction then a positive D.C. level on the conductor 476, labeled Select AM, conditions the drum timing pulse gates 477, 478 and 479 to pas CD–1, CD–3 and CD–4 pulses respectively. The CD–1 pulses passed by the gate 477 when the AM drum is selected, sample gate 474 and deliver a pulse to conductor 395 (AM APC to IO Buffer Register). This same pulse passed by gate 474 is also delivered through an OR circuit 481 to cause an address mode flip-flop 456 to be set in its One state and also causes an Accept flip-flop 482 to be set in its One state (FIG. 7*d*). The pulse passed by OR circuit 481 is also delivered through a suitable delay unit 483 to the conductor 400. A pulse on conductor 400 is delivered to the drum control register (FIG. 1*b*) to effect a comparison in the manner previously described. A pulse on conductor 400 is also delivered through a suitable delay unit 485 (FIG. 7*c*) and through an OR circuit 435 to the conductor 364 to cause a clearing operation of the IO Buffer Register.

From the foregoing it can be seen that in response to the PT–6 on Read command the computer Input-Output Control causes the contents of the selected angular position counter to be delivered to the IO Buffer Register; after a suitable delay the Drum Control Register is instructed to effect a comparison between the contents of the angular position counter and the contents of the Drum Control Register and shortly thereafter the IO Buffer Register and shortly thereafter the IO Buffer Register is cleared.

If in response to the Compare command on conductor 400 the comparison was successful, then the Drum Control Register will not cause a pulse to be delivered to the computer Input-Output Control on the conductor 401. The pulse passed by OR circuit 481 causes the address mode flip-flop 456 to be set in its One state, thereby conditioning the other input of the AND circuit 470. AND circuit 470 has its output delivered as a conditioning input of a gate 490. Since gate 490 is sampled by the selected CD–1 pulse it will pass the next received CD–1 pulse through a suitable delay unit 491, through an OR circuit 492 to the conductor 410, Read Sample. It should be noted that the CD–1 pulse passed by gate 490 is actually a pulse 10 microseconds following a pulse passed by OR circuit 481. Therefore the angular position counter contents indicating a given register will be sampled at 1 time of the following drum register.

In the event that a pulse is received on the conductor 401 (No Compare) indicating that the proper address has not been arrived at for a reading operation, the pulse causes flip-flop 456 to be returned to its Zero state, thereby preventing a read sample pulse. If a No Compare pulse is received thereby setting flip-flop 456 to its Zero state, AND circuit 472 again conditions gate 474 to pass the next AM CD–1 pulse to the conductor 395. A pulse on conductor 395 again causes angular position counter contents to be delivered to the IO Buffer Register for another comparison operation in the Drum Control Register. As long as No Compare pulses are received this sequence of operations is repeated for each drum register of the selected drum.

When the comparison is successful and a pulse is delivered to the conductor 410 in the manner above described, the pulse passed by gate 490 to that conductor through the delay unit 491 is also delivered to an IO Buffer Load Status Sync flip-flop 495 and causes that flip-flop to be set in its One state. When that flip-flop is in the One state it conditions a gate 496 to pass the next received 2 mc. pulse to set an IO Buffer Load Status flip-flop 497 in the One state. When the flip-flop 497 is in the One state it conditions a gate 498 to pass the next 2 mc. pulse to sample a gate 500 which is conditioned by the One output of the Drum Operate flip-flop 430. A pulse passed by gate 500 samples a gate 501 and another gate 502. Those gates are respectively conditioned by the Zero and One outputs of the Accept flip-flop 482. The Accept flip-flop 482 is set in its One state by pulses passed by OR circuit 481 and if the word is acceptable, that is, no pulse is received on the conductor 401, the Accept flip-flop will remain in its One state. However, if a No Compare pulse is received on the conductor 401, this pulse is delivered through OR circuit 503, another OR circuit 504, and still another OR circuit 505 to cause the Accept flip-flop to be cleared.

A pulse passed by gate 500 will therefore find gate 502 conditioned and the pulse will be pasesd by that gate through an OR circuit 507 to the conductor 383 (Step the IO Word Counter). The pulse passed by gate 502 is also delivered through an OR circuit 508 to cause a flip-flop 432 to be set in its One state. When flip-flop 432 is in the One state it conditions one leg of an AND circuit 509, the other input of which receives the Zero output of the IO Register Status flip-flop 433. Since the IO Register Status flip-flop is set in its Zero state by the command 294 (Set the IO Interlock On), that flip-flop will be in its Zero state at the time that the first word is placed in the IO Buffer as indicated by the flip-flop 432 being in its One state. Under these conditions AND circuit 509 conditions a gate 510 to pass the next 2 mc. pulse to the conductor 413 (IO Buffer Register to the IO Register).

A pulse passed by gate 510 causes the IO Buffer Status flip-flop 432 to be set in its Zero state, the IO Register Status flip-flop to be set in its One state and delivers a pulse through an OR circuit 511 to sample a gate 512. Gate 512 is conditioned by the One output of the Word Counter Status flip-flop 438 which causes gate 512 to be conditioned whenever the IO Word Counter is not equal to zero. Even though the pulse has already been applied to the conductor 383 (Step the IO Word Counter) a pulse will not be received on conductor 378 (IO Word Counter End Carry) which sets flip-flop 438 to Zero before the pulse passed by gate 510 will have sampled gate 512. Therefore the pulse will be passed by gate 512 and set a Break Request Sync flip-flop 515 in its One state. When flip-flop 515 is in its One state it conditions a gate 516 to pass the next 2 mc. delayed pulse to set the Break Request flip-flop 517 in its One state. When flip-flop 517 is in its One state it conditions a gate 518 to pass the next received command 385 (Sense Break Request flip-flop). A pulse passed by gate 518 causes a Break flip-flop 519 to be set in its One state and this same pulse is delivered to a conductor 386 (Set TPD Break flip-flop).

When flip-flop 519 is in its One state it conditions one input of an AND circuit 520, the other input of which is the One output of the Read flip-flop 436 which is set in its One state by the command 180 (PT–6 of Read) whenever the IO Word Counter is not equal to zero at that time. The output of AND circuit 520 is delivered to a Break-In Distributor 521. The Break-In Distributor in response to this positive D.C. level and in response to the TP pulses received from the conductors of cable 26 causes the following conductors to be pulsed at the times indicated:

*Table 19*

| Command | Name | Time |
|---|---|---|
| 387A | IO Address Counter to the Memory Address Register. | BI–1 |
| 388 | Step the IO Address Counter | BI–2 |
| 420B | Clear the IO Register Status Flip-Flop | BI–2 |
| 420A | IO Register to Memory Buffer Register | BI–2 |
| 420C | Inhibit Sample | BI–2 |
| BI–11 | BI–11 Pulse | BI–11 |

The BI–1 pulse from the Break-In Distributor 521 is delivered through an OR circuit 523 to the conductor **387*a*. The BI–2 pulses from the Break-In Distributor 521 are delivered through an OR circuit 524 to the conductor 388; are delivered through an OR circuit 525 to the Zero input of the IO Register Status flip-flop 433 and are delivered to the conductors 420*a* and 420*c***.

The BI–11 pulses produced by the Break-In Distributor 521 are delivered through an OR circuit 526 to sample a gate 527 which is conditioned under either of the conditions (1) the IO Word Counter is equal to zero and the Drum Write Register status is full, (2) the IO Word Counter equals zero and the IO Register Status is empty. A pulse passed by gate 527 is delivered through a gate 528, through an OR circuit 450 to cause the IO Interlock flip-flop 434 to be set in its Zero state, and this pulse is also delivered to the conductor 384 (Clear the IO Interlock). The Break-In Distributor therefore causes the accepted word to be stored in memory and if at the end of that break-in cycle the IO Word Counter status flip-flop indicates that the IO Word Counter equals zero, the IO Interlock is turned off, thereby completing the reading operation. If, however, the IO Word Counter Status is not equal to zero, the word stored in the next drum register will be accepted and delivered to memory in a like manner if successive registers of the drum are to be read. If, however, an interleaving type of reading operation is to take place, the following operations result:

When a pulse is passed by gate 510 (FIG. 7*d*) as above indicated, this pulse is delivered through an OR circuit 530 to sample a gate 531. Gate 531 is conditioned by the One output of the flip-flop 439 which is set in its One state in response to the command PT–6 of Read or Write, provided that the Index Interval Register delivers a pulse to any one of the conductors of cable 394 in response to that PT–6 of Read or Write command. As will be recalled from the previous description, a pulse is delivered to one of the conductors of cable 394 if the Index Interval part of the read instruction or write instruction has a code indicating Interleave by 8, 16 or 64. If such a code was present in the read instruction, then flip-flop 439 will be in its One state when the pulse passed by OR circuit 530 samples gate 531. A pulse passed by gate 531 is delivered through an OR circuit 503 and another OR circuit 532 to cause flip-flop 456 to be set in its Zero state. A pulse passed by gate 531 also samples each of three gates 533, 534 and 535 which are respectively conditioned by the One outputs of flip-flops 440, 441 and 442. Flip-flop 440 will be in its One state when the read instruction has specified an interleave of 8 and therefore the pulse passed by gate 531 will be passed by gate 533 to the conductor 404. Similarly, if the read instruction specified an interleave of 16, the pulse would be passed by gate 534 to conductor 405, and if the read instruction had specified an interleave by 64, then gate 535 would pass the pulse to conductor 406. During an interleaving operation when the first word has been accepted and is being delivered to the IO Register (gate 510 delivers a pulse), then flip-flop 456 (FIG. 7*b*) is set in its Zero state in the same manner as though a pulse had been received on the conductor 401 (No Compare). Furthermore, a pulse is delivered to one of the conductors 404, 405 or 406. In response to a pulse on one of those conductors the signals stored in the Drum Control Register are modified, that is, a pulse on conductor 404 causes the number stored in the Drum Control Register to be increased by a factor of 8, a pulse on conductor 405 causes the number to be increased by a factor of 16, and a pulse on conductor 406 causes the number to be increased by a factor of 64. Since flip-flop 456 during an interleaving mode is returned to its Zero state after the first word is accepted, AND circuit 472 again conditions gate 474 to pass the next received AM CD–1 pulse to the conductor 395 to effect a transfer of the contents of the APC counter to the IO Buffer Register and the operation as described above with respect to searching for the first word, is repeated. Any time that a word is transferred to memory by the Break-In Distributor 521 and at BI–11 time the IO Word Counter Status is equal to zero, then the IO Interlock is turned off.

DRUM WRITING OPERATIONS

As previously described, three instructions, Load Address Counter, Select Drums and Write are performed to effect drum writing operations. The operation of a computer Input-Output Control during load address counter and select drum instructions have been previously described and therefore this discussion will deal with the operations within the computer Input-Output Control during and following Write instructions.

The command 182 (PT–6 on Write) is received by the computer Input-Output Control when this command samples a gate 540 which is conditioned by the AND circuit 454 when the Drum Operate flip-flop 430 is on and the IO Word Counter Status flip-flop 438 indicates that the word counter is not equal to Zero. The command 182 (PT–6 of Write) also causes the Sense Word Counter Status flip-flop 448 to be set in its Zero state and also samples a gate 541 which is conditioned by the Word Counter Status flip-flop 438 indicating that the word counter does not equal zero. If the write instruction specifies a number of words to be written which is greater than zero, a pulse will be passed by gate 541 to set a write flip-flop 436 in its One state. A pulse passed by gate 540 (FIG. 7*h*) is delivered through OR circuit 511 and gate 512 to set a Break Request Sync flip-flop 515 in the One state to condition gate 516. The 2 mc. delayed pulse passed by gate 516 sets the Break flip-flop 519 in the One state in the previously described manner. When flip-flop 519 is in the One state it conditions one leg of an AND circuit 543, the other input of which is conditioned by the One output of the write flip-flop 437. A pulse passed by gate 540 (FIG. 7*h*) also sets a 2nd Break-Out Request flip-flop 544 in its One state. A pulse passed by gate 540 also sets a write drums flip-flop 545 (FIG. 7*g*) and a Not Read drums flip-flop 546 in their One states. A pulse passed by gate 540 also causes flip-flop 456 (FIG. 7*b*) to be cleared, a read-write control switching flip-flop 445 to be set in its One state, a write flip-flop 446 to be set in its One state and a gate 547 to be sampled. When AND circuit 543 (FIG. 7*e*) receives a positive D.C. potential from the One output of the Break flip-flop 519 and a positive potential from the One output of the write flip-flop 437, it delivers a positive potential to a Break-Out Distributor 548. The Break-Out Distributor in response to this positive D.C. level and in response to the TP pulses on the conductors of cable 26, initiates a Break-Out cycle. Pulses are delivered through the following conductors during the Break-Out cycle at the times indicated:

*Table 20*

| Command | Name | Time |
|---|---|---|
| 387*a* | IO Address Counter to Memory Address Register. | BO–1 |
| 388 | Step the IO Address Counter | BO–2 |
| 389*a* | Set the IO Register Status Flip-Flop to Full | BO–7 |
| 389*b* | Memory Buffer Register to the IO Register | BO–7 |
| BO–11 | BO–11 Pulse | BO–11 |

The pulse at BO–1 time is delivered through OR circuit 523 to the conductor **387*a*. The pulse at BO–2 time is delivered through OR circuit 524 to the conductor 388. The pulse at BO–7 time is delivered to the conductor 389*b* and is also delivered by way of the conductor 389*a* through an OR circuit 550 to cause the IO Register Status flip-flop 433 to be set in its One state. The BO–1 pulse further causes the Break Request flip-flop 517 to be cleared. The BO–11 pulse is delivered through the OR circuit 526 to sample gate 527 to effect clearing of the IO Interlock flip-flops in the manner previously described; however this clearing will only take place under the condition that the IO Word Counter is equal to zero and the Write Register Status is empty as indicated by the write register status flip-flop 551 being in the Zero state during a Not Read drums operation as indicated by a positive D.C. level on the One output of flip-flop 546. When the IO Register Status flip-flop 433 is in its One state indicating that the IO Register is now full, that D.C. level on the One output of flip-flop 433 conditions one leg of an AND circuit 552, the other inputs of which are the Zero output of the Drum Write Register Status flip-flop 551 and the One output of the Write Drum flip-flop 545. Since the Drum Write Register Status flip-flop is cleared by a Deselect pulse which occurs during the Select Drums instruction, flip-flop 551 is in its Zero state when the first word is transferred from main memory to the IO Register and since flip-flop 545 is set in its One state at PT–6 time of the write instruction, AND circuit 552 now conditions a gate 553** to pass the next 2 mc. pulse to conductor 392 (IO Register to Drum Write Register) and this pulse is also delivered to the Set input of flip-flop 551, causes flip-flop 433 to be cleared, a Drum Write Register Status Sync flip-flop to be cleared and a Write Register Status flip-flop 444 (FIG. 7*b*) to be set in its One state.

AUTOMATIC 2nd BREAK-OUT

Figure 7G:
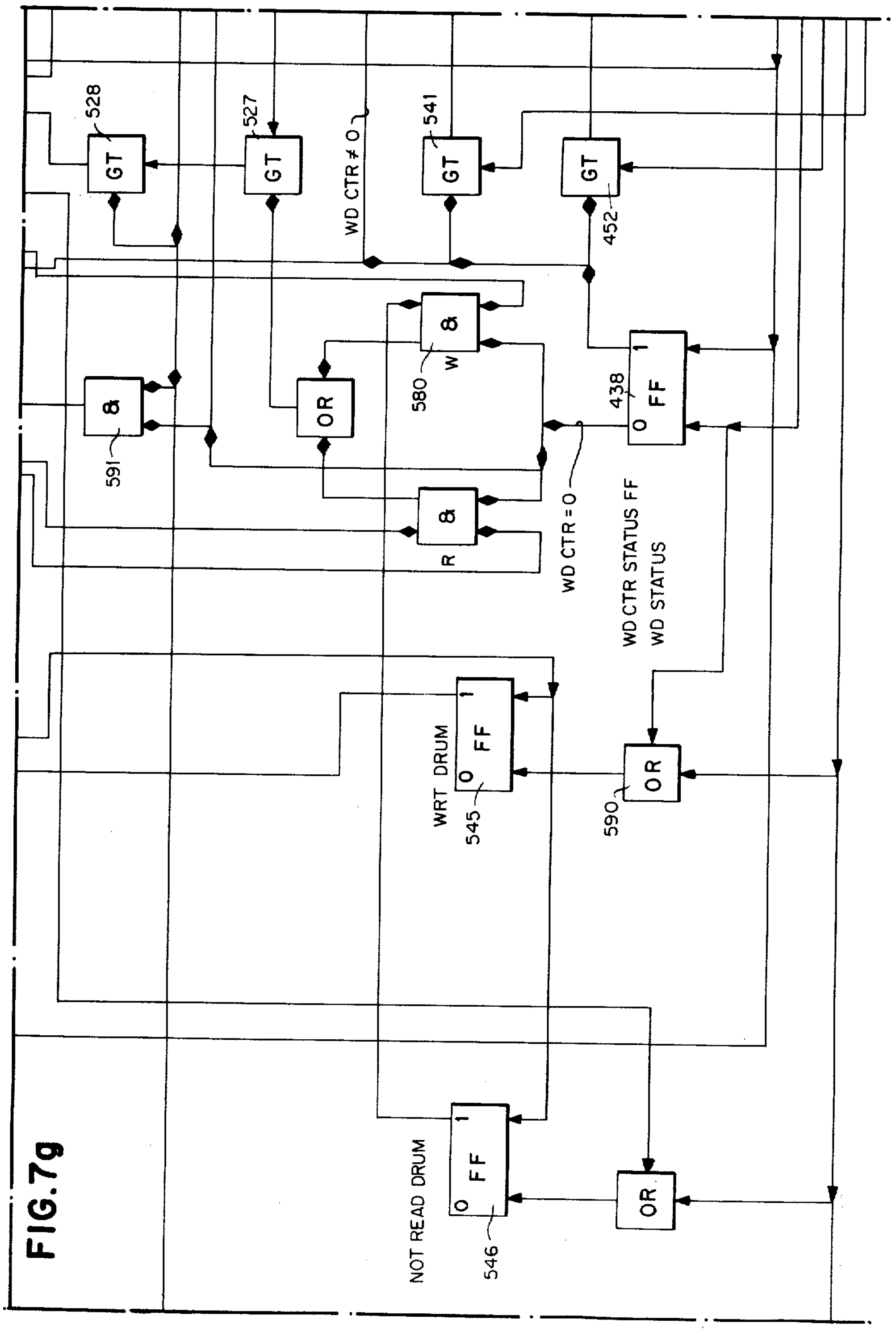
Figure 7H:
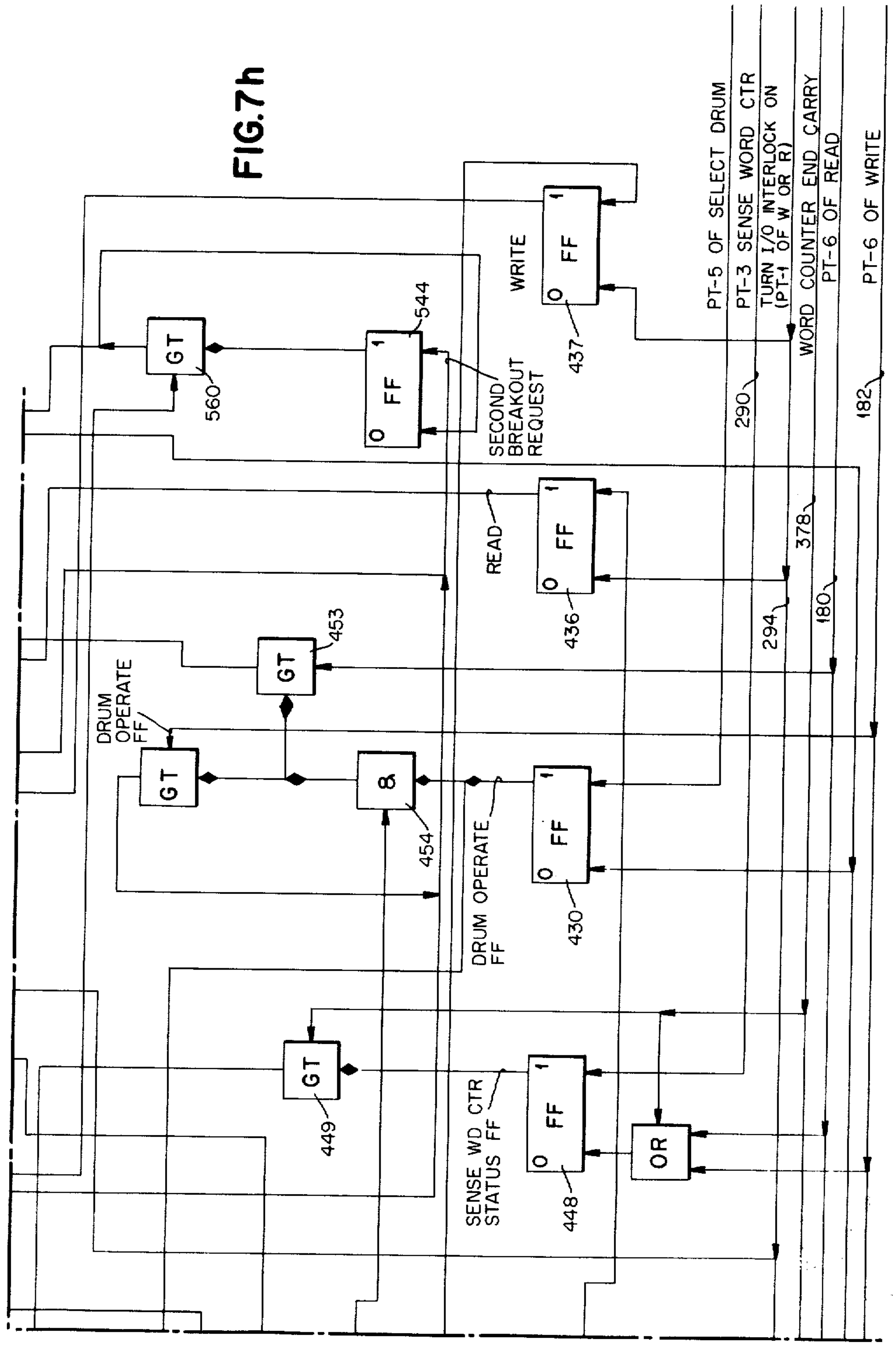

As will be recalled from the previous description PT–6 of Write when passed by gate 540 causes an initiation of the first Break-Out cycle and furthermore this pulse passed by gate 540 causes the 2nd Break-Out Request flip-flop 544 to be set in its One state (FIG. 7*h*). When flip-flop 544 is in its One state, it conditions a gate 560 to pass the next pulse from gate circuit 553. Gate circuit 553, as will be recalled, causes the word read from memory during the first Break-Out cycle to be transferred from the IO Register to the Drum Write Register. This pulse is the pulse which samples gate 560. The pulse passed by gate 560 is delivered through an OR circuit 511 to sample a gate 512. Gate 512 is conditioned by the One output of the IO Word Counter Status flip-flop 438 and therefore this pulse will be passed by gate 512 since the IO Word Counter is not stepped until a word has actually been placed in the drum and therefore the IO Word Counter status flip-flop 438 will remain in its One state regardless of the number of words to be written on the drum if the number be greater than zero. At the end of this second Break-Out cycle the second word is stored in the IO Register and the first word may or may not be still be stored in the Write Register. Words are transferred from the Drum Write Register onto the drum in the following manner.

As will be recalled from the above description the PT–6 of Write command samples gate 540 and the pulse passed by gate 540 (FIG. 7*h*) initiates the first break-out cycle and the second break-out cycle as above indicated. The pulse passed by gate 540 also causes flip-flops 545, 546 (FIG. 7*g*), 445 and 446 (FIG. 7*a*) to be set in their One state. Furthermore that pulse causes flip-flop 456 to be cleared (FIG. 7*b*).

In the event that the flip-flop 445 was in its Zero state at PT–6 time, then gate 546 would pass that PT–6 of Write command to the single-shot 461 to decondition the previously mentioned control circuits for a period of approximately 120 microseconds. In the event, however, that flip-flop 445 had been in its One state when the PT–6 of Write command was received, this deconditioning period would not take place. When flip-flop 446 is in its One state, it conditions one input of AND circuit 463, the other input of which is the output of AND circuit 462. AND circuit 463 conditions gate 466 and therefore gate 466 will be conditioned at approximately PT–6 time of Write if the drums had been previously selected to Write, or at least will be conditioned 120 microseconds after PT–6 of Write. Gate 466 is sampled by CD–4 pulses from the selected drum through OR circuit 561. A pulse passed by gate 466 causes the Read-Write switch status flip-flop 443 to be set in its One state (FIG. 7*b*). When that flip-flop is in its One state, it conditions one input of AND circuit 469, another input of which is the One output of flip-flop 446 and the other input of that AND circuit is the One output of write register status flip-flop 444. Flip-flop 444 is set to its One state when the previously mentioned gate 553 causes the word to be transferred from the IO Register to the Drum Write Register. AND circuit 469 has its output connected through an OR circuit 471 to condition one input of AND circuit 472, the other input of which is the Zero output of flip-flop 456 which was set to Zero by the Start Write command. AND circuit 472 therefore conditions the gates 473, 474 and 475 which are sampled by their respective CD–1 pulses. Pulses passed by the gates 473, 474 and 475 cause transfer of their associated APC counters in the manner previously described and furthermore cause a comparing operation to take place in the Drum Control Register and flip-flop 456 (FIG. 7*b*) is set in its One state as well as flip-flop 482 (FIG. 7*d*).

In the event that a No Compare pulse is received on conductor 401 from the Drum Control Register then flip-flops 456 and 482 will be returned to their Zero state before the following CD–3 time. In the event, however, that no pulse is received on the conductor 401 (No Compare) flip-flop 456 and flip-flop 482 will remain in their One states. Flip-flop 456 being in its One state causes a gate 563 to be conditioned since the One output of that flip-flop is applied as an input to an AND circuit 564, the other input of which is from the previously mentioned AND circuit 469. In this event, the next CD–3 pulse is passed by gate 563 to cause a flip-flop 565 to be set in its One state which is automatically returned to its Zero state after a suitable delay by means of a delay circuit 566 and therefore the output of flip-flop 565 on conductor 402 (Write) is made positive for a sufficient length of time to permit the write circuits to effect a drum writing operation. This pulse passed by gate 563 is also delivered through another delay unit 567 to deliver that pulse to conductor 403 (Clear Drum Write Register). This pulse passed by delay unit 567 is delivered by way of the conductor labeled Drum Word Demand to cause the Write Register Status flip-flop 444 to be cleared through OR circuit 568, a Word Demand Sync flip-flop 569 (FIG. 7*d*) to be set in its One state, the Drum Write Register Status Sync flip-flop 571 to be set in its One state after a suitable delay effected by delay unit 573 and through OR circuit 511 causes gate 512 to be sampled. Furthermore, this pulse passed by delay unit 567 is delivered through OR circuit 530 (FIG. 7*c*) to sample gate 531 which is conditioned by the One output of flip-flop 439.

A pulse passed by gate 531 effects an interleaving operation in the same manner as that previously described with respect to drum reading operation. The pulse which samples gate 512 (FIG. 7*e*) will be passed by that gate to initiate another Break-Out cycle in the event that the IO Word Counter Status flip-flop 438 does not indicate that the IO Word Counter has gone to Zero. As previously mentioned the pulse passed by delay unit 567 (Word Demand) causes the drum write register status sync flip-flop 571 to be set in its One state after a suitable delay to insure that the Write Register is cleared and that the Drum Write Register is in fact cleared. When the Write Register status flip-flop 571 is in its One state, it conditions a gate 575 to pass the next 2 mc. pulse through an OR circuit 576 to cause the Drum Write Register Status flip-flop 551 to be cleared. If the IO Register is full at this time as indicated by the IO Register status flip-flop 433 (FIG. 7*e*) being in its One state and the Write Drum flip-flop 545 is in its One state indicating that a writing operation is still in process, AND circuit 552 will then condition gate 553 to pass the next 2 mc. pulse to effect the transfer of the word in the IO Register to the Drum Register.

In response to each Word Demand pulse, the Word Demand Sync flip-flop 569 (FIG. 7*b*) is set in its One state to therefore condition a gate 584 to pass the next received 2 mc. pulse to set a Word Demand flip-flop 585 in its One state which in turn conditions the gate 586 to pass the next received 2 mc. pulse through the OR circuit 507 and another OR circuit 587 to the conductor 383, Step the IO Word Counter. A pulse passed by gate 586 (FIG. 7*d*) also causes flip-flops 569 and 585 to be set to their Zero state.

The above described operations are repeated and break-out operations occur until such time as the IO Word Counter goes to Zero as indicated by the IO Word Counter Status flip-flop 438. When flip-flop 438 is in its Zero state indicating that the IO Word Counter Status is Zero (the required number of words to be written on the drum have been transferred to the drum), one input of an AND circuit 580 is conditioned, another input of that AND circuit is the One output of the Not Read drum flip-flop 546 and the third input of that AND circuit is the Zero output of the Drum Write Register status flip-flop 551. This Zero output conditions one input of AND circuit 580 and also conditions a gate 582 (FIG. 7*d*). The IO Word Counter Status flip-flop 438 will be set to ZERO in response to an IO Word Counter End Carry pulse on conductor 378. Word Demand pulses which request a break in the previously described manner also set the word demand sync flip-flop 569 in its One state. A pulse on the conductor 378 (IO Word Counter End Carry) is produced whenever the IO Word Counter has all Ones (binary Zero) when a pulse is received on the conductor 383 (Step the IO Word Counter). A pulse is delivered to the conductor 383 each time that a Word Demand is received. The AND circuit 580 will therefore be fully conditioned when the required number of words specified by the Write instruction have actually been written on the drum since when the last word is written on the drum, the drum word demand pulse through flip-flops 569, 585 and their associated gates 584, 566 (FIG. 7*d*) causes the IO Word Counter to be stepped and in response to this pulse the IO Word Counter will generate an IO Word Counter End Carry pulse on conductor 378 to set the IO Word Counter Status flip-flop 438 to Zero, and also through the OR circuit 590 causes the write drums flip-flop 545 to be cleared. Since the Write drums flip-flop 545 is cleared after the last word has actually been written on the drum, the AND circuit 552 will not be fully conditioned and therefore no further pulses will be passed by gate 553 to transfer the IO Register to the Drum Write Register. Since no such transfer is made the Drum Write Register Status flip-flop 551 will remain in its Zero state. The Drum Word Demand pulse received after the last word has actually been written on the drum will be passed by gate 512 since that pulse through OR circuit 511 samples gate 512 before the IO Word Counter End Carry is effective to clear the IO Word Counter Status flip-flop 438 (FIG. 7*g*). The pulse passed by gate 512 therefore initiates another Break-Out cycle and the BO–11 pulse of that cycle will be passed by gate 527 through gate 528 and OR circuit 450 to cause the IO Interlock flip-flop 434 to be cleared and this pulse is also delivered to the conductor 384 (Clear the IO Interlock Instruction Control) and is furthermore delivered to the conductor 384*a* labeled Clear Pause Delay Sync flip-flop.

When the IO Word Counter Status flip-flop is in its Zero state it conditions one input of an AND circuit 591, the other input of which is the One output of the Drum Operate flip-flop 430. Therefore under the conditions that the Drum Operate flip-flop is on and the IO Word Counter Status is zero, AND circuit 591 will cause gate 592 to pass 2 mc. pulses through an OR circuit 593 to clear flip-flops 439, 443, 444, 445, 446 and 447. This pulse will also through single-shot 448 effect a Read-Write switching delay period in the manner previously described.

SENSE IO INTERLOCK INSTRUCTION

From the above described reading and writing operations with respect to drums, it will be apparent that if a block transfer has been initiated, computing instructions not involving input-output may proceed and the actual transfer will take place when required and the subsequent computing instructions of the program will be interrupted only for the length of time actually required to make a transfer, namely during a BO or a BI cycle of the Computer Input-Output Control. Sometimes it is desired to make more than one block transfer. However, if the instructions to initiate the second block transfer are programmed before the first block transfer has been completed, the computer will initiate an In-Out pause. As will be described in detail hereinafter, an Input-Output pause effectively prevents any further instruction from being executed until such time as the previously requested block transfer has been completed. During this IO pause the previously mentioned Break Request flip-flop of the computer Input-Output Control in sensed at a 2 mc. rate; therefore any Input-Output transfer which is available is actually effected at the earliest possible time. In order to secure maximum use of both the computer and the Input-Output equipment which is transferring information to and from the computer, it is necessary to avoid an Input-Output pause. In accordance with another feature of the present invention the Input-Output pause can be avoided, where necessary. But utilizing a sense instruction to interrogate the status of the last Input-Output operation, it is possible for the programmer to arrange the program to branch to further computer instructions in a manner similar to that indicated in the above referred to copending application "B." By periodically repeating the sense instruction the program can be adapted to proceed with further computer instructions subsequent to each sense instruction in the event that the Input-Output instruction in process has not been completed. Whenever a sense instruction indicates that an Input-Output operation is finished, the computer program can then initiate a further Input-Output operation involving the transfer of information either to or from the computer by a block transfer of any desired number of words.

SENSE INSTRUCTION

Figure 6E:
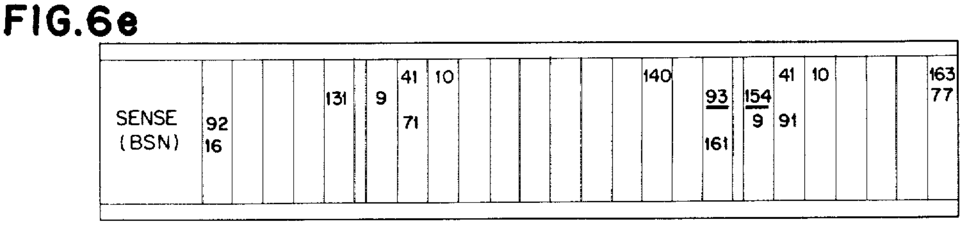

Reference is now made to FIG. 6*e* which indicates what commands are generated during a sense instruction and furthermore it indicates the time of occurrence of those commands. In addition to the common commands of the PT–OT cycles as indicated in Tables 10 and 11 above, the following commands are generated during the sense instruction at the times indicated:

*Table 21*

| Command Number | Name | Time |
|---|---|---|
| 131 | Set PT-OT Flip-Flop to OT | PT-11 |
| 140 | Sense For Branch | OT-9 |
| 93*a* | Program Counter to Right A Register | OT-11 |
| 93*b* | Clear Program Counter | OT-11 |
| 154 | Address Register to Program Counter | PT-0 |
| 163 | Clear Branch Flip-Flop | PT-6 |

At PT–11 time the command 131 causes the PT–OT flip-flop to be set to OT to thereby provide an OT cycle. At OT–9 time the command 140 (Sense for Branch) is generated. This command as will become more apparent hereinafter essentially inspects the status of the previously mentioned IO Interlock and if the IO Interlock is still on, the commands 93*a*, 93*b* and 154 will be generated; however, if the IO Interlock is not on, those commands will not be generated.

Referring now back to FIGS. 7*a* through 7*h* and more particularly to 7*b*, 7*c* and 7*d*, the Index Interval part of the sense instruction is decoded by the decoder 600 in FIG. 1*b* and if the Index Interval Register signals are a code identifying that the IO Interlock is to be sensed, a positive D.C. level will be established on conductor 601 thereby conditioning one input of an AND circuit 602 (FIG. 7*d*). The other input of AND circuit 602 is the One output of the IO Interlock flip-flop 434. Therefore if the IO Interlock is still on, AND circuit 602 will cause a gate 603 to be conditioned to pass the command 140 to conductor 707 labeled Set Branch flip-flop. In response to this pulse the cycle control of the Instruction Control Element (FIG. 5*b*) causes a conductor labeled Branch Flip-Flop On to be made positive and the command generator 27 in FIG. 5*b* in response to this positive D.C. level causes the generation of commands 93*a* and 93*b* at OT–11 time and the command 154 at PT–0 time. The command 93*a* is delivered to the Program Counter 350 (FIG. 1*c*) where in response to this command, the signals stored in the Program Counter are delivered to the Right A Register of the Arithmetic Element 2 in FIG. 1*c* for storage therein. The effect and purpose of transferring the contents of the Program Counter to the Right A Register when a Branch is effected is to permit the contents of the Program Counter to be stored in memory for subsequent reference by the program as more fully described in the above referred to copending application "B." The command 93*b* is delivered to the Program Counter 350 of FIG. 1*c* where it effects a clearing operation. The command 154 is also delivered to the Address Register 22 of FIG. 1*c* where it causes the contents of the Address Register to be delivered to the Program Counter 350 of FIG. 1*c* for storage therein. At PT–6 time the command 163 is generated and delivered to the Cycle Control 29 of FIG. 5*b* where it will effect a clearing operation of the Branch flip-flop therein if required.

The address part of the Sense instruction designates the memory register from which the next instruction is to be taken if the branch is made. However, if the branch is not effected, that is, the IO Interlock is off, then the program counter contents are not substituted by the contents of the Address Register and the next instruction is obtained from memory at the address specified by the contents of the program counter after PT–7 of the Sense instruction.

From the above it is seen that the Sense instruction enables the central computer to determine the status of a given sense unit, namely the IO Interlock. It is to be pointed out that additional units not shown for the sake of simplicity may be selected and interrogated similar to the IO Interlock. Furthermore, it is seen that the last 6 bits (for instance Left 10 through Left 15) of the left half-word of this instruction identify the sense unit selected. The bits Left sign through 10 of the left half-word are used to indicate the instruction to be performed as pointed out previously, and the right half-word specifies the address in main memory from which the next instruction is to be taken in the event that a branch is effected. It is further seen from the above that at OT–9, the Sense for Branch command 140 is generated, which causes the status of the sense unit to be examined and if the necessary conditions are met, the Branch flip-flop is set to indicate the condition and at OT–11 the program counter is transferred to the Right A Register (93*a*), previously cleared at PT–9, as more fully described in the above mentioned copending application "B." The program counter is cleared at OT–11 (93*b*). At PT–0 the contents of the Address Register are transferred to the Program Counter (154). The Branch flip-flop is cleared at PT–6 (163).

DRUM READ-WRITE CIRCUITS

Figure 8B:
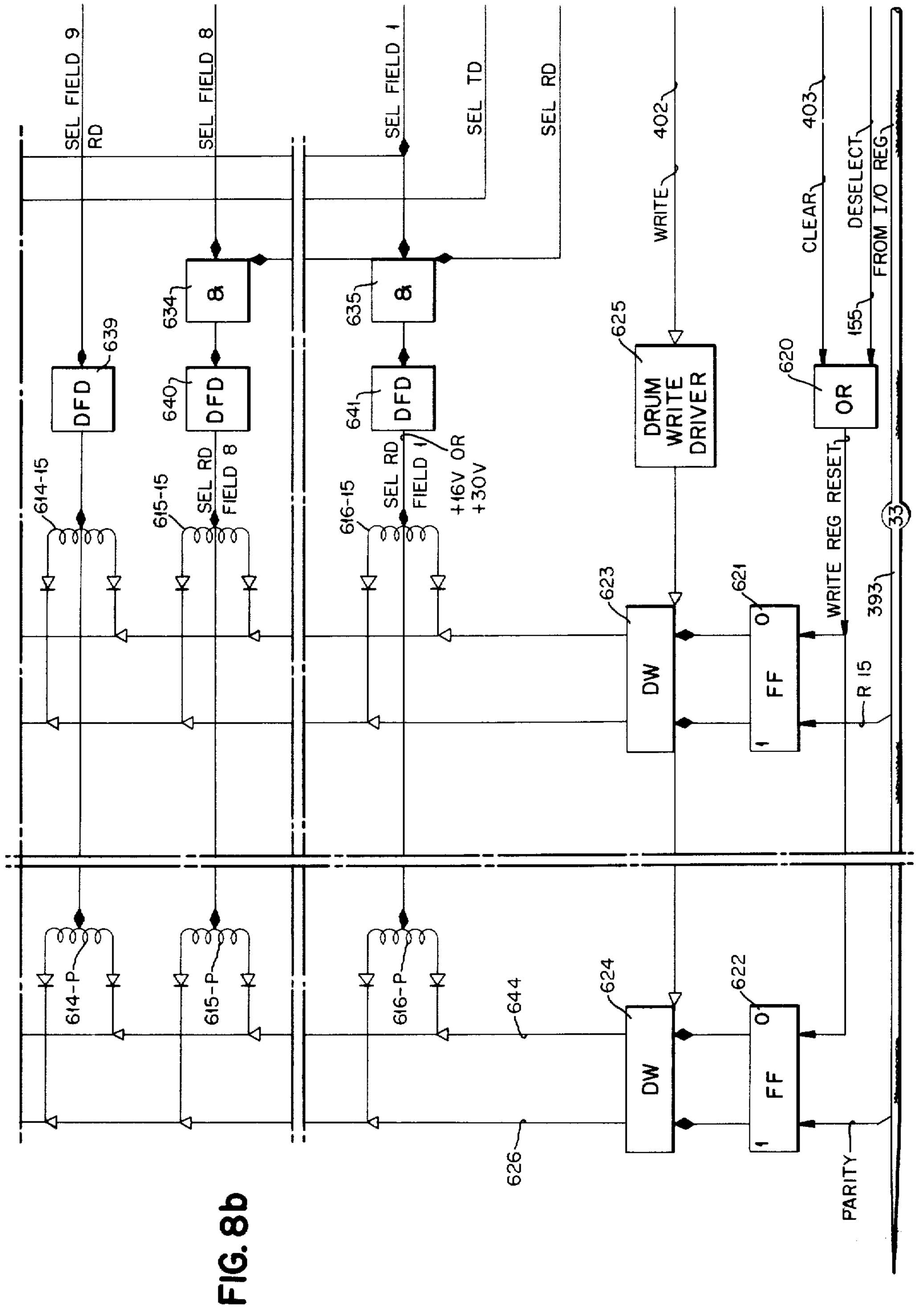

Reference is now made to FIGS. 8*a* and 8*b* which, when arranged one above the other in that order, illustrate in schematic form the drum read-write circuits shown as block 391 in FIG. 1*a*. Drum words according to the present arrangement are arbitrarily divided into left and right half-words. In the AM drum 4 and the TD drum 6, each half-word consists of bits 1 through 15 with one extra bit used to indicate parity for the entire word of 33 bits. In the RD drum 5, each word consists of 25 bits such that the left-most bit is a parity bit when parity is employed and the bits are arranged from left to right in ascending order of magnitude.

Drum registers as pointed out more fully hereinafter consist of magnetized spots arranged along the circumference of a cylindrical magnetic drum. A given bit is magnetized in one direction to indicate one binary state and in the opposite direction to indicate the other binary state. The two states may be designated binary One and Zero. Given drum registers are arranged around the circumference of the cylindrical drum with the bits of the drum word axially displaced. Drum registers in a given portion of a drum are identified as a field. A plurality of fields are located on a given physical drum. In the preferred arrangement there are 6 fields on the AM drum 4 of FIG. 1*a*, 9 fields on the RD drum 5 and 6 fields on the TD drum 6. This indicates the arrangement of fields on a cylindrical magnetic drum.

In FIGS. 8*a* and 8*b* the heads of the various fields for logical purposes are shown arranged horizontally and the heads of different fields are arranged vertically. The heads 610 in FIG. 8*a* are those associated with the AM drum field 6 and the various heads associated with given bits are indicated by a suffix to the number 610. For example, the head 610–P is the drum head associated with the parity bit and the drum head 610–15 is the drum head associated with bit right 15. Not shown are the various heads 610–LS through 610–R14 since these bits are identical to the two which are shown. Similarly, the heads 611–P and 611–15 represent the drum heads of the AM drum field 1. AM fields 2 through 5 are omitted in the drawing since they are identical in construction to the fields 1 and 6 which are shown. In a like manner the 6 fields of the TD drum have associated heads 612 and 613 whereas the fields of the RD drum, which are 9 in all, have heads 614 through 616.

*Drum writing with field selection*

In order to illustrate the logical operations performed by the circuits of FIGS. 8*a* and 8*b*, a drum writing operation will be described. A pulse on either conductor 403 or 155 through the OR circuit 620 serves to clear flip-flops 621 and 622. Flip-flops for bits Left sign through Left 15 and Right sign through Right 14 are omitted in the drawings in the interest of simplicity. These flip-flops constitute a drum write register, previously mentioned. Subsequent to the clearing operation, signals on the conductors of a cable 393 from the IO Register of FIG. 1*b* set the flip-flops of the Drum Write Register to the One side if a positive pulse is transmitted on its corresponding conductors of the cable. Hence, the Drum Write Register then contains the binary information previously held in the IO Register. The One and Zero outputs of the flip-flops 621 and 622 are applied to respective drum writers 623 and 624. During a drum writing operation, a drum writer responds to a pulse of approximately 1.8 microseconds in duration from a drum write driver 625 and the D.C. level of its associated write register flip-flop to energize the write heads. If the One output of the flip-flops 622 is positive when a pulse is received from the drum write driver 625, a closed current path is formed which includes the Write One half (W–1) of the selected head. As pointed out previously the selection of the drum and the selection of a field determines which set of heads 610 through 616 is selected. If it is assumed for the purpose of illustration that field 6 of the AM drum is selected, then AND circuit 627 receives a positive signal on both inputs and delivers a positive output signal to a drum field driver (DFD) 628 and this in turn delivers a positive signal to the center tap of the heads 610. The outputs of the non-selected drum field drivers 636 through 641 are also positive levels, but the output of the select drum field driver is a much higher positive level than the non-selected ones.

If a positive D.C. level is supplied by the Zero output of flip-flop 622 to the drum writer 624 when a pulse is received from the drum write driver 625, a closed current path is formed which includes the Write Zero half (W–0) of the selected head. In a similar manner the signal stored in the flip-flop 621 is written by means of the drum writer 623 by the selected head of heads 610 through 616. AND circuits 630 through 635 and associated drum field drivers 636 through 641 supply the D.C. levels to the respective heads 611 through 616. The levels supplied to these heads are such that only one group of heads is selected for a given reading or writing operation. The level supplied to the non-selected heads during the writing operation is such that the diodes of those heads are back-biased sufficiently to prevent writing signals from flowing in those heads.

DRUM READING WITH FIELD SELECTION

For the selected group of heads during a reading operation, the level supplied to the center taps of these heads by the drum field driver and the level supplied by the drum read driver 645 to the center taps of the primary windings of the transformers 646 and 647 is such that diodes 748 through 751 in conjunction with the diodes of the selected heads are forward-biased to permit signals induced in these heads by the rotating drum to be passed to their associated drum read amplifiers 652 and 653. Signals induced in the heads 610–15 through 616–15 appear across conductors 642 and 643, and for the heads 610–P through 616–P signals of the selected head appear across conductors 626 and 644.

For the non-selected heads during a reading operation, the positive level supplied to the center taps of these heads by the respective drum field drivers and the more positive level supplied by the selected drum field driver to the selected heads and through their associated diodes to the lines 626, 642, 643 and 644 is such that the diodes of the non-selected heads are backward-biased to prevent signals induced in the non-selected heads by the rotating drum from being passed to the associated drum read amplifiers.

Whenever a drum reading operation is performed, a positive signal on the conductor 412 is supplied to a drum read driver 645 which in turn supplies a signal level to the center taps of the primaries of transformers 646 and 647. Signals from the selected head of the group 610–P through 616–P are supplied to the transformer 647 whereas signals from the selected one of the heads 610–15 through 616–15 are supplied through a transformer 646.

Magnetized spots on a drum cylinder approaching and leaving the drum read-write head cause a signal to be induced in one direction if the spot is of one polarity and cause a signal in the opposite direction if the magnetized spot is of the opposite polarity. Accordingly, read signals supplied to the transformers 646 and 647 will appear as currents flowing from the right toward the center tap or from the left toward the center tap depending upon the polarity of the magnetized spot on the drum. Thus the signals may be arbitrarily designated as binary One and Zero.

If the signals flow from the conductor 643 to the primary 648 of transformer 646, a signal of one polarity is induced in the secondary 649. If signals from the selected drum head cause current to flow from conductor 642 to the primary 648 of transformer 646, a signal of opposite polarity is induced in the secondary winding 649. In a similar manner, signals across conductors 626 and 644 establish bidirectional currents through the primary winding 650 of the transformer 647 which in turn causes signals of opposite polarity to be induced in the secondary winding 651. Accordingly, positive or negative signals are induced in the secondary windings 649 and 651 by the selected read heads and these signals are applied to respective drum read amplifiers 652 and 653.

The positive and negative signals applied to the drum read amplifiers 652 and 653 are applied to respective gates 654 and 655. If the signals applied to gates 654 and 655 are positive when a CD Read Sample pulse is received on conductor 410, it is passed by these gates, indicating that a binary One is read. The outputs of these gates are applied to the conductors of a cable 411 and supply pulses to the IO Buffer Register 398 in FIG. 1*b*. If the signals applied to the gates 654 and 655 are negative when a CD Read Sample pulse is received on conductor 410, it is not passed, indicating that a binary Zero is read. Thus it is shown how reading and writing operations may take place on the magnetic drums 4, 5 and 6 in FIG. 1*a*.

DRUM ARRANGEMENT AND OPERATION

Representative magnetic drums suitable for use in the data storage system of the present invention are illustrated in FIGS. 9, 10 and 11. Each of the drums 4, 5 and 6 in these figures is of conventional construction and in a preferred application each has a diameter of 10.7 inches and a length of 12.6 inches and is driven by a synchronized motor through a tooth belt at an angular velocity of 2,914 revolutions per minute. Constructed from a solid block by suitable material, such as brass, the drum is cylindrical in form having the surface plated with a 0.005 inch layer of magnetic nickel cobalt alloy. As the drum rotates, fixed magnetic heads held rigidly in place by bars placed parallel to the longitudinal axis of the drum, transfer information to and from its magnetic surface by recording or writing binary information in the form of small electromagnetic flux patterns and later detecting or reading these patterns.

The smallest unit of intelligence that can be written on or read from a drum is called a "bit." On the drum 6 of FIG. 11 there are 33 bits in a given drum register which are read by 33 OD read heads which are indicated generally at 660. The 33 read heads indicated at 660 are one group of several groups of read heads, the entire group being generally indicated by 416 in FIG. 1*a*. The information in these heads is supplied to an output device not shown.

In order to write on a drum, 33 CD read-write heads are indicated generally at 661. Information is transferred to and from the computer by means of the heads 661 and information may be transferred to and from a load device by means of the heads 660. In the illustrated embodiment the load device associated with the heads 660 is assumed to be an information receiving equipment. If a small electromagnetic flux pattern written by a magnetic head is positive, it may be designated as binary One. If the flux pattern is negative, it may be designated as binary Zero. Alternatively the designations may be reversed. Once written, a bit is stored on a drum without distortion unless another bit is written over it or it is deliberately erased. Reading from the drum does not in any way distort or alter the bits recorded on the drum surface. As the drum rotates curved circumferential bands of drum surface, called drum channels, pass under a read-write head associated with that particular channel. 33 channels are required for a 33 bit word. The rotational velocity of the drum and the timing of its read-write heads are such, for example, that each magnetic head can read or write 2,048 bits in ecah channel of the drum. Accordingly, there may be 2,048 registers of 33 bits written on a selected portion of the drum designated as a field. On the TD drum of FIG. 11 there are 6 fields, each composed of 2,048 registers having 33 bits per register. On the RD drum 5 in FIG. 10 there are 9 fields with each field having 2,048 drum registers of 25 bits each and on the AM drum 4 of FIG. 9 there are 6 fields of 2,048 registers each, each register being composed of 33 bits.

Associated with each drum register is a magnetic spot in a timing channel. A read head 662 in FIG. 9 is associated with the timing channel of the AM drum 4. As pointed out in greater detail hereinafter, the signals read by the read head 622 supply timing signals which ultimately control the drum reading and writing operations. The timing channel is in reality merely a succession of magnetized spots each occupying a space associated with a drum register. These spots are recorded on the drum surface in such a manner that, as the drum rotates, a signal of approximate sine wave form is induced in the associated read head 662. Assuming that there are 2,048 consecutive registers, there will be 2,048 corresponding equidistantly spaced magnetized spots in the timing channel of the AM drum 4 in FIG. 9. As more fully explained in the above referred copending application "E," the sine wave generator in the timing track is used to generate a pulse for each zero crossing in a positive or a negative direction. Each of these pulses is delayed by a given amount so that 4 pulses appear equally spaced in time. These pulses are designated as drum timing pulses DTP–1, DTP–2, DTP–3, DTP–4.

A second timing channel labeled Index Channel is read by read head 663 in FIG. 9. This channel includes a succession of equidistantly spaced magnetic spots but with the difference that one of these spots is magnetized with opposite magnetic polarity to the other spots of this channel. When this one magnetized spot passes beneath the read head 663 one sine wave voltage of opposite phase with respect to the other sine wave voltages produced serves to identify a reference point on the drum. As indicated in FIG. 9, the index bit occurs simultaneously with the timing channel bit for register 0. The addressing of all registers is made relative to the reference or index point. That is, the index signal occurs with register 0 and the other drum registers are then numbered consecutively to 2,047. Since the drum rotates completely once every 20.6 milliseconds at a speed of 2,914 r.p.m., the period between the midpoints of successive drum registers is approximately 10 microseconds. The timing of voltage developed by the drum read head 662 in FIG. 9 accordingly is a period of 10 microseconds and four 0.1 microsecond duration pulses are generated every 2½ microseconds during the 10 microsecond period in a given drum register, thereby producing DTP–1, DTP–2, DTP–3 and DTP–4.

Read heads 664 and 665 in respective FIGS. 10 and 11 read the timing channels of the RD and TD drums. Read heads 666 and 667 read the respective index channels of the RD drum and the TD drum. In practice, the timing channel and associated index channel is written on the drum by any suitable means such as, for example, that shown and described in copending application "D" after the drum has been magnetically erased by any suitable means such as that shown in copending application "C." Once the index channel and the timing channel have been established, drum timing pulses may then be employed to effect writing operations in the drum registers associated with the various timing channel magnetic spots.

The AM drum 4 in FIG. 9 is referred to as a magnetic drum having a closed magnetic path by virtue of the fact that the registers 0 through 2047 are arranged in adjacent locations equidistantly spaced around the circumference of the cylindrical drum. The RD drum 5 of FIG. 10 and the TD drum 6 of FIG. 11 include a gap or unused surface between registers 2047 and 0. Actually these drums, if arranged with a closed magnetic path, would have 2,060 drum registers spaced equidistantly around the circumference of the drum. The gap is provided, however, for the purpose of permitting switching from one drum field to another drum field during the interval of time that the gap portion of the magnetic drum is under the CD read-write heads when being written or read by the computer. Furthermore, the switching to another magnetic field may take place during the interval of time that the gap is under the OD read heads and the drum is being read by the load device. The interval of time that the gap is under a given set of heads is approximately 120 microseconds. This is based on the fact that there are 12 drum registers in the gap and each occupies 10 microseconds of time under the r.p.m.'s and drum diameter assumed.

In order to determine at any instant which drum register is under the CD read-write heads, each drum has an angular position counter (APC) which is cleared to Zero by an index drum timing pulse. The counter is advanced by a count of one by the DTP–3 pulse of each drum register. For the purpose of making a comparison to find a particular drum register of a selected drum, the contents of the angular position counter of the selected drum is transferred to the Input-Output Buffer 398 at DTP–1 whenever a comparison is to be made. Very shortly thereafter a comparison is made in the drum selection register as previously described. The results of the comparison are known before DTP–3 is generated and if a writing operation is to take place, the writing is performed by DTP–3; simultaneously the APC counter is advanced by a count of one so that its contents is then indicative of the next drum register and can be gated out by DTP–1 of the next register. If a read operation is to take place, the read sample pulse supplied to read-write circuits on conductor 410 (FIGS. 1*a* and 8*a*) is effected by DTP–1 of the next drum register. It is permissible to read at DTP–1 of the next register because the signals induced in the read heads and supplied to the drum read amplifiers 652 and 653 in FIG. 8*a* persist for a relatively long period, at least sufficiently long to permit sampling at CD–1 time of the next register. Thus it is seen how the APC counters indicate the drum register currently under the CD read-write heads, how a comparison is made to determine whether the proper drum register is under the read-write heads and how drum read or write operations may be executed.

DRUM TIMING CIRCUITS

Reference is now made to FIG. 12 which is a simplified block diagram of the TD drum timing circuit shown as block 409 in FIG. 1*a*. Signals recorded in the timing channel of the TD drum are read by the read head 665, the output of which is delivered to a timing pulse generator 671 which is any suitable circuit capable of receiving the signal from the read head 665 and further being capable of delivering a .1 microsecond pulse to a conductor 672 whenever the input signal crosses the zero axis in one direction and delivers a .1 microsecond pulse to a conductor 673 whenever the input signal crosses the zero axis in the other direction. Detailed information concerning a circuit suitable for use as the timing pulse generator 671 will be found in the above referred to copending application "E" with particular reference to FIG. 16 and the description relative thereto.

Signals recorded in the index channel are read by the read head 667, the output of which is delivered to a read circuit 674. Read circuit 674 is any suitable circuit capable of receiving the signal from the read head 667 and suitably amplifying it and shaping it such that its output signal will condition a gate 675 when the signal delivered by the read head 667 is a positive signal. Detailed information concerning a circuit suitable for the read circuit 674 will be found in the above noted copending application "E" with particular reference to FIG. 18 and the description relative thereto.

As previously noted the index channel contains a record of binary signals, one of which is opposite to all others. This one binary signal when received by the read circuit 674 causes gate 675 to be conditioned at the time that a pulse appears on conductor 672 and therefore this pulse is passed by gate 675. All other binary signals recorded in an index channel are ineffective to cause gate 675 to pass a pulse since they cause that gate to be conditioned at a time when no pulse is received on conductor 672. A pulse passed by gate 675 is delivered to the conductor labeled CD–IX and is further delivered as a clear input to a 4 stage counter 676. When an index pulse is passed by gate 675, thereby causing the 4 stage counter 675 to have all of its stages reset to Zero, a gate 677 is conditioned and will remain conditioned for a suitable length of time as will be apparent subsequently. When gate 677 is conditioned it passes each pulse on conductor 673 to the conductor 678 (Step). Each pulse on conductor 678 causes a binary One to be added to the signals stored in the 4 stage counter at the time that pulse is received. When the 12th pulse has been received by the 4 stage counter it causes gate 677 to be deconditioned and further causes each of the gates 679 and 680 to be conditioned. When gates 679 and 680 are conditioned, they pass the pulses received at their input conductors 672 and 673 respectively to the conductors labeled DTP–1 and DTP–3, respectively.

A pulse on conductor 673 is also delivered through a delay unit 681 to the conductor labeled DTP–4. The delay unit 681 which may be of known construction adds a delay charactertistic to the 0.1 microsecond pulse such that the time between a pulse on conductor 673 and that same pulse appearing at conductor DTP–4 is approximately ½ the time interval between pulses on conductors 672 and 673. In the instant embodiment this delay unit is preferably on the order of 2½ microseconds. From the above it will be seen that each time that an index signal is received by the read head 667 a 0.1 microsecond CD–IX pulse is produced and at that time any further DTP–1 and DTP–3 pulses are inhibited until such time when 12 pulses have been delivered to the conductor 673 by the timing pulse distributor 671. This inhibiting action of the DTP–1 and DTP–3 pulses serves to suspend operations requiring these pulses for the duration of the gap of approximately 12 registers on the TD drum, described previously.

The RD drum timing circuit shown as block 408 in FIG. 1*a* may be and in the preferred embodiment is identical to the TD drum timing circuit since both of these drums have a gap of 12 registers. It is pointed cut at that the inhibiting action of DTP–1's and DTP–3's serves to present reading and writing operations from taking place on the drum during the gap interval which, as pointed out previously, is the time necessary to switch from one drum field to another.

The AM drum timing circuit shown as block 407 in FIG. 1*a* may be of similar construction to that of FIG. 12 above described. Since the AM drum has a closed timing track with 2,048 registers, it is not necessary to inhibit DTP–1 and DTP–3 pulses as was necessary in the TD and RD drums which have a gap of drum registers. The AM drum timing circuit therefore does not include the gates 677, 679 and 680; nor does it include the 4 stage counter 676. In other respects, however, that drum timing circuit may be as that shown in FIG. 12.

ANGULAR POSITION COUNTERS

The angular position counters 370, 371 and 372 in FIG. 1*b* may be any suitable counter which may be cleared, stepped by one, and the contents transferred when desired. An example of a counter suitable for this purpose is illustrated in the above referred to copending application "B" with particular reference to FIG. 41 and the description relative thereto.

DRUM REGISTER COMPARISON

In order to write or read at a given address on a selected drum field, it is necessary to select the drum, the field, and a register. As previously described drum selection and field selection is initiated by the drum selection register 363 (FIG. 1*b*) under the control of bits 10 through 15 of the left half-word of the Select Drums instruction. The address of the drum register under the CD read-write heads is indicated at all times by the associated angular position counter. In order to perform a read or write operation in a given register, some means must serve to indicate the presence of that register under the CD read-write heads when reading or writing by the computer. In the instant application it is always assumed that the desired register is under the CD read-write heads unless a pulse is generated on the conductor 401 labeled No Compare. Therefore the read or write operation will occur at the appointed time in each drum cycle if the No Compare pulse is not generated. In practice, transferring of a block of information between the drum and the computer may take place in successive drum registers. Alternatively, it may be desirable to transfer a block of information to or from drum registers distributed around the drum, displaced from one another by a factor of 8, 16 or 64. Once the first drum register is located in the former case, successive drum registers are read from or written into until the IO Word Counter goes to zero, indicating that the proper number of words have bene transferred. After the first drum address is located in the latter case, a read or write operation is performed in that register and the drum control register is advanced by a factor of 8, 16 or 64. The next address is then located by further comparing operations and the word read or written from that address. This process continues until the IO Word Counter 380 in FIG. 1*c* goes to zero, indicating that the proper number of words have bene transferred. The comparison between the address of the drum register under the CD read-write heads and the desired address is made in the Drum Control Register 365 in FIG. 1*b*.

Reference is made to FIGS. 13*a* and 13*b* for a detailed description of the drum control register indicated as block 365 in FIG. 1*b*. A group of flip-flops 685*a* through 685*h* are cleared to the Zero side by a pulse on a conductor 146. Information is transferred to these flip-flops by the cables of the conductor 366, a positive pulse on a given cable setting its associated flip-flop to the One state. Whenever one of the flip-flops 685 is set in the One state, the One output provides a positive D.C. level and the Zero output provides a negative D.C. level. On the other hand the Zero output is a positive level and the One output is a negative level whenever one of the flip-flops 685 is set in the Zero state. The One output sides of the flip-flops 685*a* through 685*h* are connected to respective gates 686*a* through 686*h*. Whenever any one of these gates is sampled by a positive pulse on its input conductor, the positive pulse is passed if the associated flip-flop is in the One state, and this passed pulse is applied to the input of the adjacent gate and to the complement input of the associated flip-flop. A positive pulse on the complement input of a flip-flop causes it to change to the opposite stable state. Thus it is seen that these gates in conjunction with the flip-flops 685 constitute a counting circuit wherein the flip-flop 685*h* represents the lowest order of the counter and the flip-flop 685*a* represents the highest order. OR circuits 687, 688 and 689 permit an additional entry into the counting ring by means of a pulse on the respective conductors 404, 403 and 406 for the purpose of advancing the counter by a factor of 8, 16 or 64 respectively. This makes it possible to advance the drum register by a factor of 8, 16 or 64 whenever it is desired to read or write on selected drum by means of interleaving. It is pointed out that while bits 5 through 15 are shown in FIG. 13*a*, 4 additional bits not shown may be employed where a counter of more than 11 stages is needed. These additional stages may be identical in construction to those shown. Thus a drum of the type herein described, having a drum diameter and the same register spacing as herein indicated, does not require additional counter stages. At this point it can be seen that the first drum address once placed in the flip-flops 685*a* through 685*h* by the Select Drums instruction can be advanced by a factor of 8, 16 or 64 if interleaving is to take place.

The Zero output sides of the flip-flops 685*a* through 685*h* are applied to respective AND circuits 690*a* through 690*h*. The One output sides of flip-flops 685*a* through 685*h* are applied to respective AND circuits 691*a* through 691*h*. Connected as a second input to the AND circuits 690*a* through 690*h* are the respective D.C. levels from the One sides of the bits stored in the right half of the IO Buffer Register 398 in FIG. 1*b*. These bits are transferred by the conductors of a cable 399. In a similar fashion the Zero side of the bits stored in the right half of the IO Buffer Register 398 are supplied by additional conductors in the cable 399 to respective AND circuits 691*a* through 691*h*. The output of AND circuits 690*d*, 690*f* and 690*h* are connected to respective OR circuits 692, 693 and 694. Likewise the output of AND circuits 691*d*, 691*f* and 691*h* are connected to the respective OR circuits 692, 693 and 694. The outputs of the AND circuits 690*c*, 690*e*, 690*g* are connected to respective OR circuits 695, 696 and 697. Similarly the outputs of AND circuits 691*c*, 691*e* and 691*g* are connected to respective OR circuits 695, 696 and 697. The outputs of OR circuits 694 and 697 are connected through an OR circuit 698 which in turn has its output connected to a gate circuit 699. The outputs of the OR circuits 693 and 696 are connected to an OR circuit 700 which in turn has its output connected to a gate 701. In a like fashion the outputs of OR circuits 692 and 695 are connected to an OR circuit 702, the output of which is connected to a gate 703. Whenever a compare pulse is applied on the conductor 400 to the gates 699, 701 and 703 the output pulse on any one of these gates through an OR circuit 704 to a conductor 401 indicates that no comparison was reached in the compare operation. Whenever the compare pulse on conductor 400 is not passed by any one of the gates 699, 701 and 703 to the conductor 401, the absence of a pulse on the conductor 401 indicates that a comparison was made. That is, it indicates that the contents of the right half of the IO Buffer Register 398 is identical to the contents of the flip-flops 685*a* through 685*h*. Hence the desired drum register is under the influence of the read-write heads of the selected drum.

In order to illustrate further the manner in which a comparison is made, consider for example that bit 15 represents a One from the right half of the IO Buffer Register and the flip-flop 685*h* indicates One. In this case AND circuit 691*h* receives a positive D.C. level from flip-flop 685*h* and a negative D.C. level on the Zero conductor from bit R15 of the cable 399. Accordingly, the output of the AND circuit 691*h* to the OR circuit 694 is negative. The Zero side of flip-flop 685*h* to the AND circuit 690*h* is negative and the One side of the bit R15 of the cable 399 is positive. Consequently the output of the AND circuit 690*h* to the OR circuit 694 is negative. Consequently the OR circuit 694 supplies a negative level to the OR circuit 698 since both inputs to the OR circuit 694 are negative.

If it is assumed at this point that bit 14 from cable 399 indicates a One and the flip-flop 685*g* indicates a One, it can be seen from the foregoing that the output of the OR circuit 697 is likewise negative. Under this assumption both inputs to the OR circuits 698 are negative, and the output level from this OR circuit to the gate 699 is negative. Under these conditions a pulse on the line 400 is not passed by the gate 699 and no pulse is supplied to the output conductor 401. The absence of a pulse on the output conductor 401 indicates that the bits compared are identical. The foregoing illustration of a comparison of the bits 14 and 15 serves to illustrate that if there is a One on each conductor from the cable 399 and a One from each of the flip-flops 685*a* through 685*h*, then a compare pulse on the conductor 400 does not generate an output pulse on the No Compare conductor 401.

Assuming that the right 15 bit from cable 399 indicates a Zero and flip-flop 685*h* indicates a Zero, it is readily seen that the outputs of the AND circuits 691*h* and 690*h* are again negative. If the same Zero condition exists in bits 14, it is readily seen that the outputs of AND circuits 690*g* and 691*g* are likewise negative, and the output of the OR circuit 697 to the OR circuit 698 is negative. Consequently the negative levels applied to the gate 699 does not allow a compare pulse on the conductor 400 to pass through to the output conductor 401. Here again the absence of a pulse on the output conductor 401 indicates a correspondence between the bits right 14 and right 15 from the right-half word of the IO Buffer 398 and the bits right 14 and right 15 of flip-flops 685*g* and 685*h*. In a similar manner, if all the bits from the cable 399 indicates Zero and flip-flops 685*a* through 685*f* indicates Zero a compare pulse on conductor 400 is not passed by any one of the gates 699, 701 or 703 to the output conductor 401.

For the purpose of illustrating a case in which there is no comparison between at least one bit from the cable 399 and the corresponding one of flip-flops 685*a* through 685*h*, assume that the bit right 15 on cable 399 indicates a Zero and the flip-flop 685*h* indicates a One. In this instance AND circuit 691 receives positive levels on both inputs and delivers a positive level to the OR circuit 694 which in turn delivers a positive level through the OR circuit 698 to the gate 699. The AND circuit 690*h* receives negative levels on both inputs and delivers a negative level to the OR circuit 694. This negative level is ineffective however, since the output of the AND circuit 691 is positive. Consequently, a compare pulse on the conductor 400 is passed by the gate 699 through an OR circuit 704 to the conductor 401, indicating that the compare operation found the bit right 15 from the cable 399 unlike the bit 695*h*. Similarly, a Zero from any bit of the cable 399 and a One in the corresponding one of the flip-flops 685*a* through 685*h* provides the same result during a compare operation i.e., an output pulse is produced on the conductor 401. If the bit right 15 from the cable 399 indicates a One and the flip-flop 685*h* indicated a Zero, a positive level is supplied by the AND circuit 690*h* through the OR circuits 694 and 698 to the gate 699. A compare pulse on the conductor 400 again establishes a pulse on the output conductor 401 indicating No Compare. It can be seen from the foregoing illustrations of the various conditions that may exist, that an output pulse on the conductor 401 in response to a compare pulse on the conductor 400 is established if, and only if, there is a lack of correspondence between at least one bit from the cable 399 and the associated bit stored in the flip-flops 685*a* through 685*h*. Stated in the alternative, a No Compare pulse on the output conductor 401 is not established whenever there is a correspondence of all bits in the cable 399 and the bits stored in the flip-flops 685*a* through 685*h* when a compare pulse is applied to the conductor 400.

TIME PULSE DISTRIBUTOR AND CONTROL

Reference is now made to FIG. 14 which illustrates in logical block form the time pulse distributor control shown as block 24 in FIG. 5*a*. As will be recalled in the description of FIG. 5*a* the time pulse distributor and control primarily serves to deliver IP pulses to the command generator, to deliver TP pulses to the computer Input-Output control and to also deliver various other commands. As shown in FIG. 14 the time pulse distributor and control includes a pulse generator 710. This pulse generator may be any suitable source of one-tenth microsecond pulses which occur every 0.5 half-microsecond. The pulses produced by the pulse generator 710 may be selectively applied to the equipment by means of any suitable switch 711 which, though indicated as a mechanical switch, may be an electronic or electromechanical device. The pulses from the pulse generator 710 are delivered besides other places, to the conductor labeled 2 mc. and a gate 712. Should the gate 712 be conditioned, these pulses are delivered to a distributor which includes flip-flops 713 through 716 and their associated gates 717 through 723. A pulse passed by gate 712 samples each of the gates 718, 720 and 722. Pulses produced by the pulse generator 710 are also delivered directly to sample gates 717, 719, 721 and 723. The particular one of those gates 717 which passes a pulse from the pulse generator 710 depends upon which of the flip-flops 713 through 716 is in its One state. A pulse passed by a given one of those gates causes its associated flip-flop to be set to Zero and furthermore causes the adjacent flip-flop to be set in its One state. When in the One state, flip-flop 713, for example, conditions gates 717 to pass the next 2 mc. pulses which serves to clear the flip-flop 713 to the Zero state and to set the flip-flop 714 in the One state. Flip-flops 713 through 716 and gates 717, 719, 721 and 723 are therefore effectively a binary ring circuit since the output of the gate 723 is connected to clear the flip-flop 716 to its Zero gate and set the flip-flop 713 to its One state. From the above, it will be seen that when the switch 711 is closed, the conductors labeled TP–0, TP–1, TP–2 through TP–11 are sequentially pulsed and furthermore when those pulses are passed by the gate 712 the IP conductors IP–1, IP–2 through IP–11 are correspondingly sequentially pulsed. In the interest of simplicity only four flip-flops namely, 713 through 716 and their associated gates have been illustrated in FIG. 14. It will be understood however, that in the illustrated preferred embodiment there are in fact 15 such stages, each of which may be identical.

Gate 712 is conditioned by the Zero ouptut of a break flip-flop 724. Flip-flop 724 is set in its One state by pulses on the conductor 386 (Set TPD Break Flip-Flop) and flip-flop 724 is cleared by pulses received on the conductor 724 (Clear Break Flip-Flop). As will be recalled from the description relative to the computer Input-Output Control, a pulse appears on conductor 386 whenever the computer Input-Output control takes a memory cycle of the main memory 1. Therefore in response to this pulse the break flip-flop 724 is set in its One state thereby preventing any further pulses being passed by gate 712 and this will result in no instruction pulses (IP's) being generated during the time that the break flip-flop is on. A pulse passed by gate 724 (TP–11) operates to clear flip-flop 716, set flip-flop 713 as above described and pass through an OR circuit 726 to the conductor 385 labeled Sense Break Request Flip-Flop. When the Break flip-flop 724 is in its Zero state, it also conditions one input of an AND circuit 727, the other input of which is the one output of a Pause Flip-Flop 728. The Pause flip-flop 728 is set in its One state when a pulse is received on conductor 134 (the command set pause flip-flop). As will be recalled from the previous description relative to the command generator 27 of FIG. 5*a*, a pulse is delivered to the conductor 134 at PT–10 time of any instruction of the input-output class if the IO Interlock is on. When the Pause flip-flop 728 is in the One state and the Break flip-flop 724 is in the Zero state, the AND circuit 727 causes a gate 729 to be conditioned. Gate 729 is sampled by 2 mc. pulses, and pulses passed by this gate are delivered through the OR circuit 726 to the conductor 385 (Sense Break Request flip-flop). The Zero output of the Pause flip-flop 728 and the one output of the Break flip-flop 724 are connected through an OR circuit 730 to one input of an AND circuit 731. It can be seen that whenever the Pause flip-flop 728 is in the One state (indicating an IO Pause) and the break flip-flop 724 is in the Zero state (indicating No Break) both of those flip-flops will deliver a negative potential to the OR circuit 730 which in turn must supply a negative level to the AND circuit 731. When the AND circuit 731 is not conditioned with a positive level on each of its inputs, its associated gates 718 and 719 are not conditioned. Therefore when the distributor ring gets to the point that flip-flop 714 is in its One state during a pause and No Break, then no further pulses will be passed to either the TP or the IP conductors. As will be recalled with reference to the computer Input-Output control description, a pulse is delivered to the conductor 384 (Clear IO Interlock) when transfer operation between main memory and the drums has been completed, and this pulse is also delivered to the conductor **384*a* (Clear Pause Delay Sync flip-flop). A pulse on conductor 384*a* samples a gate 735 which is conditioned during the time period of an IO Pause (IO PT and IO Interlock On). This pulse is therefore passed by gate 735 to set a clear pause delay sync flip-flop 736 in its One state. When flip-flop 736 is in the One state, it conditions a gate 737 to pass the next 2 mc. pulse which serves to set a Clear Pause Delay flip-flop 738 in its One state. When flip-flop 738 is in its One state it conditions a gate 739 to pass the next received 2 mc. pulse which causes the Pause flip-flop 728 to be cleared and also causes the flip-flops 736 and 737 to be cleared. It is therefore seen that a pulse on conductor 384*a* (Clear Pause Delay Sync flip-flop) eventually results in the Pause flip-flop 728** being cleared.

The various conditions which control the generation of IP pulses, TP pulses and pulses on the conductor 385 for sensing the Break Request flip-flop in the IO Control 8 are tabulated for ready reference in Table 22 below.

*Table 22*

| State of Pause Flip-Flop 728 | State of Break Flip-Flop 724 | Pulses on Conductor 385 | IP Pulses | TP Pulses |
|---|---|---|---|---|
| 1 | 1 | TP-11 | No | Yes |
| 0 | 0 | TP-11 | Yes | Yes |
| 1 | 0 | 2 mc. | No | No |
| 0 | 1 | TP-11 | No | Yes |

COMMAND GENERATORS

Reference is now made to FIG. 15 which is a logical block diagram of the command generators shown as block 27 in FIG. 5*a*. The command generators as their name implies are logical circuits which when properly energized cause a particular command to be generated at the proper time. An inspection of FIG. 15 readily reveals not only the circuits required to produce the above stated function but also the operation of those circuits.

As will be recalled in the description of the time pulse distributor and control of FIG. 14, the time pulse distributor causes the various IP conductors to be sequentially pulsed during specified conditions, i.e. no break and no pause. Furthermore the TP conductors are likewise pulsed during specified conditions i.e. break or no pause. The IP conductors which are employed for command generation and the TP–0 conductor, also employed for command generation, are labeled with their command number in FIG. 15. These various pulsed conductors sample various of the gates in the manner shown in FIG. 15 each time the time pulse distributor in FIG. 14 is cycled, assuming the proper conditions therein are met. Only those gates in FIG. 15 which are conditioned with a positive signal level, however, pass the pulses. Each gate is conditioned during a specific instruction. The positive D.C. levels which condition the gates of the command generators are appropriately labeled in accordance with the instruction which establishes those levels as well as other conditions which must be met, such as, PT, OT, IO Interlock On etc.

The D.C. level conditioning potentials are as previously mentioned produced by the instruction matrix 28 and the cycle control 29 of FIG. 5*b*. The output conductors of the command generators in FIG. 15 which are labeled with the command number are both numbered and labeled in FIG. 5*a*. The operation of the various command generators of FIG. 15 will become apparent particularly in view of the following example.

A positive D.C. level on the conductor labeled sdr PT is delivered as a conditioning input to gates 741 and 742 and is also delivered through an OR circuit 743 to the conditioning input of a gate 744, thereby causing those gates to be conditioned. Gate 741 is sampled by IP–5 pulses and passes this IP–5 pulse to the conductor 325. As will be recalled in the description relative to FIG. 6*a*, the command 325 is the command (Select Pulse for Drums), and as indicated in FIG. 6*a* this pulse occurs at PT–5 time of the select drums instruction. Gate 742 is sampled by IP–2 pulses and passes these pulses to the conductor 146. As will be recalled in the description relative to FIG. 6*a*, the command 146 is the command (Clear Drum Control Register), and as indicated in FIG. 6*a* this pulse occurs at PT–2 time of the select drum instruction. Gate 744 is sampled by IP–11 pulses, and when conditioned, it passes the IP–11 pulse to the conductor 131. As will be recalled also with respect to FIG. 6*a*, the command 131 is the (Command Set PT–OT flip-flop to OT) and as illustrated in FIG. 6*a* this command occurs at PT–11 time of the select drum instruction. The remaining commands can be readily traced in FIG. 15 to check the time and the conditions under which they are generated.

THE CYCLE CONTROL

Reference is now made to FIG. 16 which illustrates in logical block form, the cycle control shown as block 29 in FIG. 5*b*. The cycle control is essentially a group of flip-flops for storing control information. These flip-flops accept control pulses and deliver D.C. levels to the class cycle matrix 30, the instruction matrix 28, and the command generator 27 of FIGS. 5*a* and 5*b*.

The cycle control comprises three flip-flops; 745, 746 and 747 which are appropriately labeled with the name of the control function which they perform. The control or command pulses which are applied to those flip-flops and the D.C. levels delivered by those flip-flops are also appropriately labeled with the control function to which they relate. Their operation will therefore be obvious.

DRUM READ DRIVER

Reference is now made to FIG. 17 which illustrates in schematic form the drum read driver shown as block 646 in FIG. 8*a*. The One output of the read flip-flop 447 of FIG. 7*a* is applied to the input of the drum read driver of FIG. 17. During drum write operations the input signal is −30 volts since the flip-flop is in its Zero state whereas during drum reading operations the input is at +10 since the flip-flop is in its One state. A −30 volt input to the control grid of tube section V1*a* causes that section to be cut off and its plate voltage thereby rises to equal the plate supply voltage. The output of V1*a* is D.C. coupled to the control grid of a cathode follower including tube section of V1*b*. The positive output at the cathode of V1*b* is applied to the parallel-connected control grids of an output cathode follower including tubes V2, V3 and V4 together with their associated circuits. The output signal is a +150 volt level under the −30 volt input signal condition.

This +150 volt level is applied to the cathodes, for example, of the switching diodes 748 and 749 through the center tap of primary windings of the transformers 646 (FIG. 8*a*). This +150 volt level applied to those switching diodes is sufficient to back-bias those diodes to nonconduction. These diodes therefore present high impedance thereby isolating the drum read amplifier 652 from the remaining read and write circuits during writing operations. In a similar manner this +150 volt condition back-biases the other switching diodes 750 and 751 to isolate the drum read amplifier 653 from its associated read write heads. When a +10 volt level is applied to the input of the drum read driver the plate voltage tube section V1*a* rises. The resulting increase in voltage level is coupled through tube section V1*b* and its associated circuit and tubes V2, V3 and V4 with their associated circuits to produce a +100 volt level at the output terminal. This +100 volt level is applied to the cathodes of the switching diodes and causes those diodes to be forward-biased permitting signals induced in a selected drum head to be delivered to the input of its associated drum read amplifier.

From the above description it will be seen that the drum read driver 645 in FIG. 8*a* serves to control the transmission of signals from a read write head to its associated drum read amplifier switching diodes during drum write operation and forward-biases those switching diodes during drum reading operations. The center tapped transformers which couples the various read-write heads are coupled to the drum read amplifier by means of the center tap connected transformer as previously mentioned. The details of the drum read amplifier connected to the secondary windings of those transformers may be as shown in FIG. 18 of the above mentioned copending application "E," however, it is pointed out that the center tapped winding on the primary of the transformer is not grounded as indicated in that application.

DRUM FIELD DRIVER

Reference is now made to FIG. 18 which is a schematic diagram of the drum field driver which may be employed for the circuits shown in block form as 628, 636 through 641 in FIGS. 8*a* and 8*b*. The drum field is composed of three stages; an amplifier stage, a first cathode follower stage and an output cathode follower stage. The amplifier stage receives either a +10 or a −30 volt D.C. level from the field and drum selection circuits. It amplifies the input received and produces a positive D.C. level whose amplitude is dependent upon the input level. The output is applied to the following cathode follower stage. When the input signal is at +10 volt, the output of the drum field driver is +130 volts whereas when the input signal is −30 volts, the output signal is +70 volts.

Referring now to FIG. 8*a*, when a given field of a given drum has been selected, for example, if field One of the AM drum has been selected a +10 volt signal is delivered to the drum field driver 636 which thereby produces a +130 volt signal at its output. This +130 volt signal when applied to the center tap of read-write heads 611–P through 611–15 causes those heads to be selected as previously mentioned.

If at this time, the drum read driver 465 produces +100 volts at its output (a reading operation is to take place) then the read-write switching diodes 748 through 751 will be forward-biased. However, if the drum read driver 645 delivers a 150 volt signal at that time then those read-write switching diodes 748 through 751 will be back-biased.

In the event that field One of the AM drum is not selected and some other field has been selected to perform a reading operation, then the drum field driver 636 will produce +70 volts at its output. In this case although the read-write switching diodes 748 through 751 will be forward-biased by virtue of the selected field driver, the diodes 752 through 755 will be back-biased thereby preventing signals induced in the read-write heads 611–P through 611–15 from being delivered to their associated drum read amplifier.

BREAK-IN DISTRIBUTOR

Reference is made to FIG. 19 for a description of the Break-In Distributor 521 shown in block form in FIG. 7*e*. As pointed out previously, a positive output level from the One side of the Break flip-flop 519 in FIG. 7*e* and the One output of read flip-flop 436 in FIG. 7*h* condition AND circuit 520 in FIG. 7*e*. A positive level from the AND circuit 520 is applied on a conductor 760 to the Break-In Distributor 521 of FIG. 7*e*. As shown in greater detail in FIG. 19, the positive level on conductor 760 is applied to gates 761 through 763. When conditioned with a positive level on the conductor 760, the gates 761 through 763 pass respective TP–1, TP–2 and TP–11 pulses to output conductors labeled BI–1, BI–2 and BI–11. The TP–1, TP–2 and TP–11 pulses are supplied by the Timing Pulse Distributor of FIG. 14 via cable 26.

BREAK-OUT DISTRIBUTOR

Reference is made to FIG. 20 for a description of the Break-Out Distributor. Whenever the One side of the break flip-flop 519 in FIG. 7*e* supplies a positive level to the AND circuit 543 and the One output of the write flip-flop 437 to AND circuit 543 is positive, this AND circuit supplies a positive level on conductor 764 to the Break-Out Distributor 548. A positive level on the conductor 764 in FIG. 20 conditions gates 765 through 768. Positive pulses on the conductors labeled TP–1, TP–2, TP–7 and TP–11 to respective gates 765 through 768 establish positive output pulses on associated conductors labeled BO–1, BO–2, BO–7 and BO–11.

"C" MODEL SINGLE-SHOT

Reference is now made to FIG. 21 which illustrates in schematic form a single-shot suitable for use as a "C" model single-shot shown as block 458 and block 461 in FIG. 7*a*. The circuit shown in FIG. 21 responds to a 0.1 microsecond positive-going pulse at its input and in response to each said pulse causes its normally positive 10 volt output to go to negative 30 volts for an interval of time of approximately 120 microseconds. As previously described with reference to the input-output control, the purpose of the single-shot is to permit switching of the drum circuits which are of the diode type and require approximately 120 microseconds to effect their switching action. The "C" model single-shot is a monostable mulvibrator and a further detailed description of a circuit similar in many respects to the circuit shown in FIG. 21 will be found in the previously mentioned copending application "G."

SUB-SYSTEMS AND COMPONENTS

Many of the sub-systems and components previously shown in block form throughout the above description may be any one of a variety of suitable circuits. Since numerous variations and forms may be employed in many instances, an illustrative example of each of those sub-systems and component circuits which may be found in various related ones of the previously mentioned copending applications is identified in Table 23 below.

*Table 23*

| Name | Copending Application |
|---|---|
| AND | B and F. |
| OR | B and F. |
| Flip-Flops | B, F, and E. |
| Gate | B and F. |
| Single-Shot | G. |
| In-Out Buffer Register | A. |
| In-Out Register | A. |
| Index Interval Register | B. |
| Arithmetic Element | F. |
| Main Memory | B. |
| Operation Register | B. |
| Address Register | B. |
| In-Out Address Counter | A. |
| Program Counter | B. |
| In-Out Word Counter | A. |
| Drum Write Driver | E (Fig. 17). |
| Drum Writer | E (Fig. 19). |
| Drum Read Amplifier | E (Fig. 18). |
| Timing Pulse Generator | B (Fig. 16). |

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

A data processing machine comprising a main memory device of the randon access type and an auxiliary memory of the cyclic type, said main memory and said auxiliary memory each having a plurality of signal storage registers, an input-output address counter for producing signals identifying a selected register of said main memory device, an angular position counter for producing signals identifying the register of said auxiliary memory device into which the next reading and writing operation may take place, a drum control register for producing signals identifying a selected register of said auxiliary memory device, an input-output word counter for producing signals indicating the number of transfers to be effected, a first means for causing a transfer of signals between said main memory and said auxiliary memory when a predetermined relationship exists between the signals produced by said angular position counter and the signals produced by said drum control register and second means including said first means for altering the signals produced by said drum control register, said input-output word counter and said input-output address counter each time that a transfer is effected and means including said second means for inhibiting further transfers when a predetermined signal is produced by said input-output word counter.

References Cited in the file of this patent

UNITED STATES PATENTS

| | | |
|---|---|---|
| 2,639,859 | Serrell | May 26, 1953 |
| 2,840,304 | Williams et al. | June 24, 1958 |
| 2,856,595 | Selmer | Oct. 14, 1958 |
| 2,916,210 | Selmer | Dec. 8, 1959 |

OTHER REFERENCES

Proceedings of the IRE, Computer Issue, October 1953.